(12) United States Patent (10) Patent No.: US 8,768,918 B2
Clary et al. (45) Date of Patent: *Jul. 1, 2014

(54) WEB PAGE PERFORMANCE SCORING

(75) Inventors: Robert D. Clary, Howardsville, VA (US); Jim Davidson, Reston, VA (US); Judson Valeski, Boulder, CO (US)

(73) Assignee: Mercury Kingdom Assets Limited, Road Town, Tortola (VG)

( * ) Notice: Subject to any disclaimer, the term of this patent is extended or adjusted under 35 U.S.C. 154(b) by 0 days.

This patent is subject to a terminal disclaimer.

(21) Appl. No.: 13/447,006

(22) Filed: Apr. 13, 2012

(65) Prior Publication Data

US 2012/0198059 A1 Aug. 2, 2012

Related U.S. Application Data

(60) Division of application No. 13/290,897, filed on Nov. 7, 2011, now Pat. No. 8,161,042, which is a continuation of application No. 12/262,054, filed on Oct. 30, 2008, now Pat. No. 8,078,614, which is a continuation of application No. 10/887,956, filed on Jul. 9, 2004, now Pat. No. 7,475,067.

(51) Int. Cl.
*G06F 17/30* (2006.01)
(52) U.S. Cl.
USPC ........................................ 707/727; 707/748
(58) Field of Classification Search
CPC ............ G06F 11/3452; G06F 17/3089; H04L 41/5083
USPC .................. 707/709, 727, 748; 715/234, 760
See application file for complete search history.

(56) References Cited

U.S. PATENT DOCUMENTS

| | | | |
|---|---|---|---|
| 6,226,648 B1 | 5/2001 | Appleman et al. | |
| 6,360,235 B1 | 3/2002 | Tilt et al. | |
| 6,785,671 B1 | 8/2004 | Bailey et al. | |
| 7,257,577 B2 | 8/2007 | Fagin et al. | |
| 7,260,573 B1 | 8/2007 | Jeh et al. | |
| 7,475,067 B2 | 1/2009 | Clary et al. | |
| 8,078,614 B2 | 12/2011 | Clary et al. | |
| 8,161,042 B2 * | 4/2012 | Clary et al. | 707/727 |
| 2002/0023141 A1 | 2/2002 | Yen et al. | |
| 2002/0188717 A1 | 12/2002 | Mushlin et al. | |
| 2003/0105604 A1 | 6/2003 | Ash et al. | |
| 2003/0128233 A1 | 7/2003 | Kasriel et al. | |
| 2003/0130982 A1 | 7/2003 | Kasriel et al. | |
| 2003/0131106 A1 | 7/2003 | Kasriel et al. | |

(Continued)

OTHER PUBLICATIONS

U.S. Appl. No. 12/262,054 Notice of Allowance mailed Aug. 8, 2011, 10.

(Continued)

*Primary Examiner* — Cheryl Lewis
(74) *Attorney, Agent, or Firm* — Lee & Hayes, PLLC

(57) ABSTRACT

A browser-based tool is provided that loads a Webpage, accesses the document object model (DOM) of the page, collects information about the page structure and parses the page, determines through the use of heuristics such factors as how much text is found on the page and the like, produces statistical breakdown of the page, and calculates a score based on performance of the page. Key to the operation of the invention is the ability to observe operation of the Webpage as it actually loads in real time, scoring the page for several of various performance factors, and producing a combined score for the various factors.

20 Claims, 20 Drawing Sheets

(56) References Cited

U.S. PATENT DOCUMENTS

2005/0060168 A1   3/2005   Murashige et al.
2005/0060297 A1   3/2005   Najork
2006/0287907 A1   12/2006  Kim

OTHER PUBLICATIONS

"Mindability", Maritz: Thompson Lightstone & Company. 2003. Total of 1 page.
"Mindability", Retrieved from website: www.mindability, Total of 1 page.
"NetRaker Clickstream: Analyze and Visualize Navigation Pattern", NetRaker Corporation, Retrieved from website; Sub catagories: NetRaker>Home>Products, 1998, Total of 3 pages.
"NetRaker Experience Evaluator: Quickly Gather Customer Insights", NetRaker Corporation, Retrieved from website; Sub catagories: NetRaker>Home>Products, 1998, Total of 2 pages.
"NetRaker Experience Recorder: Observe and React to Your Customers", NetRaker Corporation, Retrieved from website. Sub catagories: NetRaker>Home>Products, 1998, Total of 2 pages.
"NetRaker Index: Complete Site Evaluation From Your Customer's Perspective", NetRaker Corporation, Retrieved from website. Sub catagories: NetRaker>Home>Products, 1998, Total of 2 pages.
"NetRaker Products", NetRaker Corporation, Retrieved from website. Sub catagories: NetRaker>Home>Products, 1998, Total of 2 pages.
"Topaz Client Monitor: Identifies Performance Problems Originating in the Last Mile", Mercury Interactive, Total of 2 pages.
"Topaz: Highlights", Mercury Interactive Corporation, Retrieved from website: www.mercuryinteractive.com/products, 2002, Total of 2 pages.
"Web Insight on Deman", Vividence Corporation, Overview; Retrieved from website: http://eXpress.Vividence.com, 2003, Total of 4 pages.
Edwards, H.K. et al., "A Methodology and Implementation for Analytic Modeling in Electronic Commerce Applications", Electronic Commerce Technologies, Second International Symposium, ISEC 2001, Proceedings (Lecture Notes in Computer Science vol. 2040); Springer-Verlag; Germany, 2001, 148-157.
Ghita, B.V. et al., "Endpoint Study of Internet Paths and Web Page Transfers", Campus-Wide Information Systems, vol. 20, No. 3; Emerald; UK, 2003, 90-97.
Joachims, Thorsten et al., "Web Watcher: Machine Learning and Hypertext", Carnegie Mellon University, School of Computer Science, May 29, 1995, Total of 5 pages.
Yun, Fu et al., "EtE: Passive End-to-End Internet Service Performance Monitoring", Proceedings of the General Track. 2002 USENIX Annual Technical Conference, Monterey, CA, USA, Jun. 2002, 10-15.

\* cited by examiner

Connect Times

| Connect Rate | Connect Time |
|---|---|
| 14.4K | 43.84 seconds |
| 28.8K | 21.92 seconds |
| 33.6K | 18.79 seconds |
| 56K | 11.27 seconds |
| ISDN 128K | 4.93 seconds |
| T1 1.44Mbps | 0.43 seconds |

Note that these download times are based on the full connection rate with no latency. Actual download times will be slower, your mileage may vary.

Page Objects ─14

| QTY | SIZE | TYPE | URL |
|---|---|---|---|
| 1 | 45177 | HTML | http://slashdot.org |
| 2 | 4756 | IMG | http://images.slashdot.org/topics/topictech2.gif |
| 1 | 3473 | IMG | http://images.slashdot.org/title.gif |
| 1 | 3034 | IMG | http://images.slashdot.org/topics/topicsecurity.gif |
| 1 | 2294 | SCRIPT | http://pagead.googlesyndication.com/ca/show_ads.js |
| 1 | 2141 | IMG | http://images.slashdot.org/topics/topicslashback.gif |
| 1 | 2039 | IMG | http://images.slashdot.org/topics/topicinternet.gif |
| 1 | 1988 | IMG | http://images.slashdot.org/topics/topiclinux.gif |
| 1 | 1848 | IMG | http://images.slashdot.org/topics/topiccaldera.gif |
| 1 | 1735 | IMG | http://images.slashdot.org/topics/topiced.gif |
| 1 | 1716 | IMG | http://images.slashdot.org/topics/topicspam.gif |
| 1 | 1564 | IMG | http://images.slashdot.org/topics/topicmatrix.gif |
| 1 | 1476 | IMG | http://images.slashdot.org/topics/topicmovies.gif |
| 1 | 1457 | IMG | http://images.slashdot.org/topics/topicbusiness.gif |
| 1 | 1298 | IMG | http://images.slashdot.org/topics/topichumor.gif |
| 1 | 1186 | IMG | http://images.slashdot.org/topics/topicspace.gif |
| 1 | 1185 | IMG | http://images.slashdot.org/topics/topichardware.gif |
| 1 | 1083 | IMG | http://images.slashdot.org/topics/topicscience.gif |
| 2 | 1045 | IMG | http://images.slashdot.org/topics/tpoicwireless.gif |
| 13 | 122 | IMG | http://images.slashdot.org/slc.gif |
| 1 | 53 | IMG | http://images.slashdot.org/greendot.gif |
| 1 | 43 | IMG | http://images.slashdot.org/pix.gif |
| 1 | 42 | IMG | http://images2.slashdot.org/Slashdot/pc.gif?index,105363855 |
| 1 | 42 | IMG | http://images.slashdot.org/banner/goog5025en.gif?105363855 |
| 39^ | 80797 | | Total (^unique objects) |

* CSS alternate stylesheets may be referenced in the HTML but are not actually downloaded until they are needed and are therefore not included in the total page size.

FIG. 1B
*(Continued)*

16 — Analysis and Recommendations

- TOTAL_OBJECTS - Warning! Danger Will Robinson! The total number of objects on this page is 39- consider reducing this to a more reasonable number. Combine, refine, and optimize. Replace graphic rollovers with CSS rollovers to speed display and minimize HTTP requests.
- TOTAL_IMAGES - Warning! Danger Will Robinson! The total number of images on this page is 22, consider reducing this to a more reasonable number. Combine, refine, and optimize your graphics. Replace graphic rollovers with CSS rollovers to speed display and minimize HTTP requests.
- TOTAL_SIZE - Caution. The total size of this page is 80797 bytes, which will load in over 8 seconds on a 56Kbps modem. Consider reducing total page size to less than 30K to achieve sub eight second response times on 56K connections. Be sure to provide feedback for pages over 30K by layering your design to display useful content within the first two seconds. Consider optimizing your site with *Speed Up Your Site* or contacting us about our optimization services.
- TOTAL_SCRIPT - Congratulations, the total number of external script files on this page is 1; External scripts are less reliably cached than CSS

FIG. 1C
*(Prior Art)*

Report for http://slashdot.org/
- Totals

Total Score 2.9  — 21

Score Details — 22

Incremental Layout Score 2.6 — 23

Latency Score 2.3 — 24

25 — Download Score 2.3

| Version | First Visit | Second Visit |
|---|---|---|
| Original | 4.1 | 2.5 |
| Optimized | 4 | 2.4 |

26 —

| Measurement | Value |
|---|---|
| Document Size | 11983 |
| Document Size (Cached) | 0 |
| Total Size | 67606 |
| Total Files (#) | 22 |
| Text (bytes) | 0 |
| Text Cached (bytes) | 0 |
| Binary (bytes) | 55623 |
| Binary Cached (bytes) | 55623 |
| Domains | 2 |
| Whitespace (bytes) | 993 |
| Cookies (bytes) | 0 |
| Depth (DOM) | 24 |

27 —

| Measurement | Count | Size (bytes) | Cached Size (bytes) |
|---|---|---|---|
| table | 42 | 0 | 0 |
| tr | 52 | 0 | 0 |
| td | 65 | 0 | 0 |
| font | 114 | 0 | 0 |
| script-inline | 3 | 1117 | 0 |
| img | 36 | 55623 | 55623 |
| img-spacer | 3 | 138 | 138 |
| script | 0 | 0 | 0 |
| css | 0 | 0 | 0 |
| applet | 0 | 0 | 0 |
| embed | 0 | 0 | 0 |
| style-inline | 0 | 0 | 0 |

*FIG. 2A*

• HEAD  
Details of HEAD Tag      28

| Measurement | Count | Size (bytes) | Cached Size (bytes) |
|---|---|---|---|
| script | 0 | 0 | 0 |
| css | 0 | 0 | 0 |

• Body  
Details of Body Tag      29

| Measurement | Count | Size (bytes) | Cached Size (bytes) |
|---|---|---|---|
| table | 42 | 0 | 0 |
| tr | 52 | 0 | 0 |
| td | 65 | 0 | 0 |
| font | 114 | 0 | 0 |
| script-inline | 3 | 1117 | 0 |
| img | 36 | 55623 | 55623 |
| img-spacer | 3 | 138 | 138 |

Details of child elements of BODY Tag  
   TABLE size: 1925  
   CENTER size: 16769    ← 30  
   TABLE size: 83931

| key | http://image2.slashdot.org/Slashdot/pc.gif?index, 1053639114483 |
|---|---|
| dataSize | 42 |
| fetchCount | 3 |
| lastFetched | Thu May 22 2003 17:32:21 GMT-0400 (Eastern Daylight Time) |
| lastModified | Thu May 22 2003 17:31:57 GMT-0400 (Eastern Daylight Time) |
| expirationTime | Sun Aug 10 2003 14:59:44 GMT-0400 (Eastern Daylight Time) |
| responseHead | HTTP/1.1 200 OK<br>Date: Thu, 22 May 2003 21:32:14 GMT<br>Server: Apache/1.3.26 (unix)<br>Last-Modified: Wed, 14 Mar 2001 22:53:51 GMT<br>Etag: "234004-2a-3aaff67f"<br>Accept-Ranges: bytes<br>Content-Length: 42<br>Content-Type: image/gif |

*FIG. 2B*

| key | http://images.slashdot.org/banner/pmks0307en.gif?1053639114492 |
|---|---|
| dataSize | 15074 |
| fetchCount | 3 |
| lastModified | Thu May 22 2003 17:32:21 GMT-0400 (Eastern Daylight Time) |
| expirationTime | Thu May 22 2003 17:32:02 GMT-0400 (Eastern Daylight Time) |
| responseHead | Thu May 29 2003 17:31:54 GMT-0400 (Eastern Daylight Time) |
| | HTTP/1.1 200 OK<br>Date: Thu, 22 May 2003 21:32:12 GMT<br>Server: Apache/2.0.45 (Unix) mod_ssl/2.0.45 OpenSSL/0.9.6g<br>Cache-Control: max-age=604800<br>Expires: Thu, 29 May 2003 21:32:12 GMT<br>Last-Modified: Sat, 26 Oct 2002 16:13:07 GMT<br>Etag: "if8a28-3ae2-c60faac0"<br>Accept-Ranges: bytes<br>Content-Length: 15074<br>Content-Type: image/gif |

| key | http://images.slashdot.org/title.gif |
|---|---|
| dataSize | 3473 |
| fetchCount | 26 |
| lastFetched | Thu May 22 2003 17:32:21 GMT-0400 (Eastern Daylight Time) |
| lastModified | Thu May 22 2003 17:31:57 GMT-0400 (Eastern Daylight Time) |
| expirationTime | Thu May 29 2003 17:31:54 GMT-0400 (Eastern Daylight Time) |
| responseHead | HTTP/1.1 200 OK<br>Date: Thu, 22 May 2003 21:32:15 GMT<br>Server: Apache/2.0.45 (Unix) mod_ssl/2.0.45 OpenSSL/0.9.6g<br>Cache-Control: max-age=604800<br>Expires: Thu, 29 May 2003 21:32:15 GMT<br>Last-Modified: Thu, 22 May 2003 05:07:00 GMT<br>Etag: "1d01da-d91-b6d5a500"<br>Accept-Ranges: bytes<br>Content-Length: 3473<br>Content-Type: image/gif |

*FIG. 2C*

| key | http://images.slashdot.org/topics/topicmatrix.gif |
|---|---|
| dataSize | 1564 |
| fetchCount | 25 |
| lastFetched | Thu May 22 2003 17:32:21 GMT-0400 (Eastern Daylight Time) |
| lastModified | Thu May 22 2003 17:32:00 GMT-0400 (Eastern Daylight Time) |
| expirationTime | Thu May 29 2003 17:31:54 GMT-0400 (Eastern Daylight Time) |
| lastFetched | Thu May 22 2003 17:32:21 GMT-0400 (Eastern Daylight Time) |
| lastModified | Thu May 22 2003 17:32:00 GMT-0400 (Eastern Daylight Time) |
| expirationTime | Thu May 29 2003 17:31:54 GMT-0400 (Eastern Daylight Time) |
| responseHead | HTTP/1.1 200 OK<br>Date: Thu, 22 May 2003 21:32:18 GMT<br>Server: Apache/2.0.45 (Unix) mod_ssl/2.0.45 OpenSSL/0.9.6g<br>Cache-Control: max-age=604800<br>Expires: Thu, 29 May 2003 21:32:18 GMT<br>Last-Modified: Thu, 22 May 2003 05:07:00 GMT<br>Etag: "1000c8-61c-b6d5a500"<br>Accept-Ranges: bytes<br>Content-Length: 1564<br>Content-Type: image/gif |

| key | http://images.slashdot.org/topics/topicslashback.gif |
|---|---|
| dataSize | 2141 |
| fetchCount | 21 |
| lastFetched | Thu May 22 2003 17:32:21 GMT-0400 (Eastern Daylight Time) |
| lastModified | Thu May 22 2003 17:32:02 GMT-0400 (Eastern Daylight Time) |
| expirationTime | Thu May 29 2003 17:31:54 GMT-0400 (Eastern Daylight Time) |
| responseHead | HTTP/1.1 200 OK<br>Date: Thu, 22 May 2003 21:32:19 GMT<br>Server: Apache/2.0.45 (Unix) mod_ssl/2.0.45 OpenSSL/0.9.6g<br>Cache-Control: max-age=604800<br>Expires: Thu, 29 May 2003 21:32:19 GMT<br>Last-Modified: Thu, 22 May 2003 05:07:00 GMT<br>Etag: "100112-85d-b6d5a500"<br>Accept-Ranges: bytes<br>Content-Length: 2141<br>Content-Type: image/gif |

*FIG. 2D*

| key | http://images.slashdot.org/topics/topicmovies.gif |
|---|---|
| dataSize | 1476 |
| FetchCount | 22 |
| lastFetched | Thu May 22 2003 17:32:21 GMT-0400 (Eastern Daylight Time) |
| lastModified | Thu May 22 2003 17:32:03 GMT-0400 (Eastern Daylight Time) |
| expirationTime | Thu May 29 2003 17:31:54 GMT-0400 (Eastern Daylight Time) |
| responseHead | HTTP/1.1 200 OK<br>Date: Thu, 22 May 2003 21:32:20 GMT<br>Server: Apache/2.0.45 (Unix) mod_ssl/2.0.45 OpenSSL/0.9.6g<br>Cache-Control: max-age=604800<br>Expires: Thu, 29 May 2003 21:32:20 GMT<br>Last-Modified: Thu, 22 May 2003 05:07:00 GMT<br>Etag: "38854b-5c4-b6d5a500"<br>Accept-Ranges: bytes<br>Content-Length: 1476<br>Content-Type: image/gif |

| key | http://images.slashdot.org/topics/topicwireless.gif |
|---|---|
| dataSize | 1045 |
| fetchCount | 25 |
| lastFetched | Thu May 22 2003 17:32:21 GMT-0400 (Eastern Daylight Time) |
| lastModified | Thu May 22 2003 17:32:04 GMT-0400 (Eastern Daylight Time) |
| expirationTime | Thu May 29 2003 17:31:54 GMT-0400 (Eastern Daylight Time) |
| responseHead | HTTP/1.1 200 OK<br>Date:Thu, 22 May 2003 21:32:22 GMT<br>Server: Apache/2.0.45 (Unix) mod_ssl/2.0.45 OpenSSL/0.9.6g<br>Cache-Control: max-age=604800<br>Expires: Thu, 29 May 2003 21:32:22 GMT<br>Last-Modified: Thu, 22 May 2003 05:07:00 GMT<br>Etag: "100082-415-b6d5a500"<br>Accept-Ranges: bytes<br>Content-Length: 1045<br>Content-Type: image/gif |

*FIG. 2E*

| key | http://images.slashdot.org/topics/topichardware.gif |
|---|---|
| dataSize | 1185 |
| fetchCount | 22 |
| lastFetched | Thu May 22 2003 17:32:21 GMT-0400 (Eastern Daylight Time) |
| lastModified | Thu May 22 2003 17:32:05 GMT-0400 (Eastern Daylight Time) |
| expirationTime | Thu May 29 2003 17:31:54 GMT-0400 (Eastern Daylight Time) |
| responseHead | HTTP/1.1 200 OK<br>Date: Thu, 22 May 2003 21:32:23 GMT<br>Server: Apache/2.0.45 (Unix) mod_ssl/2.0.45 Open SSL/0.9.6g<br>Cache-Control: max-age=604800<br>Expires: Thu, 29 May 2003 21:32:23 GMT<br>Last-Modified: Thu, 22 May 2003 05:07:00 GMT<br>Etag: "3e047b-4a1-b6d5a500"<br>Accept-Ranges: bytes<br>Content-Length: 1185<br>Content-Type: image/gif |

| key | http://images.slashdot.org/slc.gif |
|---|---|
| dataSize | 122 |
| fetchCount | 67 |
| lastFetched | Thu May 22 2003 17:32:21 GMT-0400 (Eastern Daylight Time) |
| lastModified | Thu May 22 2003 17:32:05 GMT-0400 (Eastern Daylight Time) |
| expirationTime | Thu May 29 2003 17:31:54 GMT-0400 (Eastern Daylight Time) |
| responseHead | HTTP/1.1 200 OK<br>Date: Thu, 22 May 2003 21:32:23 GMT<br>Server: Apache/2.0.45 (Unix) mod_ssl/2.0.45 Open SSL/0.9.6g<br>Cache-Control: max-age=604800<br>Expires: Thu, 29 May 2003 21:32:23 GMT<br>Last-Modified: Thu, 22 May 2003 05:07:00 GMT<br>Etag: "3e00d1-7a-b6d5a500"<br>Accept-Ranges: bytes<br>Content-Length: 122<br>Content-Type: image/gif |

*FIG. 2F*

| key | http://images.slashdot.org/topics/topicspace.gif |
|---|---|
| dataSize | 1186 |
| fetchCount | 6 |
| lastFetched | Thu May 22 2003 17:32:21 GMT-0400 (Eastern Daylight Time) |
| lastModified | Thu May 22 2003 17:32:06 GMT-0400 (Eastern Daylight Time) |
| expirationTime | Thu May 29 2003 17:31:54 GMT-0400 (Eastern Daylight Time) |
| responseHead | HTTP/1.1 200 OK<br>Date: Thu, 22 May 2003 21:32:25 GMT<br>Server: Apache/2.0.45 (Unix) mod_ssl/2.0.45 Open SSL/0.9.6g<br>Cache-Control: max-age=604800<br>Expires: Thu, 29 May 2003 21:32:25 GMT<br>Last-Modified: Thu, 22 May 2003 05:07:00 GMT<br>Etag: "3e0513-4a2-b6d5a500"<br>Accept-Ranges: bytes<br>Content-Length: 1186<br>Content-Type: image/gif |

*FIG. 2F*
*(Continued)*

| | |
|---|---|
| key | http://images.slashdot.org/topics/topicsecurity.gif |
| dataSize | 3034 |
| fetchCount | 9 |
| lastFetched | Thu May 22 2003 17:32:21 GMT-0400 (Eastern Daylight Time) |
| lastModified | Thu May 22 2003 17:32:08 GMT-0400 (Eastern Daylight Time) |
| expirationTime | Thu May 29 2003 17:31:54 GMT-0400 (Eastern Daylight Time) |
| responseHead | HTTP/1.1 200 OK<br>Date: Thu, 22 May 2003 21:32:25 GMT<br>Server: Apache/2.0.45 (Unix) mod_ssl/2.0.45 Open SSL/0.9.6g<br>Cache-Control: max-age=604800<br>Expires: Thu, 29 May 2003 21:32:25 GMT<br>Last-Modified: Thu, 22 May 2003 05:07:00 GMT<br>Etag: "1000f0-bda-b6d5a500"<br>Accept-Ranges: bytes<br>Content-Length: 3034<br>Content-Type: image/gif |

| | |
|---|---|
| key | http://images.slashdot.org/topics/topiccaldera.gif |
| dataSize | 1848 |
| fetchCount | 8 |
| lastFetched | Thu May 22 2003 17:32:21 GMT-0400 (Eastern Daylight Time) |
| lastModified | Thu May 22 2003 17:32:09 GMT-0400 (Eastern Daylight Time) |
| expirationTime | Thu May 29 2003 17:31:55 GMT-0400 (Eastern Daylight Time) |
| responseHead | HTTP/1.1 200 OK<br>Date: Thu, 22 May 2003 21:32:27 GMT<br>Server: Apache/2.0.45 (Unix) mod_ssl/2.0.45 Open SSL/0.9.6g<br>Cache-Control: max-age=604800<br>Expires: Thu, 29 May 2003 21:32:27 GMT<br>Last-Modified: Thu, 22 May 2003 05:07:00 GMT<br>Etag: "3e00e1-738-b6d5a500"<br>Accept-Ranges: bytes<br>Content-Length: 1848<br>Content-Type: image/gif |

*FIG. 2G*

| key | http://images.slashdot.org/topics/topicbusiness.gif |
|---|---|
| dataSize | 1457 |
| fetchCount | 8 |
| lastFetched | Thu May 22 2003 17:32:21 GMT-0400 (Eastern Daylight Time) |
| lastModified | Thu May 22 2003 17:32:10 GMT-0400 (Eastern Daylight Time) |
| expirationTime | Thu May 29 2003 17:31:54 GMT-0400 (Eastern Daylight Time) |
| responseHead | HTTP/1.1 200 OK<br>Date: Thu, 22 May 2003 21:32:28 GMT<br>Server: Apache/2.0.45 (Unix) mod_ssl/2.0.45 Open SSL/0.9.6g<br>Cache-Control: max-age=604800<br>Expires: Thu, 29 May 2003 21:32:28 GMT<br>Last-Modified: Thu, 22 May 2003 05:07:00 GMT<br>Etag: "3e00d8-5b1-b6d5a500"<br>Accept-Ranges: bytes<br>Content-Length: 1457<br>Content-Type: image/gif |

| key | http://images.slashdot.org/topics/topiced.gif |
|---|---|
| dataSize | 1735 |
| fetchCount | 7 |
| lastFetched | Thu May 22 2003 17:32:21 GMT-0400 (Eastern Daylight Time) |
| lastModified | Thu May 22 2003 17:32:10 GMT-0400 (Eastern Daylight Time) |
| expirationTime | Thu May 29 2003 17:31:55 GMT-0400 (Eastern Daylight Time) |
| responseHead | HTTP/1.1 200 OK<br>Date: Thu, 22 May 2003 21:32:27 GMT<br>Server: Apache/2.0.45 (Unix) mod_ssl/2.0.45 Open SSL/0.9.6g<br>Cache-Control: max-age=604800<br>Expires: Thu, 29 May 2003 21:32:27 GMT<br>Last-Modified: Thu, 22 May 2003 05:07:00 GMT<br>Etag: "3889fc-6c7-b6d5a500"<br>Accept-Ranges: bytes<br>Content-Length: 1735<br>Content-Type: image/gif |

*FIG. 2H*

| key | http://images.slashdot.org/topics/topictech2.gif |
|---|---|
| dataSize | 4756 |
| fetchCount | 20 |
| lastFetched | Thu May 22 2003 17:32:21 GMT-0400 (Eastern Daylight Time) |
| lastModified | Thu May 22 2003 17:32:11 GMT-0400 (Eastern Daylight Time) |
| expirationTime | Thu May 29 2003 17:31:55 GMT-0400 (Eastern Daylight Time) |
| responseHead | HTTP/1.1 200 OK<br>Date: Thu, 22 May 2003 21:32:29 GMT<br>Server: Apache/2.0.45 (Unix) mod_ssl/2.0.45 Open SSL/0.9.6g<br>Cache-Control: max-age=604800<br>Expires: Thu, 29 May 2003 21:32:29 GMT<br>Last-Modified: Thu, 22 May 2003 05:07:00 GMT<br>Etag: "3e0244-1294-b6d5a500"<br>Accept-Ranges: bytes<br>Content-Length: 4756<br>Content-Type: image/gif |

| key | http://images.slashdot.org/topics/topicspam.gif |
|---|---|
| dataSize | 1716 |
| fetchCount | 7 |
| lastFetched | Thu May 22 2003 17:32:21 GMT-0400 (Eastern Daylight Time) |
| lastModified | Thu May 22 2003 17:32:12 GMT-0400 (Eastern Daylight Time) |
| expirationTime | Thu May 29 2003 17:31:55 GMT-0400 (Eastern Daylight Time) |
| responseHead | HTTP/1.1 200 OK<br>Date: Thu, 22 May 2003 21:32:28 GMT<br>Server: Apache/2.0.45 (Unix) mod_ssl/2.0.45 Open SSL/0.9.6g<br>Cache-Control: max-age=604800<br>Expires: Thu, 29 May 2003 21:32:28 GMT<br>Last-Modified: Thu, 22 May 2003 05:07:00 GMT<br>Etag: "388527-6b4-b6d5a500"<br>Accept-Ranges: bytes<br>Content-Length: 1716<br>Content-Type: image/gif |

*FIG. 21*

| key | http://images.slashdot.org/topics/topicinternet.gif |
|---|---|
| dataSize | 2039 |
| fetchCount | 13 |
| lastFetched | Thu May 22 2003 17:32:21 GMT-0400 (Eastern Daylight Time) |
| lastModified | Thu May 22 2003 17:32:13 GMT-0400 (Eastern Daylight Time) |
| expirationTime | Thu May 29 2003 17:31:56 GMT-0400 (Eastern Daylight Time) |
| responseHead | HTTP/1.1 200 OK<br>Date: Thu, 22 May 2003 21:32:31 GMT<br>Server: Apache/2.0.45 (Unix) mod_ssl/2.0.45 Open SSL/0.9.6g<br>Cache-Control: max-age=604800<br>Expires: Thu, 29 May 2003 21:32:31 GMT<br>Last-Modified: Thu, 22 May 2003 05:07:00 GMT<br>Etag: "100104-7f7-b6d5a500"<br>Accept-Ranges: bytes<br>Content-Length: 2039<br>Content-Type: image/gif |

*FIG. 2I*
*(Continued)*

| key | http://images.slashdot.org/topics/topicscience.gif |
|---|---|
| dataSize | 1083 |
| fetchCount | 10 |
| lastFetched | Thu May 22 2003 17:32:21 GMT-0400 (Eastern Daylight Time) |
| lastModified | Thu May 22 2003 17:32:14 GMT-0400 (Eastern Daylight Time) |
| expirationTime | Thu May 29 2003 17:31:56 GMT-0400 (Eastern Daylight Time) |
| responseHead | HTTP/1.1 200 OK<br>Date: Thu, 22 May 2003 21:32:32 GMT<br>Server: Apache/2.0.45 (Unix) mod_ssl/2.0.45 Open SSL/0.9.6g<br>Cache-Control: max-age=604800<br>Expires: Thu, 29 May 2003 21:32:32 GMT<br>Last-Modified: Thu, 22 May 2003 05:07:00 GMT<br>Etag: "1000bc-43b-b6d5a500"<br>Accept-Ranges: bytes<br>Content-Length: 1083<br>Content-Type: image/gif |

| key | http://images.slashdot.org/topics/topichumor.gif |
|---|---|
| dataSize | 1298 |
| fetchCount | 9 |
| lastFetched | Thu May 22 2003 17:32:21 GMT-0400 (Eastern Daylight Time) |
| lastModified | Thu May 22 2003 17:32:14 GMT-0400 (Eastern Daylight Time) |
| expirationTime | Thu May 29 2003 17:31:56 GMT-0400 (Eastern Daylight Time) |
| responseHead | HTTP/1.1 200 OK<br>Date: Thu, 22 May 2003 21:32:33 GMT<br>Server: Apache/2.0.45 (Unix) mod_ssl/2.0.45 Open SSL/0.9.6g<br>Cache-Control: max-age=604800<br>Expires: Thu, 29 May 2003 21:32:23 GMT<br>Last-Modified: Thu, 22 May 2003 05:07:00 GMT<br>Etag: "100100-512-b6d5a500"<br>Accept-Ranges: bytes<br>Content-Length: 1298<br>Content-Type: image/gif |

*FIG. 2J*

| key | http://images.slashdot.org/topics/topiclinux.gif |
|---|---|
| dataSize | 1988 |
| fetchCount | 14 |
| lastFetched | Thu May 22 2003 17:32:21 GMT-0400 (Eastern Daylight Time) |
| lastModified | Thu May 22 2003 17:32:15 GMT-0400 (Eastern Daylight Time) |
| expirationTime | Thu May 29 2003 17:31:56 GMT-0400 (Eastern Daylight Time) |
| responseHead | HTTP/1.1 200 OK<br>Date: Thu, 22 May 2003 21:32:34 GMT<br>Server: Apache/2.0.45 (Unix) mod_ssl/2.0.45 Open SSL/0.9.6g<br>Cache-Control: max-age=604800<br>Expires: Thu, 29 May 2003 21:32:34 GMT<br>Last-Modified: Thu, 22 May 2003 05:07:00 GMT<br>Etag: "3e0141-7c4-b6d5a500"<br>Accept-Ranges: bytes<br>Content-Length: 1988 |

*FIG. 2J*
*(Continued)*

| key | http://images.slashdot.org/pix.gif |
|---|---|
| dataSize | 43 |
| fetchCount | 8 |
| lastFetched | Thu May 22 2003 17:32:21 GMT-0400 (Eastern Daylight Time) |
| lastModified | Thu May 22 2003 17:32:15 GMT-0400 (Eastern Daylight Time) |
| expirationTime | Thu May 29 2003 17:31:58 GMT-0400 (Eastern Daylight Time) |
| responseHead | HTTP/1.1 200 OK<br>Date: Thu, 22 May 2003 21:32:34 GMT<br>Server: Apache/2.0.45 (Unix) mod_ssl/2.0.45 Open SSL/0.9.6g<br>Cache-Control: max-age=604800<br>Expires: Thu, 29 May 2003 21:32:34 GMT<br>Last-Modified: Thu, 22 May 2003 05:07:00 GMT<br>Etag: "3e0395-2b-b6d5a500"<br>Accept-Ranges: bytes<br>Content-Length: 43<br>Content-Type: image/gif |

| key | http://images.slashdot.org/greendot.gif |
|---|---|
| dataSize | 53 |
| fetchCount | 8 |
| lastFetched | Thu May 22 2003 17:32:21 GMT-0400 (Eastern Daylight Time) |
| lastModified | Thu May 22 2003 17:32:15 GMT-0400 (Eastern Daylight Time) |
| expirationTime | Thu May 29 2003 17:31:58 GMT-0400 (Eastern Daylight Time) |
| responseHead | HTTP/1.1 200 OK<br>Date: Thu, 22 May 2003 21:32:34 GMT<br>Server: Apache/2.0.45 (Unix) mod_ssl/2.0.45 Open SSL/0.9.6g<br>Cache-Control: max-age=604800<br>Expires: Thu, 29 May 2003 21:32:34 GMT<br>Last-Modified: Thu, 22 May 2003 05:07:00 GMT<br>Etag: "3e0141-7c4-b6d5a500"<br>Accept-Ranges: bytes<br>Content-Length: 1988<br>Content-Type: image/gif |

*FIG. 2K*

| key | http://images.slashdot.org/pix.gif |
|---|---|
| dataSize | 43 |
| fetchCount | 8 |
| lastFetched | Thu May 22 2003 17:32:21 GMT-0400 (Eastern Daylight Time) |
| lastModified | Thu May 22 2003 17:32:15 GMT-0400 (Eastern Daylight Time) |
| expirationTime | Thu May 29 2003 17:31:58 GMT-0400 (Eastern Daylight Time) |
| responseHead | HTTP/1.1 200 OK<br>Date: Thu, 22 May 2003 21:32:34 GMT<br>Server: Apache/2.0.45 (Unix) mod_ssl/2.0.45 Open SSL/0.9.6g<br>Cache-Control: max-age=604800<br>Expires: Thu, 29 May 2003 21:32:34 GMT<br>Last-Modified: Thu, 22 May 2003 05:07:00 GMT<br>Etag: "3e0395-2b-b6d5a500"<br>Accept-Ranges: bytes<br>Content-Length: 43<br>Content-Type: image/gif |

| key | http://images.slashdot.org/greendot.gif |
|---|---|
| dataSize | 53 |
| fetchCount | 8 |
| lastFetched | Thu May 22 2003 17:32:21 GMT-0400 (Eastern Daylight Time) |
| lastModified | Thu May 22 2003 17:32:16 GMT-0400 (Eastern Daylight Time) |
| expirationTime | Thu May 29 2003 17:31:58 GMT-0400 (Eastern Daylight Time) |
| responseHead | HTTP/1.1 200 OK<br>Date: Thu, 22 May 2003 21:32:33 GMT<br>Server: Apache/2.0.45 (Unix) mod_ssl/2.0.45 Open SSL/0.9.6g<br>Cache-Control: max-age=604800<br>Expires: Thu, 29 May 2003 21:32:33 GMT<br>Last-Modified: Thu, 22 May 2003 05:07:00 GMT<br>Etag: "3047-35-b6d5a500"<br>Accept-Ranges: bytes<br>Content-Length: 53<br>Content-Type: image/gif |

*FIG. 2L*

WEB PAGE PERFORMANCE SCORING

CROSS REFERENCE TO RELATED APPLICATIONS

This application is a divisional application of U.S. patent application Ser. No. 13/290,897, filed Nov. 7, 2011, the entirety of which is incorporated herein by this reference thereto.

U.S. patent application Ser. No. 13/290,897 is a continuation of U.S. patent application Ser. No. 12/262,054, filed Oct. 30, 2008, now U.S. Pat. No. 8,078,614, which is a continuation of U.S. patent application Ser. No. 10/887,956, filed Jul. 9, 2004, now U.S. Pat. No. 7,475,867.

BACKGROUND OF THE INVENTION

1. Technical Field

The invention relates to a global telecommunications network. More particularly, the invention relates to a tool which analyses the content and structure of Web pages in real time and produces statistics and a performance score.

2. Description of the Prior Art

Web page performance affects the quality of experience for visitors, as well as server performance requirements. Web page performance depends upon many factors, such as the number and sizes of files required to display the page, the organization of the page, the result of any modifications to the page performed by script, and the configuration of the Web server(s) hosting the content.

WebSiteOptimization.com (see FIGS. 1a-1c) offers a product which is designated Web Page Analyzer—0.82. In using this product, a user enters a URL into a field within a Web page form to invoke a script that accesses the Web page associated with the entered URL. The script calculates Web page size 11, composition 12, and download time 13. The script also calculates the size of individual elements 14 and finds the total for each type of Web page component 15. Based on these page characteristics the script then offers advice 16 derived from anecdotal evidence and prior experience on how to improve page display time.

While determining file sizes can be accomplished relatively easily, determining the actual page content, the effects of the page structure, and server configuration is more difficult. Such determination typically requires reliance upon experimental data that depends upon the availability of network connections of varying speeds, as is the case with Web Page Analyzer—0.82.

It would be advantageous to provide a Web developer with the means to determine the relative performance of a Web page quickly, without having to rely upon experimental and anecdotal data that also depend upon the availability of network connections of varying speeds.

SUMMARY OF THE INVENTION

The invention comprises a tool that provides a Web developer with the means to determine the relative performance of a Web page quickly, in real time, without having to rely upon experimental and anecdotal data that is also dependent upon the availability of network connections of varying speeds. Deployment and use of this tool as a means of measuring and enforcing coding techniques which improve Web page performance can potentially provide a competitive advantage over competitor Web sites which do not optimize their content for performance.

The presently preferred embodiment of the invention comprises a browser-based tool that loads a Web page, accesses the document object model (DOM) of the page, collects information about the page structure and parses the page, determines through the use of heuristics such factors as how much text is found on the page and the like, produces a statistical breakdown of the page, and calculates a score based on performance of the page. Key to the operation of the invention is the ability to observe operation of the Web page as it actually loads in real time, scoring the page for several of various performance factors, and producing a combined score for the various factors. It is also possible to operate the invention such that it runs without user interaction and observation, for example on a server.

BRIEF DESCRIPTION OF THE DRAWINGS

FIGS. 1a-1c illustrate a Web page report according to the state of the art;

FIGS. 2a-2l illustrate a Web page report according to the invention; and

DETAILED DESCRIPTION OF THE INVENTION

Figure 1A:
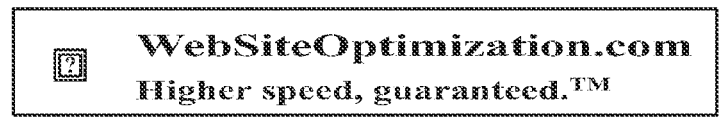

The invention comprises a tool that provides a Web developer with the means to determine the relative performance of a Web page quickly, in real time, without having to rely upon experimental and anecdotal data that is also dependent upon the availability of network connections of varying speeds. Deployment and use of this tool as a means of measuring and enforcing coding techniques which improve Web page performance can potentially provide a competitive advantage over competitor Websites which do not optimize their content for performance.

This tool can be used:

By individual Web developers to measure the relative performance of their Web pages interactively as they are being developed.

To report detailed statistics for a Web page.

As a process control measurement tool, which is run automatically, to determine performance scores for an entire Web site.

One embodiment of the Web page scoring tool disclosed herein provides a method of calculating a score which is a measure of the potential page load performance of the pages in a Web site for visitors with varying network performance characteristics.

The tool can visit either a single page, or all pages linked from a page up to a specified depth while providing scores, overall statistics, and details for each included file.

Browser Configuration

The tool is designed to be run as a Web page using a browser, such as the Netscape Gecko-based browser. In the embodiment that comprises a Netscape Gecko-based browser, XPConnect is used to obtain information from the browser's cache regarding the files included by a Web page.

Operation

The tool operation occurs in two phases:

Collecting Information; and

Reporting.

The tool must first load the page or pages to be analyzed. Once the pages have been loaded, various reports can be generated for different network and user parameters without having to load the pages again.

Collecting Information

URL

Enter the URL of the Web page or site to be analyzed.

Depth

Choose a depth for the tool to follow links from the starting URL. A depth of 0 only loads and analyzes a single page. A depth of 1 analyzes the starting page and all pages linked to from the starting page.

Restrict Urls

Choose whether to restrict Urls. Restricting Urls prevents the tool from following any link which does not begin with the starting url. For example, if the starting Url is http://cnn.com/ and all links begin with http://www.cnn.com, then the tool does not follow the links if Restrict Url is checked.

Page Timeout

Choose a page timeout value. This value (in seconds) is the time the tool waits for a page to load before timing out and entering the pause state.

If it is desired to save the parameters in the form of a Url which can be reused in the form of a hyperlink, click Save Parameters, which creates a Url in the browser's location bar which has be saved.

Click Run to start loading and analyzing the Web page(s). One may Pause, Restart, or Stop the tool.

While it is running, the tool provides feedback on which page is currently being loaded and how many pages have been loaded so far, as well as how many pages remain to be loaded.

Reporting

Once the tool has finished loading all pages, the reports can be generated. The scores reported by the tool depend upon the values entered for the network and visitor parameters. It is possible to run the reports with differing parameters without having to re-load and re-analyze the pages each time.

Network Parameters

The actual page load performance of a Web page depends upon the visitor's network connection. The network parameters allow the user to calculate scores for the various types of visitor expected, such as dialup, Cable/DSL broadband, or Satellite broadband.

Bandwidth

Enter the bandwidth (in Bytes/Second) of the visitor's connection. A typical dialup visitor using a 56 kbps modem might have a bandwidth of 4096 Bytes/Second.

Compression

Enter the modem compression factor available to the visitor. A value of 1.0 means no compression, while a factor of 0.25 means the modem is able to compress text to 25% of its original size. Cable/DSL/Satellite broadband visitors typically have no compression and this value should be set to 1.0

DNS Lookup

Enter the time in seconds for the visitor's client to perform a DNS Lookup. Typical values for dialup users are on the order of 0.5 to 1.0 second; for Cable/DSL broadband on the order of 0.1 to 0.7 second; while Satellite broadband may see values in excess of 1.5 to two seconds.

Ping Latency

Enter the time in seconds for a ping to travel from the visitor's machine to the Web server and back. Typical values for a dialup user are on the order of 0.3 seconds; Cable/DSL broadband on the order of 0.1 seconds; while Satellite broadband may see values in excess of 1.5 seconds.

Important Note regarding Satellite Broadband

Due to the high latency implicit in Satellite broadband, Web pages which score well for dialup or Cable/DSL visitors may have an extremely poor score for Satellite broadband visitors. Approximately 30 million homes in the United States, as well as many others in other countries, do not have the option of using Cable or DSL broadband. Optimizing content for Satellite broadband visitors is an important consideration.

Visitor Parameters

The perceived performance of a Web page depends upon the user's behavior, e.g. how often the visitor returns to the page, how long does the visitor spend on page before clicking on a link, and how much time they consider it reasonable for a page to load.

Revisit Time

Enter the Revisit Time (in seconds) which measures how often a visitor returns to a page. This value is used to determine which files have unexpired cache entries when the visitor returns.

Intra Page Time

Enter the IntraPage Time (in seconds) which measures how long the visitor views a page before clicking on a link. This value is used to determine which files have unexpired cache entries when visiting links and is used to calculate a score for each page a visitor may click once the original page has loaded.

Perception Time

Enter the Perception Time (in seconds) which is used to measure the impatience of a visitor. A dialup user may be more tolerable of slow loading pages than a broadband visitor. A value of ten seconds for a dialup visitor is reasonable, while a value for a Cable/DSL broadband user may be much less.

Once all reporting parameters are entered, the user can either click on Report or Save Report to generate a report. To generate multiple reports on the same Web page(s) using different parameters, simply change the report parameters and click either Report or Save Report again.

The Report button dynamically creates a report in a new window. This option is quick and simple however it does not create a window that can be saved or forwarded to another user. To save a report in a format which can be saved locally or forwarded to another user, click the Save Report button. If the user clicks the Save Report button, a hyperlink appears in the message pane when the report is ready. Click on the link to open a new window which can be saved locally, forwarded in email, etc.

Interpreting Reports

Results are not absolute and must be interpreted. What works for one visitor may not work for another. For example, a dialup user with slow download speeds but relatively fast DNS Lookup and Ping times may find that a page which uses external files for scripts and CSS performs better than one without. On the other hand, a satellite broadband user with high download speeds and slow DNS Lookups and Ping times may find that a page which uses inline Script and CSS performs much better than the equivalent page using external files. Use these reports appropriately for the site in question and expected audience.

One of the most important influences of a Web page's performance is due to the caching configuration of the Web servers. Appropriately cached files do not require network traffic and improve both the experience of dialup, as well as satellite broadband users.

Parameters

The Parameters section of the report shows the values use to calculate the scores for the pages. Individual scores must be interpreted with these parameters in mind because the same page may have widely varying scores depending upon the parameters chosen.

Page

Each page report begins with Page: url Score value. The score is the value for the total First Visit score which assumes that no files have been cached and includes the time to download all content for the page.

Page Scores

The Page Scores table provides a breakdown of the scoring for a page by First/Second visit versus Blocking/Total.

The First Visit score assumes the visitor has not been to the site before or that their cache has been emptied. The Second Visit score assumes the visitor has previously visited the page and is revisiting after the time specified by the Revisit Time parameter. Comparing First Visit to Second Visit scores can indicate the effectiveness of the caching strategies in use on the site.

First and Second Visit scores are also broken down by Blocking versus Total. The Total Score is calculated from the time required to load all files required by the page. The Blocking score is calculated solely from files which may potentially block the display of a page until they have been downloaded. Blocking scores are intended to give a measure of how quickly the user experiences some feedback that the page is loading.

Notes

The Notes section contains comments which are intended to indicate that improvements may be possible with further investigation.

Summary Statistics

The Summary Statistics section contains summary information regarding the Web page such as if the document is compressed, the total size, number of domain lookups which may be required, etc.

File Cache Data

The File Cache Data section follows the Summary Statistics section and contains detailed cache information for each file included in the Web page. The HTTP Header is in red if the date reported by the Web server are more than an hour different from the time the page was analyzed. This can be useful in ensuring that the Web server's dates are properly set.

Links

If Depth was set to greater than 0, the Link Section of the report lists each link found on the page, along with an effective score which measures the time required to load the linked page, once the original page's content has been loaded. These scores can be used to determine the benefit of caching common files across a site.

Example Reports

The following reports were generated for CNN.com using a dialup 56K modem with a 40 kbps connection using identical Visitor parameters (revisit after one day) while varying the Network parameters.

Dialup

Bandwidth 4096, Compression 0.25, DNS Lookup 1.0, Ping Latency 0.3

Web Page Scoring

Parameters

| Date Run | Tue Jul. 08 2003 13:09:31 |
| --- | --- |
| | GMT-0400 (Eastern Daylight Time) |
| Bandwidth | 4096 |
| Compression | 0.25 |
| DNS Lookup Time | 1 |
| Ping Latency | 0.3 |
| Revisit Time | 86400 |
| IntraPage Time | 60 |
| User Perception Time | 10 |

Page: http://cnn.com/ Score 5.17

Page Scores

| | Blocking | Total |
| --- | --- | --- |
| First Visit | 1.32 | 5.17 |
| Second Visit | 1.32 | 5.13 |

Notes
consider reducing redirections
consider reducing domain lookups
reduce whitespace
consider moving external scripts to inline or reducing domain lookups Summary Statistics

| Actual Load Time | 42.872 |
| --- | --- |
| Total Size | 173885 |
| Document Compressed | false |
| Redirects | 2 |
| Total Domains | 5 |
| Blocking Domains | 4 |
| Non Blocking Domains | 1 |
| Domains | cnn.com, www.cnn.com, i.cnn.net, ar.atwola.com, i.a.cnn.net |
| Extra Whitespace | 5149 |
| Inline Script Count | 6 |
| Inline Script Size | 1236 |
| External Script Count | 11 |
| External Script Size | 35033 |
| Inline Style Count | 1 |
| Inline Style Size | 110 |
| External Style Count | 3 |
| External Style Size | 25910 |
| DOM Depth | 26 |
| Table Depth | 5 | http://cnn.com/

| Size | 0 |
| --- | --- |
| Binary | false |
| Blocking | false |
| Redirected to | http://www.cnn.com/ |
| Modified | Tue Jul. 08 2003 13:08:42 GMT-0400 (Eastern Daylight Time) |
| Expires | Wed Dec. 31 1969 19:00:00 GMT-0500 (Eastern Standard Time) |
| HTTP Header | HTTP/1.1 302 Moved Temporarily |
| | Server: Netscape-Enterprise/6.1 AOL |
| | Date: Tue, 08 Jul. 2003 17:10:02 GMT |
| | Location: http://www.cnn.com/ |
| | Content-Length: 0 |
| | Content-Type: text/html | http://www.cnn.com/

| | |
|---|---|
| Size | 56730 |
| Binary | false |
| Blocking | false |
| Redirected to | |
| Modified | Tue Jul. 08 2003 13:08:52 GMT-0400 (Eastern Daylight Time) |
| Expires | Tue Jul. 08 2003 13:09:42 GMT-0400 (Eastern Daylight Time) |
| HTTP Header | HTTP/1.1 200 OK<br>Server: Netscape-Enterprise/6.1 AOL<br>Date: Tue, 08 Jul. 2003 17:10:02 GMT<br>Last-Modified: Tue, 08 Jul. 2003 17:10:00 GMT<br>Expires: Tue, 08 Jul. 2003 17:11:00 GMT<br>Cache-Control: private, max-age = 60<br>Content-Type: text/html | http://i.cnn.net/cnn/.element/ssi/css/1.0/main.css

| | |
|---|---|
| Size | 25910 |
| Binary | false |
| Blocking | true |
| Redirected to | |
| Modified | Tue Jul. 08 2003 13:08:51 GMT-0400 (Eastern Daylight Time) |
| Expires | Tue Jul. 08 2003 13:08:45 GMT-0400 (Eastern Daylight Time) |
| HTTP Header | HTTP/1.0 200 OK<br>Server: Netscape-Enterprise/6.1 AOL<br>Date: Wed, 25 Jun. 2003 15:05:51 GMT<br>Content-Type: text/css<br>Last-Modified: Wed, 25 Jun. 2003 15:04:29 GMT<br>Content-Length: 25910<br>Accept-Ranges: bytes<br>Age: 8543<br>X-Cache: HIT from i.cnn.net | http://i.cnn.net/cnn/element/ssi/js/1.0/main.js

| | |
|---|---|
| Size | 21613 |
| Binary | false |
| Blocking | true |
| Redirected to | |
| Modified | Tue Jul. 08 2003 13:08:54 GMT-0400 (Eastern Daylight Time) |
| Expires | Tue Jul. 08 2003 13:08:52 GMT-0400 (Eastern Daylight Time) |
| HTTP Header | HTTP/1.0 200 OK<br>Server: Netscape-Enterprise/6.1 AOL<br>Date: Thu, 26 Jun. 2003 03:34:13 GMT<br>Content-Type: application/x-javascript<br>Last-Modified: Mon, 17 Mar. 2003 20:13:07 GMT<br>Content-Length: 21613<br>Accept-Ranges: bytes<br>Age: 787<br>X-Cache: HIT from i.cnn.net | http://ar.atwola.com/file/adsWrapper.js

| | |
|---|---|
| Size | 6039 |
| Binary | false |
| Blocking | true |
| Redirected to | |
| Modified | Tue Jul. 08 2003 13:08:57 GMT-0400 (Eastern Daylight Time) |
| Expires | Wed Jul. 09 2003 13:08:55 GMT-0400 (Eastern Daylight Time) |
| HTTP Header | HTTP/1.1 200 OK<br>Expires: Wed, 09 Jul. 2003 17:10:11 GMT<br>Date: Tue, 08 Jul. 2003 17:10:11 GMT<br>Content-Length: 6039<br>Content-Type: application/x-javascript | http://ar.atwola.com/file/adsPopup2.js

| | |
|---|---|
| Size | 5563 |
| Binary | false |
| Blocking | true |
| Redirected to | |
| Modified | Tue Jul. 08 2003 13:08:58 GMT-0400 (Eastern Daylight Time) |
| Expires | Wed Jul. 09 2003 13:08:57 GMT-0400 (Eastern Daylight Time) |
| HTTP Header | HTTP/1.1 200 OK<br>Expires: Wed, 09 Jul. 2003 17:10:14 GMT<br>Date: Tue, 08 Jul. 2003 17:10:14 GMT<br>Content-Length: 5563<br>Content-Type: application/x-javascript | http://i.cnn.net/cnn/images/1.gif

| | |
|---|---|
| Size | 43 |
| Binary | true |
| Blocking | false |
| Redirected to | |
| Modified | Tue Jul. 08 2003 13:08:58 GMT-0400 (Eastern Daylight Time) |
| Expires | Tue Jul. 08 2003 13:08:58 GMT-0400 (Eastern Daylight Time) |
| HTTP Header | HTTP/1.0 200 OK<br>Server: Netscape-Enterprise/6.1 AOL<br>Date: Fri, 20 Jun. 2003 15:36:44 GMT<br>Content-Type: image/gif<br>Last-Modified: Tue, 27 May 2003 19:00:10 GMT<br>Content-Length: 43<br>Accept-Ranges: bytes<br>Age: 2813<br>X-Cache: HIT from i.cnn.net | http://i.a.cnn.net/cnn/.element/img/1.0/logo/cnn.gif

| | |
|---|---|
| Size | 1910 |
| Binary | true |
| Blocking | false |
| Redirected to | |
| Modified | Tue Jul. 08 2003 13:08:59 GMT-0400 (Eastern Daylight Time) |
| Expires | Tue Jul. 08 2003 14:02:08 GMT-0400 (Eastern Daylight Time) |
| HTTP Header | HTTP/1.0 200 OK<br>Server: Netscape-Enterprise/6.1 AOL<br>Content-Type: image/gif<br>Last-Modified: Mon, 09 Jun. 2003 19:48:24 GMT<br>Content-Length: 1910 |

-continued

|  |  |
|---|---|
| Accept-Ranges: | bytes |
| Cache-Control: | max-age = 3190 |
| Date: | Tue, 08 Jul. 2003 17:10:17 GMT |
| Surrogate-Server: | AkamaiGHost | http://ar.atwola.com/html/93103287/48441749/
aol?SNM=HIDBFV&width=468&height=60&target=
top&TZ=240&TVAR=class %3Dus.low&CT=I

| Size | 402 |
|---|---|
| Binary | false |
| Blocking | false |
| Redirected to | |
| Modified | Tue Jul. 08 2003 13:08:59 GMT-0400 (Eastern Daylight Time) |
| Expires | Wed Dec. 31 1969 19:00:00 GMT-0500 (Eastern Standard Time) |
| HTTP Header | HTTP/1.1 200 OK |
|  | Content-Type: text/html |
|  | Pragma: no-cache |
|  | Cache-Control: no-cache |
|  | Expires: Tue, 08 Jul. 2003 17:10:15 GMT |
|  | Date: Tue, 08 Jul. 2003 17:10:15 GMT |
|  | Content-Length: 402 | http://i.a.cnn.net/cnn/.element/img/1.0/searchbar/
bar.search.gif

| Size | 1107 |
|---|---|
| Binary | true |
| Blocking | false |
| Redirected to | |
| Modified | Tue Jul. 08 2003 13:08:59 GMT-0400 (Eastern Daylight Time) |
| Expires | Tue Jul. 08 2003 13:20:05 GMT-0400 (Eastern Daylight Time) |
| HTTP Header | HTTP/1.0 200 OK |
|  | Server: Netscape-Enterprise/6.1 AOL |
|  | Content-Type: image/gif |
|  | Last-Modified: Mon, 09 Jun. 2003 19:49:26 GMT |
|  | Content-Length: 1107 |
|  | Accept-Ranges: bytes |
|  | Surrogate-Server: AkamaiGHost, AkamaiGHost |
|  | Cache-Control: max-age = 667 |
|  | Date: Tue, 08 Jul. 2003 17:10:17 GMT | http://i.a.cnn.net/cnn/.element/img/1.0/searchbar/
bar.top.bevel.gif

| Size | 181 |
|---|---|
| Binary | true |
| Blocking | false |
| Redirected to | |
| Modified | Tue Jul. 08 2003 13:09:00 GMT-0400 (Eastern Daylight Time) |
| Expires | Tue Jul. 08 2003 13:34:50 GMT-0400 (Eastern Daylight Time) |
| HTTP Header | HTTP/1.0 200 OK |
|  | Server: Netscape-Enterprise/6.1 AOL |
|  | Content-Type: image/gif |
|  | Last-Modified: Mon, 09 Jun. 2003 19:49:26 GMT |

|  |  |
|---|---|
| Content-Length: | 181 |
| Accept-Ranges: | bytes |
| Cache-Control: | max-age = 1552 |
| Date: | Tue, 08 Jul. 2003 17:10:18 GMT |
| Surrogate-Server: | AkamaiGHost | http://i.a.cnn.net/cnn/.element/img/1.0/searchbar/
bar.right.bevel.gif

| Size | 299 |
|---|---|
| Binary | true |
| Blocking | false |
| Redirected to | |
| Modified | Tue Jul. 08 2003 13:09:00 GMT-0400 (Eastern Daylight Time) |
| Expires | Tue Jul. 08 2003 13:33:30 GMT-0400 (Eastern Daylight Time) |
| HTTP Header | HTTP/1.0 200 OK |
|  | Server: Netscape-Enterprise/6.1 AOL |
|  | Content-Type: image/gif |
|  | Last-Modified: Mon, 09 Jun. 2003 19:49:26 GMT |
|  | Content-Length: 299 |
|  | Accept-Ranges: bytes |
|  | Cache-Control: max-age = 1472 |
|  | Date: Tue, 08 Jul. 2003 17:10:18 GMT |
|  | Surrogate-Server: AkamaiGHost | http://i.a.cnn.net/cnn/.element/img/1.0/searchbar/
bar.google.gif

| Size | 1273 |
|---|---|
| Binary | true |
| Blocking | false |
| Redirected to | |
| Modified | Tue Jul. 08 2003 13:09:01 GMT-0400 (Eastern Daylight Time) |
| Expires | Tue Jul. 08 2003 13:32:54 GMT-0400 (Eastern Daylight Time) |
| HTTP Header | HTTP/1.0 200 OK |
|  | Server: Netscape-Enterprise/6.1 AOL |
|  | Content-Type: image/gif |
|  | Last-Modified: Mon, 09 Jun. 2003 19:49:26 GMT |
|  | Content-Length: 1273 |
|  | Accept-Ranges: bytes |
|  | Cache-Control: max-age = 1436 |
|  | Date: Tue, 08 Jul. 2003 17:10:18 GMT |
|  | Surrogate-Server: AkamaiGHost | http://i.a.cnn.net/cnn/.element/img/1.0/searchbar/
bar.bottom.bevelgif

| Size | 211 |
|---|---|
| Binary | true |
| Blocking | false |
| Redirected to | |
| Modified | Tue Jul. 08 2003 13:09:01 GMT-0400 (Eastern Daylight Time) |
| Expires | Tue Jul. 08 2003 13:15:13 GMT-0400 (Eastern Daylight Time) |
| HTTP Header | HTTP/1.0 200 OK |
|  | Server: Netscape-Enterprise/6.1 AOL |
|  | Content-Type: image/gif | http://i.a.cnn.net/cnn/.element/img/1.0/main/nav_at_money.gif

| | |
|---|---|
| Size | 90 |
| Binary | true |
| Blocking | false |
| Redirected to | |
| Modified | Tue Jul. 08 2003 13:09:03 GMT-0400 (Eastern Daylight Time) |
| Expires | Tue Jul. 08 2003 13:31:57 GMT-0400 (Eastern Daylight Time) |
| HTTP Header | HTTP/1.0 200 OK<br>Server: Netscape-Enterprise/6.1 AOL<br>Content-Type: image/gif<br>Last-Modified: Mon, 09 Jun. 2003 19:48:24 GMT<br>Content-Length: 90<br>Accept-Ranges: bytes<br>Cache-Control: max-age = 1379<br>Date: Tue, 08 Jul. 2003 17:10:20 GMT<br>Surrogate-Server: AkamaiGHost | http://i.a.cnn.net/cnn/.element/img/1.0/main/nav_at_si.gif

| | |
|---|---|
| Size | 82 |
| Binary | true |
| Blocking | false |
| Redirected to | |
| Modified | Tue Jul. 08 2003 13:09:05 GMT-0400 (Eastern Daylight Time) |
| Expires | Tue Jul. 08 2003 13:49:07 GMT-0400 (Eastern Daylight Time) |
| HTTP Header | HTTP/1.0 200 OK<br>Server: Netscape-Enterprise/6.1 AOL<br>Content-Type: image/gif<br>Last-Modified: Mon, 09 Jun. 2003 19:48:24 GMT<br>Content-Length: 82<br>Accept-Ranges: bytes<br>Cache-Control: max-age = 2409<br>Date: Tue, 08 Jul. 2003 17:10:20 GMT<br>Surrogate-Server: AkamaiGHost | http://ar.atwola.com/html/93166917/48441749/aol?SNM=HIDBFV&width=120&height=90&target=_top&TZ=240&TVAR=class%3Dus.low&CT=I

| | |
|---|---|
| Size | 410 |
| Binary | false |
| Blocking | false |
| Redirected to | |
| Modified | Tue Jul. 08 2003 13:09:00 GMT-0400 (Eastern Daylight Time) |
| Expires | Wed Dec. 31 1969 19:00:00 GMT-0500 (Eastern Standard Time) |
| HTTP Header | HTTP/1.1 200 OK<br>Content-Type: text/html<br>Pragma: no-cache<br>Cache-Control: no-cache<br>Expires: Tue, 08 Jul. 2003 17:10:18 GMT<br>Date: Tue, 08 Jul. 2003 17:10:18 GMT<br>Content-Length: 410 |

Last-Modified: Mon, 09 Jun. 2003 19:49:26 GMT
Content-Length: 211
Accept-Ranges: bytes
Cache-Control: max-age = 375
Date: Tue, 08 Jul. 2003 17:10:19 GMT
Surrogate-Server: AkamaiGHost http://i.a.cnn.net/cnn/.element/img/1.0/sect/SEARCH/nav.search.gif

| | |
|---|---|
| Size | 1105 |
| Binary | true |
| Blocking | false |
| Redirected to | |
| Modified | Tue Jul. 08 2003 13:09:06 GMT-0400 (Eastern Daylight Time) |
| Expires | Tue Jul. 08 2003 13:15:27 GMT-0400 (Eastern Daylight Time) |
| HTTP Header | HTTP/1.0 200 OK<br>Server: Netscape-Enterprise/6.1 AOL<br>Content-Type: image/gif<br>Last-Modified: Mon, 09 Jun. 2003 19:48:28 GMT<br>Content-Length: 1105<br>Accept-Ranges: bytes<br>Cache-Control: max-age = 389<br>Date: Tue, 08 Jul. 2003 17:10:22 GMT<br>Surrogate-Server: AkamaiGHost | http://i.cnn.net/cnn/2003/images/07/08/top.miss.meridian.gif

| | |
|---|---|
| Size | 9497 |
| Binary | true |
| Blocking | false |
| Redirected to | |
| Modified | Tue Jul. 08 2003 13:09:06 GMT-0400 (Eastern Daylight Time) |
| Expires | Tue Jul. 08 2003 13:09:00 GMT-0400 (Eastern Daylight Time) |
| HTTP Header | HTTP/1.0 200 OK<br>Server: Netscape-Enterprise/6.1 AOL<br>Date: Tue, 08 Jul. 2003 16:12:13 GMT<br>Content-Type: image/gif<br>Last-Modified: Tue, 08 Jul. 2003 16:09:13 GMT<br>Content-Length: 9497<br>Accept-Ranges: bytes<br>Age: 2162<br>X-Cache: HIT from i.cnn.net | http://i.a.cnn.net/cnn/.element/img/1.0/main/px_c00.gif

| | |
|---|---|
| Size | 43 |
| Binary | true |
| Blocking | false |
| Redirected to | |
| Modified | Tue Jul. 08 2003 13:09:08 GMT-0400 (Eastern Daylight Time) |
| Expires | Tue Jul. 08 2003 13:39:02 GMT-0400 (Eastern Daylight Time) |

-continued

| HTTP Header | HTTP/1.0 200 OK<br>Server: Netscape-Enterprise/6.1 AOL<br>Content-Type: image/gif<br>Last-Modified: Mon, 09 Jun. 2003<br>19:48:25 GMT<br>Content-Length: 43<br>Accept-Ranges: bytes<br>Cache-Control: max-age = 1804<br>Date: Tue, 08 Jul. 2003 17:10:24 GMT<br>Surrogate-Server: AkamaiGHost |
|---|---| http://i.a.cnn.net/cnn/.element/img/1.0/main/user-picks.gif

| Size | 151 |
|---|---|
| Binary | true |
| Blocking | false |
| Redirected to | |
| Modified | Tue Jul. 08 2003 13:09:10 GMT-0400 (Eastern Daylight Time) |
| Expires | Tue Jul. 08 2003 13:24:45 GMT-0400 (Eastern Daylight Time) |
| HTTP Header | HTTP/1.0 200 OK<br>Server: Netscape-Enterprise/6.1 AOL<br>Content-Type: image/gif<br>Last-Modified: Mon, 09 Jun. 2003<br>19:48:25 GMT<br>Content-Length: 151<br>Accept-Ranges: bytes<br>Cache-Control: max-age = 947<br>Date: Tue, 08 Jul. 2003 17:10:25 GMT<br>Surrogate-Server: AkamaiGHost | http://i.cnn.net/cnn/.element/img/1.0/misc/premium.gif

| Size | 74 |
|---|---|
| Binary | true |
| Blocking | false |
| Redirected to | |
| Modified | Tue Jul. 08 2003 13:08:59 GMT-0400 (Eastern Daylight Time) |
| Expires | Tue Jul. 08 2003 13:08:59 GMT-0400 (Eastern Daylight Time) |
| HTTP Header | HTTP/1.0 200 OK<br>Server: Netscape-Enterprise/6.1 AOL<br>Date: Thu, 26 Jun. 2003 03:06:00 GMT<br>Content-Type: image/gif<br>Last-Modified: Mon, 09 Jun. 2003<br>19:48:26 GMT<br>Content-Length: 74<br>Accept-Ranges: bytes<br>Age: 12938<br>X-Cache: HIT from i.cnn.net | http://i.a.cnn.net/cnn/.element/img/1.0/main/px_c-cc.gif

| Size | 43 |
|---|---|
| Binary | true |
| Blocking | false |
| Redirected to | |
| Modified | Tue Jul. 08 2003 13:09:10 GMT-0400 (Eastern Daylight Time) |

-continued

| Expires | Tue Jul. 08 2003 13:28:53 GMT-0400 (Eastern Daylight Time) |
|---|---|
| HTTP Header | HTTP/1.0 200 OK<br>Server: Netscape-Enterprise/6.1 AOL<br>Content-Type: image/gif<br>Last-Modified: Mon, 09 Jun. 2003<br>19:48:25 GMT<br>Content-Length: 43<br>Accept-Ranges: bytes<br>Cache-Control: max-age = 1195<br>Date: Tue, 08 Jul. 2003 17:10:26 GMT<br>Surrogate-Server: AkamaiGHost | http://i.a.cnn.net/cnn/.element/img/1.0/misc/audio.gif

| Size | 61 |
|---|---|
| Binary | true |
| Blocking | false |
| Redirected to | |
| Modified | Tue Jul. 08 2003 13:09:11 GMT-0400 (Eastern Daylight Time) |
| Expires | Tue Jul. 08 2003 13:23:38 GMT-0400 (Eastern Daylight Time) |
| HTTP Header | HTTP/1.0 200 OK<br>Server: Netscape-Enterprise/6.1 AOL<br>Content-Type: image/gif<br>Last-Modified: Mon, 09 Jun. 2003<br>19:48:27 GMT<br>Content-Length: 61<br>Accept-Ranges: bytes<br>Cache-Control: max-age = 880<br>Date: Tue, 08 Jul. 2003 17:10:28 GMT<br>Surrogate-Server: AkamaiGHost | http://i.a.cnn.net/cnn/images/1.gif

| Size | 43 |
|---|---|
| Binary | true |
| Blocking | false |
| Redirected to | |
| Modified | Tue Jul. 08 2003 13:09:11 GMT-0400 (Eastern Daylight Time) |
| Expires | Tue Jul. 08 2003 13:39:49 GMT-0400 (Eastern Daylight Time) |
| HTTP Header | HTTP/1.0 200 OK<br>Server: Netscape-Enterprise/6.1 AOL<br>Content-Type: image/gif<br>Last-Modified: Tue, 27 May 2003<br>19:00:10 GMT<br>Content-Length: 43<br>Accept-Ranges: bytes<br>Cache-Control: max-age = 1851<br>Date: Tue, 08 Jul. 2003 17:10:29 GMT<br>Surrogate-Server: AkamaiGHost | http://i.a.cnn.net/cnn/.element/img/1.0/main/more.video.blue.gif

| Size | 153 |
|---|---|
| Binary | true |
| Blocking | false |
| Redirected to | |
| Modified | Tue Jul. 08 2003 13:09:11 GMT-0400 (Eastern Daylight Time) |

|  |  |
|---|---|
| Expires | Tue Jul. 08 2003 13:25:02 GMT-0400 (Eastern Daylight Time) |
| HTTP Header | HTTP/1.0 200 OK<br>Server: Netscape-Enterprise/6.1 AOL<br>Content-Type: image/gif<br>Last-Modified: Mon, 09 Jun. 2003 19:48:26 GMT<br>Content-Length: 153<br>Accept-Ranges: bytes<br>Cache-Control: max-age = 964<br>Date: Tue, 08 Jul. 2003 17:10:30 GMT<br>Surrogate-Server: AkamaiGHost | http://i.a.cnn.net/cnn/images/icons/premium.gif

|  |  |
|---|---|
| Size | 74 |
| Binary | true |
| Blocking | false |
| Redirected to | |
| Modified | Tue Jul. 08 2003 13:09:12 GMT-0400 (Eastern Daylight Time) |
| Expires | Tue Jul. 08 2003 13:34:35 GMT-0400 (Eastern Daylight Time) |
| HTTP Header | HTTP/1.0 200 OK<br>Last-Modified: Wed, 13 Mar. 2002 21:19:25 GMT<br>Accept-Ranges: bytes<br>Server: Netscape-Enterprise/6.1 AOL<br>Content-Type: image/gif<br>Content-Length: 74<br>Surrogate-Server: AkamaiGHost, AkamaiGHost, AkamaiGHost<br>Cache-Control: max-age = 1537<br>Expires: Tue, 08 Jul. 2003 17:36:07 GMT<br>Date: Tue, 08 Jul. 2003 17:10:30 GMT | http://i.a.cnn.net/cnn/video/iraq/2003/07/08/ja.baghd.at.night.vs.cnn.jpg

|  |  |
|---|---|
| Size | 5388 |
| Binary | true |
| Blocking | false |
| Redirected to | |
| Modified | Tue Jul. 08 2003 13:09:13 GMT-0400 (Eastern Daylight Time) |
| Expires | Tue Jul. 08 2003 13:24:19 GMT-0400 (Eastern Daylight Time) |
| HTTP Header | HTTP/1.0 200 OK<br>Server: Netscape-Enterprise/6.1 AOL<br>Content-Type: image/jpeg<br>Last-Modified: Tue, 08 Jul. 2003 05:48:35 GMT<br>Content-Length: 5388<br>Accept-Ranges: bytes<br>Cache-Control: max-age = 921<br>Date: Tue, 08 Jul. 2003 17:10:30 GMT<br>Surrogate-Server: AkamaiGHost | http://i.a.cnn.net/cnn/.element/img/1.0/main/super-links/health.gif

|  |  |
|---|---|
| Size | 161 |
| Binary | true |
| Blocking | false |
| Redirected to | |
| Modified | Tue Jul. 08 2003 13:09:13 GMT-0400 (Eastern Daylight Time) |

|  |  |
|---|---|
| Expires | Tue Jul. 08 2003 13:32:16 GMT-0400 (Eastern Daylight Time) |
| HTTP Header | HTTP/1.0 200 OK<br>Server: Netscape-Enterprise/6.1 AOL<br>Content-Type: image/gif<br>Last-Modified: Mon, 09 Jun. 2003 19:48:25 GMT<br>Content-Length: 161<br>Accept-Ranges: bytes<br>Surrogate-Server: AkamaiGHost, AkamaiGHost<br>Cache-Control: max-age = 1398<br>Date: Tue, 08 Jul. 2003 17:10:30 GMT | http://i.a.cnn.net/cnn/2003/HEALTH/07/08/otsc.gupta/tz.gupta.jpg

|  |  |
|---|---|
| Size | 3702 |
| Binary | true |
| Blocking | false |
| Redirected to | |
| Modified | Tue Jul. 08 2003 13:09:14 GMT-0400 (Eastern Daylight Time) |
| Expires | Tue Jul. 08 2003 13:34:28 GMT-0400 (Eastern Daylight Time) |
| HTTP Header | HTTP/1.0 200 OK<br>Server: Netscape-Enterprise/6.1 AOL<br>Content-Type: image/jpeg<br>Last-Modified: Tue, 08 Jul. 2003 13:26:21 GMT<br>Content-Length: 3702<br>Accept-Ranges: bytes<br>Surrogate-Server: AkamaiGHost, AkamaiGHost<br>Cache-Control: max-age = 1530<br>Date: Tue, 08 Jul. 2003 17:10:32 GMT | http://i.a.cnn.net/cnn/.element/img/1.0/main/at_cnnmoney.gif

|  |  |
|---|---|
| Size | 559 |
| Binary | true |
| Blocking | false |
| Redirected to | |
| Modified | Tue Jul. 08 2003 13:09:14 GMT-0400 (Eastern Daylight Time) |
| Expires | Tue Jul. 08 2003 13:23:25 GMT-0400 (Eastern Daylight Time) |
| HTTP Header | HTTP/1.0 200 OK<br>Server: Netscape-Enterprise/6.1 AOL<br>Content-Type: image/gif<br>Last-Modified: Mon, 09 Jun. 2003 19:48:24 GMT<br>Content-Length: 559<br>Accept-Ranges: bytes<br>Cache-Control: max-age = 867<br>Date: Tue, 08 Jul. 2003 17:10:32 GMT<br>Surrogate-Server: AkamaiGHost | http://i.a.cnn.net/cnn/.element/img/1.0/main/business.news.blue.gif

|  |  |
|---|---|
| Size | 169 |
| Binary | true |

-continued

| | |
|---|---|
| Blocking | false |
| Redirected to | |
| Modified | Tue Jul. 08 2003 13:09:15 GMT-0400 (Eastern Daylight Time) |
| Expires | Tue Jul. 08 2003 14:00:21 GMT-0400 (Eastern Daylight Time) |
| HTTP Header | HTTP/1.0 200 OK<br>Server: Netscape-Enterprise/6.1 AOL<br>Content-Type: image/gif<br>Last-Modified: Mon, 09 Jun. 2003 19:48:25 GMT<br>Content-Length: 169<br>Accept-Ranges: bytes<br>Cache-Control: max-age = 3083<br>Date: Tue, 08 Jul. 2003 17:10:33 GMT<br>Surrogate-Server: AkamaiGHost | http://ar.atwola.com/image/93103306/aol

| | |
|---|---|
| Size | 0 |
| Binary | true |
| Blocking | false |
| Redirected to | http://ar.atwola.com/content/B0/0/H7pTL2Luf0_kw3xmlj8W1sns8a9RRNke8_SAqLzKBa609jmULHVa8jgFKtiL69KXTPCmjMkYOvM5C_xF3lKNjRbUvMSjKyxE7A6B3LIHANk$/aol |
| Modified | Tue Jul. 08 2003 13:09:00 GMT-0400 (Eastern Daylight Time) |
| Expires | Wed Dec. 31 1969 19:00:00 GMT-0500 (Eastern Standard Time) |
| HTTP Header | HTTP/1.1 302 Found<br>Pragma: no-cache<br>Cache-Control: no-cache<br>Expires: Tue, 08 Jul. 2003 17:10:16 GMT<br>Location: http://ar.atwola.com/content/B0/0/H7pTL2Luf0_kw3xmlj8W1sns8a9RRNke8_SAqLzKBa609jmULHVa8jgFKtiL69KXTPCmjMkYOvM5C_xF3lKNjRbUvMSjKyxE7A6B3LIHANk$/aol<br>P3P: CP = "CUR TAI PSA UNI COM NAV STA NOI OUR"<br>Date: Tue, 08 Jul. 2003 17:10:16 GMT<br>Content-Length: 0 | http://ar.atwola.com/content/B0/0/H7pTL2Luf0_kw3xmlj8W1sns8a9RRNke8_SAqLzKBa609jmULHVa8jgFKtiL69KXTPCmjMkYOvM5C_xF3lKNjRbUvMSjKyxE7A6B3LIHANk$/aol

| | |
|---|---|
| Size | 696 |
| Binary | false |
| Blocking | false |
| Redirected to | |
| Modified | Tue Jul. 08 2003 13:09:05 GMT-0400 (Eastern Daylight Time) |
| Expires | Fri Jul. 11 2003 13:09:00 GMT-0400 (Eastern Daylight Time) |
| HTTP Header | HTTP/1.1 200 OK<br>Last-Modified: Sat, 05 Jul. 2003 17:10:20 GMT<br>Expires: Fri, 11 Jul. 2003 17:10:20 GMT<br>Date: Tue, 08 Jul. 2003 17:10:20 GMT<br>Content-Length: 696<br>Content-Type: image/gif | http://i.cnn.net/cnn/.element/img/1.0/main/arrow_down.gif

| | |
|---|---|
| Size | 70 |
| Binary | true |
| Blocking | false |
| Redirected to | |
| Modified | Tue Jul. 08 2003 13:09:02 GMT-0400 (Eastern Daylight Time) |
| Expires | Tue Jul. 08 2003 13:09:02 GMT-0400 (Eastern Daylight Time) |
| HTTP Header | HTTP/1.0 200 OK<br>Server: Netscape-Enterprise/6.1 AOL<br>Date: Thu, 26 Jun. 2003 03:01:27 GMT<br>Content-Type: image/gif<br>Last-Modified: Mon, 09 Jun. 2003 19:43:24 GMT<br>Content-Length: 70<br>Accept-Ranges: bytes<br>Age: 1724<br>X-Cache: HIT from i.cnn.net | http://i.cnn.net/cnn/.element/img/1.0/main/arrow_up.gif

| | |
|---|---|
| Size | 70 |
| Binary | true |
| Blocking | false |
| Redirected to | |
| Modified | Tue Jul. 08 2003 13:09:06 GMT-0400 (Eastern Daylight Time) |
| Expires | Tue Jul. 08 2003 13:09:06 GMT-0400 (Eastern Daylight Time) |
| HTTP Header | HTTP/1.0 200 OK<br>Server: Netscape-Enterprise/6.1 AOL<br>Date: Sat, 21 Jun. 2003 05:12:01 GMT<br>Content-Type: image/gif<br>Last-Modified: Mon, 09 Jun. 2003 19:48:24 GMT<br>Content-Length: 70<br>Accept-Ranges: bytes<br>Age: 8558<br>X-Cache: HIT from i.cnn.net | http://i.a.cnn.net/cnn/.element/img/1.0/main/ftn.breaking.alerts.gif

| | |
|---|---|
| Size | 1919 |
| Binary | true |
| Blocking | false |
| Redirected to | |
| Modified | Tue Jul. 08 2003 13:09:15 GMT-0400 (Eastern Daylight Time) |
| Expires | Tue Jul. 08 2003 13:36:45 GMT-0400 (Eastern Daylight Time) |
| HTTP Header | HTTP/1.0 200 OK<br>Server: Netscape-Enterprise/6.1 AOL<br>Content-Type: image/gif<br>Last-Modified: Mon, 09 Jun. 2003 19:48:26 GMT<br>Content-Length: 1919<br>Accept-Ranges: bytes<br>Cache-Control: max-age = 1667<br>Date: Tue, 08 Jul. 2003 17:10:33 GMT<br>Surrogate-Server: AkamaiGHost | http://i.a.cnn.net/cnn/.element/img/1.0/main/ftn.345x32.try.timeMay03.gif

| | |
|---|---|
| Size | 2035 |
| Binary | true |
| Blocking | false |
| Redirected to | |
| Modified | Tue Jul. 08 2003 13:09:16 GMT-0400 (Eastern Daylight Time) |
| Expires | Tue Jul. 08 2003 13:18:33 GMT-0400 (Eastern Daylight Time) |
| HTTP Header | HTTP/1.0 200 OK<br>Server: Netscape-Enterprise/6.1 AOL<br>Content-Type: image/gif<br>Last-Modified: Mon, 07 Jul. 2003 20:55:34 GMT<br>Content-Length: 2035<br>Accept-Ranges: bytes<br>Cache-Control: max-age = 575<br>Date: Tue, 08 Jul. 2003 17:10:33 GMT<br>Surrogate-Server: AkamaiGHost | http://i.a.cnn.net/cnn/.element/img/1.0/main/super-links/reports.gif

| | |
|---|---|
| Size | 170 |
| Binary | true |
| Blocking | false |
| Redirected to | |
| Modified | Tue Jul. 08 2003 13:09:16 GMT-0400 (Eastern Daylight Time) |
| Expires | Tue Jul. 08 2003 13:57:16 GMT-0400 (Eastern Daylight Time) |
| HTTP Header | HTTP/1.0 200 OK<br>Server: Netscape-Enterprise/6.1 AOL<br>Content-Type: image/gif<br>Last-Modified: Mon, 09 Jun. 2003 19:48:25 GMT<br>Content-Length: 170<br>Accept-Ranges: bytes<br>Surrogate-Server: AkamaiGHost, AkamaiGHost<br>Cache-Control: max-age = 2898<br>Date: Tue, 08 Jul. 2003 17:10:34 GMT | http://i.a.cnn.net/cnn/images/programming.boxes/tz.machu.picchu.jpg

| | |
|---|---|
| Size | 1050 |
| Binary | true |
| Blocking | false |
| Redirected to | |
| Modified | Tue Jul. 08 2003 13:09:16 GMT-0400 (Eastern Daylight Time) |
| Expires | Tue Jul. 08 2003 13:19:50 GMT-0400 (Eastern Daylight Time) |
| HTTP Header | HTTP/1.0 200 OK<br>Server: Netscape-Enterprise/6.1 AOL<br>Content-Type: image/jpeg<br>Last-Modified: Mon, 07 Jul. 2003 20:35:45 GMT<br>Content-Length: 1050<br>Accept-Ranges: bytes<br>Cache-Control: max-age = 652<br>Date: Tue, 08 Jul. 2003 17:10:35 GMT<br>Surrogate-Server: AkamaiGHost | http://i.a.cnn.net/cnn/element/img/1.0/main/super-links/technology.gif

| | |
|---|---|
| Size | 186 |
| Binary | true |
| Blocking | false |
| Redirected to | |
| Modified | Tue Jul. 08 2003 13:09:17 GMT-0400 (Eastern Daylight Time) |
| Expires | Tue Jul. 08 2003 13:22:12 GMT-0400 (Eastern Daylight Time) |
| HTTP Header | HTTP/1.0 200 OK<br>Server: Netscape-Enterprise/6.1 AOL<br>Content-Type: image/gif<br>Last-Modified: Mon, 09 Jun. 2003 19:48:26 GMT<br>Content-Length: 186<br>Accept-Ranges: bytes<br>Cache-Control: max-age = 794<br>Date: Tue, 08 Jul. 2003 17:10:35 GMT<br>Surrogate-Server: AkamaiGHost | http://i.a.cnn.net/cnn/2003/TECH/ptech/07/08/pop-sci.ul.labs/tz.ul.lab.cnn.jpg

| | |
|---|---|
| Size | 1258 |
| Binary | true |
| Blocking | false |
| Redirected to | |
| Modified | Tue Jul. 08 2003 13:09:17 GMT-0400 (Eastern Daylight Time) |
| Expires | Tue Jul. 08 2003 13:25:42 GMT-0400 (Eastern Daylight Time) |
| HTTP Header | HTTP/1.0 200 OK<br>Server: Netscape-Enterprise/6.1 AOL<br>Content-Type: image/jpeg<br>Last-Modified: Tue, 08 Jul. 2003 13:47:23 GMT<br>Content-Length: 1258<br>Accept-Ranges: bytes<br>Cache-Control: max-age = 1004<br>Date: Tue, 08 Jul. 2003 17:10:35 GMT<br>Surrogate-Server: AkamaiGHost | http://i.a.cnn.net/cnn/.element/img/1.0/main/us.gif

| | |
|---|---|
| Size | 352 |
| Binary | true |
| Blocking | false |
| Redirected to | |
| Modified | Tue Jul. 08 2003 13:09:17 GMT-0400 (Eastern Daylight Time) |
| Expires | Tue Jul. 08 2003 13:25:22 GMT-0400 (Eastern Daylight Time) |
| HTTP Header | HTTP/1.0 200 OK<br>Server: Netscape-Enterprise/6.1 AOL<br>Content-Type: image/gif<br>Last-Modified: Mon, 09 Jun. 2003 19:48:25 GMT<br>Content-Length: 352<br>Accept-Ranges: bytes<br>Cache-Control: max-age = 984<br>Date: Tue, 08 Jul. 2003 17:10:35 GMT<br>Surrogate-Server: AkamaiGHost | http://i.a.cnn.net/cnn/.element/img/1.0/main/world.gif

| | |
|---|---|
| Size | 456 |
| Binary | true |
| Blocking | false |
| Redirected to | |
| Modified | Tue Jul. 08 2003 13:09:18 GMT-0400 (Eastern Daylight Time) |
| Expires | Tue Jul. 08 2003 13:57:41 GMT-0400 (Eastern Daylight Time) |
| HTTP Header | HTTP/1.0 200 OK<br>Server: Netscape-Enterprise/6.1 AOL<br>Content-Type: image/gif<br>Last-Modified: Mon, 09 Jun. 2003 19:48:25 GMT<br>Content-Length: 456<br>Accept-Ranges: bytes<br>Cache-Control: max-age = 2923<br>Date: Tue, 08 Jul. 2003 17:10:36 GMT<br>Surrogate-Server: AkamaiGHost | http://i.cnn.net/cnn/i.element/img/1.0/misc/icon.external.links.gif

| | |
|---|---|
| Size | 104 |
| Binary | true |
| Blocking | false |
| Redirected to | |
| Modified | Tue Jul. 08 2003 13:09:09 GMT-0400 (Eastern Daylight Time) |
| Expires | Tue Jul. 08 2003 13:09:09 GMT-0400 (Eastern Daylight Time) |
| HTTP Header | HTTP/1.0 200 OK<br>Server: Netscape-Enterprise/6.1 AOL<br>Date: Fri, 20 Jun. 2003 15:39:46 GMT<br>Content-Type: image/gif<br>Last-Modified: Mon, 09 Jun. 2003 19:48:26 GMT<br>Content-Length: 104<br>Accept-Ranges: bytes<br>Age: 11403<br>X-Cache: HIT from i.cnn.net | http://i.a.cnn.net/.element/img/1.0/main/technology.gif

| | |
|---|---|
| Size | 731 |
| Binary | true |
| Blocking | false |
| Redirected to | |
| Modified | Tue Jul. 08 2003 13:09:18 GMT-0400 (Eastern Daylight Time) |
| Expires | Tue Jul. 08 2003 13:32:38 GMT-0400 (Eastern Daylight Time) |
| HTTP Header | HTTP/1.0 200 OK<br>Server: Netscape-Enterprise/6.1 AOL<br>Content-Type: image/gif<br>Last-Modified: Mon, 09 Jun. 2003 19:48:25 GMT<br>Content-Length: 731<br>Accept-Ranges: bytes<br>Cache-Control: max-age = 1420<br>Date: Tue, 08 Jul. 2003 17:10:36 GMT<br>Surrogate-Server: AkamaiGHost | http://i.a.cnn.net/cnn/.element/img/1.0/main/entertainment.gif

| | |
|---|---|
| Size | 661 |
| Binary | true |
| Blocking | false |
| Redirected to | |
| Modified | Tue Jul. 08 2003 13:09:18 GMT-0400 (Eastern Daylight Time) |
| Expires | Tue Jul. 08 2003 13:42:43 GMT-0400 (Eastern Daylight Time) |
| HTTP Header | HTTP/1.0 200 OK<br>Server: Netscape-Enterprise/6.1 AOL<br>Content-Type: image/gif<br>Last-Modified: Mon, 09 Jun. 2003 19:48:24 GMT<br>Content-Length: 661<br>Accept-Ranges: bytes<br>Cache-Control: max-age = 2025<br>Date: Tue, 08 Jul. 2003 17:10:36 GMT<br>Surrogate-Server: AkamaiGHost | http://i.a.cnn.net/cnn/element/img/1.0/main/politics.gif

| | |
|---|---|
| Size | 484 |
| Binary | true |
| Blocking | false |
| Redirected to | |
| Modified | Tue Jul. 08 2003 13:09:18 GMT-0400 (Eastern Daylight Time) |
| Expires | Tue Jul. 08 2003 13:47:26 GMT-0400 (Eastern Daylight Time) |
| HTTP Header | HTTP/1.0 200 OK<br>Server: Netscape-Enterprise/6.1 AOL<br>Content-Type: image/gif<br>Last-Modified: Mon, 09 Jun. 2003 19:48:24 GMT<br>Content-Length: 484<br>Accept-Ranges: bytes<br>Cache-Control: max-age = 2308<br>Date: Tue, 08 Jul. 2003 17:10:36 GMT<br>Surrogate-Server: AkamaiGHost | http://i.a.cnn.net/cnn/.element/img/1.0/main/law.gif

| | |
|---|---|
| Size | 394 |
| Binary | true |
| Blocking | false |
| Redirected to | |
| Modified | Tue Jul. 08 2003 13:09:18 GMT-0400 (Eastern Daylight Time) |
| Expires | Tue Jul. 08 2003 13:59:39 GMT-0400 (Eastern Daylight Time) |
| HTTP Header | HTTP/1.0 200 OK<br>Server: Netscape-Enterprise/6.1 AOL<br>Content-Type: image/gif<br>Last-Modified: Mon, 09 Jun. 2003 19:48:24 GMT<br>Content-Length: 394<br>Accept-Ranges: bytes<br>Cache-Control: max-age = 3041<br>Date: Tue, 08 Jul. 2003 17:10:37 GMT<br>Surrogate-Server: AkamaiGHost | http://i.a.cnn.net/cnn/.element/img/1.0/main/health.gif

| | |
|---|---|
| Size | 448 |
| Binary | true |
| Blocking | false |
| Redirected to | |
| Modified | Tue Jul. 08 2003 13:09:19 GMT-0400 (Eastern Daylight Time) |
| Expires | Tue Jul. 08 2003 13:40:46 GMT-0400 (Eastern Daylight Time) |
| HTTP Header | HTTP/1.0 200 OK<br>Server: Netscape-Enterprise/6.1 AOL<br>Content-Type: image/gif<br>Last-Modified: Mon, 09 Jun. 2003 19:48:24 GMT<br>Content-Length: 448<br>Accept-Ranges: bytes<br>Cache-Control: max-age = 1908<br>Date: Tue, 08 Jul. 2003 17:10:37 GMT<br>Surrogate-Server: AkamaiGHost | http://i.a.cnn.net/cnn/.element/img/1.0/main/education.gif

| | |
|---|---|
| Size | 536 |
| Binary | true |
| Blocking | false |
| Redirected to | |
| Modified | Tue Jul. 08 2003 13:09:19 GMT-0400 (Eastern Daylight Time) |
| Expires | Tue Jul. 08 2003 13:16:18 GMT-0400 (Eastern Daylight Time) |
| HTTP Header | HTTP/1.0 200 OK<br>Server: Netscape-Enterprise/6.1 AOL<br>Content-Type: image/gif<br>Last-Modified: Mon, 09 Jun. 2003 19:48:24 GMT<br>Content-Length: 536<br>Accept-Ranges: bytes<br>Cache-Control: max-age = 440<br>Date: Tue, 08 Jul. 2003 17:10:38 GMT<br>Surrogate-Server: AkamaiGHost | http://i.a.cnn.net/cnn/.element/img/1.0/main/space.gif

| | |
|---|---|
| Size | 914 |
| Binary | true |
| Blocking | false |
| Redirected to | |
| Modified | Tue Jul. 08 2003 13:09:19 GMT-0400 (Eastern Daylight Time) |
| Expires | Tue Jul. 08 2003 13:28:53 GMT-0400 (Eastern Daylight Time) |
| HTTP Header | HTTP/1.0 200 OK<br>Server: Netscape-Enterprise/6.1 AOL<br>Content-Type: image/gif<br>Last-Modified: Mon, 09 Jun. 2003 19:48:24 GMT<br>Content-Length: 914<br>Accept-Ranges: bytes<br>Surrogate-Server: AkamaiGHost, AkamaiGHost<br>Cache-Control: max-age = 1195<br>Date: Tue, 08 Jul. 2003 17:10:37 GMT | http://i.a.cnn.net/cnn/.element/img/1.0/main/sports.gif

| | |
|---|---|
| Size | 452 |
| Binary | true |
| Blocking | false |
| Redirected to | |
| Modified | Tue Jul. 08 2003 13:09:20 GMT-0400 (Eastern Daylight Time) |
| Expires | Tue Jul. 08 2003 14:02:04 GMT-0400 (Eastern Daylight Time) |
| HTTP Header | HTTP/1.0 200 OK<br>Server: Netscape-Enterprise/6.1 AOL<br>Content-Type: image/gif<br>Last-Modified: Mon, 09 Jun. 2003 19:48:24 GMT<br>Content-Length: 452<br>Accept-Ranges: bytes<br>Cache-Control: max-age = 3186<br>Date: Tue, 08 Jul. 2003 17:10:38 GMT<br>Surrogate-Server: AkamaiGHost | http://i.a.cnn.net/cnn/.element/img/1.0/main/travel.gif

| | |
|---|---|
| Size | 442 |
| Binary | true |
| Blocking | false |
| Redirected to | |
| Modified | Tue Jul. 08 2003 13:09:19 GMT-0400 (Eastern Daylight Time) |
| Expires | Tue Jul. 08 2003 13:37:01 GMT-0400 (Eastern Daylight Time) |
| HTTP Header | HTTP/1.0 200 OK<br>Server: Netscape-Enterprise/6.1 AOL<br>Content-Type: image/gif<br>Last-Modified: Mon, 09 Jun. 2003 19:48:25 GMT<br>Content-Length: 442<br>Accept-Ranges: bytes<br>Surrogate-Server: AkamaiGHost, AkamaiGHost<br>Cache-Control: max-age = 1683<br>Date: Tue, 08 Jul. 2003 17:10:37 GMT | http://i.a.cnn.net/cnn/.element/img/1.0/main/business.gif

| | |
|---|---|
| Size | 515 |
| Binary | true |
| Blocking | false |
| Redirected to | |
| Modified | Tue Jul. 08 2003 13:09:20 GMT-0400 (Eastern Daylight Time) |
| Expires | Tue Jul. 08 2003 13:19:24 GMT-0400 (Eastern Daylight Time) |
| HTTP Header | HTTP/1.0 200 OK<br>Server: Netscape-Enterprise/6.1 AOL<br>Content-Type: image/gif<br>Last-Modified: Mon, 09 Jun. 2003 19:48:24 GMT<br>Content-Length: 515<br>Accept-Ranges: bytes<br>Surrogate-Server: AkamaiGHost, AkamaiGHost<br>Cache-Control: max-age = 626<br>Date: Tue, 08 Jul. 2003 17:10:38 GMT | http://i.a.cnn.net/cnn/.element/img/1.0/misc/diagonal.gif

| | |
|---|---|
| Size | 86 |
| Binary | true |
| Blocking | false |
| Redirected to | |
| Modified | Tue Jul. 08 2003 13:09:20 GMT-0400 (Eastern Daylight Time) |
| Expires | Tue Jul. 08 2003 13:43:03 GMT-0400 (Eastern Daylight Time) |
| HTTP Header | HTTP/1.0 200 OK<br>Server: Netscape-Enterprise/6.1 AOL<br>Content-Type: image/gif<br>Last-Modified: Mon, 09 Jun. 2003 19:48:27 GMT<br>Content-Length: 86<br>Accept-Ranges: bytes<br>Cache-Control: max-age = 2045<br>Date: Tue, 08 Jul. 2003 17:10:38 GMT<br>Surrogate-Server: AkamaiGHost | http://i.a.cnn.net/cnn/.element/img/1.0/main/superlinks/us.gif

| | |
|---|---|
| Size | 145 |
| Binary | true |
| Blocking | false |
| Redirected to | |
| Modified | Tue Jul. 08 2003 13:09:20 GMT-0400 (Eastern Daylight Time) |
| Expires | Tue Jul. 08 2003 13:23:54 GMT-0400 (Eastern Daylight Time) |
| HTTP Header | HTTP/1.0 200 OK<br>Server: Netscape-Enterprise/6.1 AOL<br>Content-Type: image/gif<br>Last-Modified: Mon, 09 Jun. 2003 19:48:26 GMT<br>Content-Length: 145<br>Accept-Ranges: bytes<br>Cache-Control: max-age = 896<br>Date: Tue, 08 Jul. 2003 17:10:39 GMT<br>Surrogate-Server: AkamaiGHost | http://i.a.cnn.net/cnn/.element/img/1.0/main/tv.schedule.gif

| | |
|---|---|
| Size | 161 |
| Binary | true |
| Blocking | false |
| Redirected to | |
| Modified | Tue Jul. 08 2003 13:09:20 GMT-0400 (Eastern Daylight Time) |
| Expires | Tue Jul. 08 2003 13:19:12 GMT-0400 (Eastern Daylight Time) |
| HTTP Header | HTTP/1.0 200 OK<br>Server: Netscape-Enterprise/6.1 AOL<br>Content-Type: image/gif<br>Last-Modified: Mon, 09 Jun. 2003 19:48:25 GMT<br>Content-Length: 161<br>Accept-Ranges: bytes<br>Cache-Control: max-age = 614<br>Date: Tue, 08 Jul. 2003 17:10:39 GMT<br>Surrogate-Server: AkamaiGHost | http://i.a.cnn.net/cnn/2003/US/07/08/nyt.kristof/tz.blair.jpg

| | |
|---|---|
| Size | 4091 |
| Binary | true |
| Blocking | false |
| Redirected to | |
| Modified | Tue Jul. 08 2003 13:09:22 GMT-0400 (Eastern Daylight Time) |
| Expires | Tue Jul. 08 2003 13:56:56 GMT-0400 (Eastern Daylight Time) |
| HTTP Header | HTTP/1.0 200 OK<br>Server: Netscape-Enterprise/6.1 AOL<br>Content-Type: image/jpeg<br>Last-Modified: Tue, 08 Jul. 2003 15:48:13 GMT<br>Content-Length: 4091<br>Accept-Ranges: bytes<br>Cache-Control: max-age = 2878<br>Date: Tue, 08 Jul. 2003 17:10:39 GMT<br>Surrogate-Server: AkamaiGHost | http://i.cnn.net/cnn/CNN/Programs/includes/showbox/images/paula.zahn.gif

| | |
|---|---|
| Size | 3762 |
| Binary | true |
| Blocking | false |
| Redirected to | |
| Modified | Tue Jul. 08 2003 13:09:11 GMT-0400 (Eastern Daylight Time) |
| Expires | Tue Jul. 08 2003 13:09:09 GMT-0400 (Eastern Daylight Time) |
| HTTP Header | HTTP/1.0 200 OK<br>Server: Netscape-Enterprise/6.1 AOL<br>Date: Thu, 22 May 2003 22:29:24 GMT<br>Content-Type: image/gif<br>Last-Modified: Sun, 18 Aug. 2002 18:22:27 GMT<br>Content-Length: 3762<br>Accept-Ranges: bytes<br>Age: 67768<br>X-Cache: HIT from i.cnn.net | http://i.a.cnn.net/cnn/.element/img/1.0/main/superlinks/offbeat.gif

| | |
|---|---|
| Size | 171 |
| Binary | true |
| Blocking | false |
| Redirected to | |
| Modified | Tue Jul. 08 2003 13:09:22 GMT-0400 (Eastern Daylight Time) |
| Expires | Tue Jul. 08 2003 13:42:20 GMT-0400 (Eastern Daylight Time) |
| HTTP Header | HTTP/1.0 200 OK<br>Server: Netscape-Enterprise/6.1 AOL<br>Content-Type: image/gif<br>Last-Modified: Mon, 09 Jun. 2003 19:48:26 GMT<br>Content-Length: 171<br>Accept-Ranges: bytes<br>Cache-Control: max-age = 2002<br>Date: Tue, 08 Jul. 2003 17:10:39 GMT<br>Surrogate-Server: AkamaiGHost | http://i.a.cnn.net/cnn/2003/US/Southwest/07/08/
offbeateditor.fired/tz.caddyshack.jpg

| | |
|---|---|
| Size | 2064 |
| Binary | true |
| Blocking | false |
| Redirected to | |
| Modified | Tue Jul. 08 2003 13:09:23 GMT-0400 (Eastern Daylight Time) |
| Expires | Tue Jul. 08 2003 13:53:26 GMT-0400 (Eastern Daylight Time) |
| HTTP Header | HTTP/1.0 200 OK
Server: Netscape-Enterprise/6.1 AOL
Content-Type: image/jpeg
Last-Modified: Tue, 08 Jul. 2003 16:37:42 GMT
Content-Length: 2064
Accept-Ranges: bytes
Surrogate-Server: AkamaiGHost, AkamaiGHost
Cache-Control: max-age = 2667
Date: Tue, 08 Jul. 2003 17:10:40 GMT | http://i.a.cnn.net/cnn/.element/img/1.0/main/quick-
vote.no.sponsor.gif

| | |
|---|---|
| Size | 1437 |
| Binary | true |
| Blocking | false |
| Redirected to | |
| Modified | Tue Jul. 08 2003 13:09:23 GMT-0400 (Eastern Daylight Time) |
| Expires | Tue Jul. 08 2003 13:50:00 GMT-0400 (Eastern Daylight Time) |
| HTTP Header | HTTP/1.0 200 OK
Server: Netscape-Enterprise/6.1 AOL
Content-Type: image/gif
Last-Modified: Mon, 09 Jun. 2003 19:48:26 GMT
Content-Length: 1437
Accept-Ranges: bytes
Surrogate-Server: AkamaiGHost, AkamaiGHost
Cache-Control: max-age = 2461
Date: Tue, 08 Jul. 2003 17:10:41 GMT | http://i.a.cnn.net/cnn/.element/img/1.0/main/icon_
external.gif

| | |
|---|---|
| Size | 104 |
| Binary | true |
| Blocking | false |
| Redirected to | |
| Modified | Tue Jul. 08 2003 13:09:23 GMT-0400 (Eastern Daylight Time) |
| Expires | Tue Jul. 08 2003 13:32:52 GMT-0400 (Eastern Daylight Time) |
| HTTP Header | HTTP/1.0 200 OK
Server: Netscape-Enterprise/6.1 AOL
Content-Type: image/gif
Last-Modified: Mon, 09 Jun. 2003 19:48:24 GMT
Content-Length: 104
Accept-Ranges: bytes
Cache-Control: max-age = 1433
Date: Tue, 08 Jul. 2003 17:10:41 GMT
Surrogate-Server: AkamaiGHost | http://i.a.cnn.net/cnn/.element/img/1.0/main/partner_
time.gif

| | |
|---|---|
| Size | 439 |
| Binary | true |
| Blocking | false |
| Redirected to | |
| Modified | Tue Jul. 08 2003 13:09:23 GMT-0400 (Eastern Daylight Time) |
| Expires | Tue Jul. 08 2003 13:48:52 GMT-0400 (Eastern Daylight Time) |
| HTTP Header | HTTP/1.0 200 OK
Server: Netscape-Enterprise/6.1 AOL
Content-Type: image/gif
Last-Modified: Mon, 09 Jun. 2003 19:48:25 GMT
Content-Length: 439
Accept-Ranges: bytes
Cache-Control: max-age = 2393
Date: Tue, 08 Jul. 2003 17:10:42 GMT
Surrogate-Server: AkamaiGHost | http://i.a.cnn.net/cnn/.element/img/1.0/main/partner_
si.gif

| | |
|---|---|
| Size | 973 |
| Binary | true |
| Blocking | false |
| Redirected to | |
| Modified | Tue Jul. 08 2003 13:09:24 GMT-0400 (Eastern Daylight Time) |
| Expires | Tue Jul. 08 2003 13:25:00 GMT-0400 (Eastern Daylight Time) |
| HTTP Header | HTTP/1.0 200 OK
Server: Netscape-Enterprise/6.1 AOL
Content-Type: image/gif
Last-Modified: Mon, 09 Jun. 2003 19:48:25 GMT
Content-Length: 973
Accept-Ranges: bytes
Cache-Control: max-age = 961
Date: Tue, 08 Jul. 2003 17:10:42 GMT
Surrogate-Server: AkamaiGHost | http://i.a.cnn.net/cnn/.element/img/1.0/main/partner_
fortune.gif

| | |
|---|---|
| Size | 938 |
| Binary | true |
| Blocking | false |
| Redirected to | |
| Modified | Tue Jul. 08 2003 13:09:24 GMT-0400 (Eastern Daylight Time) |
| Expires | Tue Jul. 08 2003 13:25:29 GMT-0400 (Eastern Daylight Time) |
| HTTP Header | HTTP/1.0 200 OK
Server: Netscape-Enterprise/6.1 AOL
Content-Type: image/gif
Last-Modified: Mon, 09 Jun. 2003 19:48:26 GMT
Content-Length: 938
Accept-Ranges: bytes
Surrogate-Server: AkamaiGHost, AkamaiGHost, AkamaiGHost
Cache-Control: max-age = 990
Date: Tue, 08 Jul. 2003 17:10:42 GMT | http://i.a.cnn.net/cnn/.element/img/1.0/sect/
SEARCH/dotted.line.gif

| | |
|---|---|
| Size | 69 |
| Binary | true |
| Blocking | false |
| Redirected to | |
| Modified | Tue Jul. 08 2003 13:09:24 GMT-0400 (Eastern Daylight Time) |
| Expires | Tue Jul. 08 2003 13:23:14 GMT-0400 (Eastern Daylight Time) |
| HTTP Header | HTTP/1.0 200 OK<br>Server: Netscape-Enterprise/6.1 AOL<br>Content-Type: image/gif<br>Last-Modified: Mon, 09 Jun. 2003 19:48:28 GMT<br>Content-Length: 69<br>Accept-Ranges: bytes<br>Cache-Control: max-age = 855<br>Date: Tue, 08 Jul. 2003 17:10:42 GMT<br>Surrogate-Server: AkamaiGHost | http://i.a.cnn.net/cnn/.element/img/1.0/misc/icon.ex-
ternal.links.gif

| | |
|---|---|
| Size | 104 |
| Binary | true |
| Blocking | false |
| Redirected to | |
| Modified | Tue Jul. 08 2003 13:09:24 GMT-0400 (Eastern Daylight Time) |
| Expires | Tue Jul. 08 2003 13:50:35 GMT-0400 (Eastern Daylight Time) |
| HTTP Header | HTTP/1.0 200 OK<br>Server: Netscape-Enterprise/6.1 AOL<br>Content-Type: image/gif<br>Last-Modified: Mon, 09 Jun. 2003 19:48:26 GMT<br>Content-Length: 104<br>Accept-Ranges: bytes<br>Cache-Control: max-age = 2496<br>Date: Tue, 08 Jul. 2003 17:10:43 GMT<br>Surrogate-Server: AkamaiGHost | http://ar.atwola.com/html/93103308/48441749/
aol?SNM=HIDBFV&width=88&height=31&target=
top&TZ=240&TVAR=class%3Dus.low&CT=I

| | |
|---|---|
| Size | 377 |
| Binary | false |
| Blocking | false |
| Redirected to | |
| Modified | Tue Jul. 08 2003 13:09:01 GMT-0400 (Eastern Daylight Time) |
| Expires | Wed Dec. 31 1969 19:00:00 GMT-0500 (Eastern Standard Time) |
| HTTP Header | HTTP/1.1 200 OK<br>Content-Type: text/html<br>Pragma: no-cache<br>Cache-Control: no-cache<br>Expires: Tue, 08 Jul. 2003 17:10:16 GMT<br>Date: Tue, 08 Jul. 2003 17:10:16 GMT<br>Content-Length: 377 | http://i.a.cnn.net/cnn/.element/img/1.0/main/icon_
premium.gif

| | |
|---|---|
| Size | 74 |
| Binary | true |
| Blocking | false |
| Redirected to | |
| Modified | Tue Jul. 08 2003 13:09:24 GMT-0400 (Eastern Daylight Time) |
| Expires | Tue Jul. 08 2003 13:37:32 GMT-0400 (Eastern Daylight Time) |
| HTTP Header | HTTP/1.0 200 OK<br>Server: Netscape-Enterprise/6.1 AOL<br>Content-Type: image/gif<br>Last-Modified: Mon, 09 Jun. 2003 19:48:24 GMT<br>Content-Length: 74<br>Accept-Ranges: bytes<br>Cache-Control: max-age = 1713<br>Date: Tue, 08 Jul. 2003 17:10:43 GMT<br>Surrogate-Server: AkamaiGHost | http://ar.atwola.com/html/93137910/48441749/
aol?SNM=HIDBFV&width=101&height=1&target=
top&TZ=240&TVAR=class%3Dus.low&CT=J&hw=
docw

| | |
|---|---|
| Size | 267 |
| Binary | False |
| Blocking | true |
| Redirected to | |
| Modified | Tue Jul. 08 2003 13:09:02 GMT-0400 (Eastern Daylight Time) |
| Expires | Wed Dec. 31 1969 19:00:00 GMT-0500 (Eastern Standard Time) |
| HTTP Header | HTTP/1.1 200 OK<br>Content-Type: application/x-javascript<br>Pragma: no-cache<br>Cache-Control: no-cache<br>Expires: Tue, 08 Jul. 2003 17:10:19 GMT<br>Date: Tue, 08 Jul. 2003 17:10:19 GMT<br>Content-Length: 267 | http://ar.atwola.com/file/adsEnd.js

| | |
|---|---|
| Size | 1551 |
| Binary | false |
| Blocking | true |
| Redirected to | |
| Modified | Tue Jul. 08 2003 13:09:11 GMT-0400 (Eastern Daylight Time) |
| Expires | Wed Jul. 09 2003 13:09:02 GMT-0400 (Eastern Daylight Time) |
| HTTP Header | HTTP/1.1 200 OK<br>Expires: Wed, 09 Jul. 2003 17:10:27 GMT<br>Date: Tue, 08 Jul. 2003 17:10:27 GMT<br>Content-Length: 1551<br>Content-Type: application/x-javascript | http://www.cnn.com/cookie.crumb

| | |
|---|---|
| Size | 43 |
| Binary | true |

-continued

| | |
|---|---|
| Blocking | false |
| Redirected to | |
| Modified | Tue Jul. 08 2003 13:09:14 GMT-0400 (Eastern Daylight Time) |
| Expires | Wed Dec. 31 1969 19:00:00 GMT-0500 (Eastern Standard Time) |
| HTTP Header | HTTP/1.1 200 OK |
| | Server: Netscape-Enterprise/6.1 AOL |
| | Date: Tue, 08 Jul. 2003 17:10:31 GMT |
| | Content-Length: 43 |
| | Content-Type: image/gif |

Links

| URL | Total Score |
|---|---|

Cable

Bandwidth 40960, Compression 1.0, DNS Lookup 1.0, Ping Latency 0.1

Web Page Scoring

Parameters

| | |
|---|---|
| Date Run | Tue Jul. 08 2003 13:11:13 GMT-0400 (Eastern Daylight Time) |
| Bandwidth | 40960 |
| Compression | 1 |
| DNS Lookup Time | 1 |
| Ping Latency | 0.1 |
| Revisit Time | 86400 |
| IntraPage Time | 60 |
| User Perception Time | 10 |

Page: http://cnn.com/ Score 2

Page Scores

| | Blocking | Total |
|---|---|---|
| First Visit | 0.76 | 2 |
| Second Visit | 0.76 | 1.98 |

Notes
consider reducing redirections
consider reducing domain lookups
consider moving external scripts to inline or reducing domain lookups
consider moving external css to inline or reducing domain lookups
first visit: blocking latency dominates size
second visit: blocking latency dominates size

Summary Statistics

| | |
|---|---|
| Actual Load Time | 42.872 |
| Total Size | 173885 |
| Document Compressed | false |
| Redirects | 2 |
| Total Domains | 5 |
| Blocking Domains | 4 |
| Non Blocking Domains | 1 |

-continued

| | |
|---|---|
| Domains | cnn.com, www.cnn.com, i.cnn.net, ar.atwola.com, i.a.cnn.net |
| Extra Whitespace | 5149 |
| Inline Script Count | 6 |
| Inline Script Size | 1236 |
| External Script Count | 11 |
| External Script Size | 35033 |
| Inline Style Count | 1 |
| Inline Style Size | 110 |
| External Style Count | 3 |
| External Style Size | 25910 |
| DOM Depth | 26 |
| Table Depth | 5 | http://cnn.com/

| | |
|---|---|
| Size | 0 |
| Binary | false |
| Blocking | false |
| Redirected to | http://www.cnn.com/ |
| Modified | Tue Jul. 08 2003 13:08:42 GMT-0400 (Eastern Daylight Time) |
| Expires | Wed Dec. 31 1969 19:00:00 GMT-0500 (Eastern Standard Time) |
| HTTP Header | HTTP/1.1 302 Moved Temporarily |
| | Server: Netscape-Enterprise/6.1 AOL |
| | Date: Tue, 08 Jul. 2003 17:10:02 GMT |
| | Location: http://www.cnn.com/ |
| | Content-Length: 0 |
| | Content-Type: text/html | http://www.cnn.com/

| | |
|---|---|
| Size | 56730 |
| Binary | false |
| Blocking | false |
| Redirected to | |
| Modified | Tue Jul. 08 2003 13:08:52 GMT-0400 (Eastern Daylight Time) |
| Expires | Tue Jul. 08 2003 13:09:42 GMT-0400 (Eastern Daylight Time) |
| HTTP Header | HTTP/1.1 200 OK |
| | Server: Netscape-Enterprise/6.1 AOL |
| | Date: Tue, 08 Jul. 2003 17:10:02 GMT |
| | Last-Modified: Tue, 08 Jul. 2003 17:10:00 GMT |
| | Expires: Tue, 08 Jul. 2003 17:11:00 GMT |
| | Cache-Control: private, max-age = 60 |
| | Content-Type: text/html | http://i.cnn.net/cnn/.element/ssi/css/1.0/main.css

| | |
|---|---|
| Size | 25910 |
| Binary | false |
| Blocking | true |
| Redirected to | |
| Modified | Tue Jul. 08 2003 13:08:51 GMT-0400 (Eastern Daylight Time) |
| Expires | Tue Jul. 08 2003 13:08:45 GMT-0400 (Eastern Daylight Time) |
| HTTP Header | HTTP/1.0 200 OK |
| | Server: Netscape-Enterprise/6.1 AOL |
| | Date: Wed, 25 Jun. 2003 15:05:51 GMT |
| | Content-Type: text/css |
| | Last-Modified: Wed, 25 Jun. 2003 |

-continued

15:04:29 GMT
Content-Length: 25910
Accept-Ranges: bytes
Age: 8543
X-Cache: HIT from i.cnn.net http://i.cnn.net/cnn/.element/ssi/js/1.0/main.js

| | |
|---|---|
| Size | 21613 |
| Binary | false |
| Blocking | true |
| Redirected to | |
| Modified | Tue Jul. 08 2003 13:08:54 GMT-0400 (Eastern Daylight Time) |
| Expires | Tue Jul. 08 2003 13:08:52 GMT-0400 (Eastern Daylight Time) |
| HTTP Header | HTTP/1.0 200 OK
Server: Netscape-Enterprise/6.1 AOL
Date: Thu, 26 Jun. 2003 03:34:13 GMT
Content-Type: application/x-javascript
Last-Modified: Mon, 17 Mar. 2003 20:13:07 GMT
Content-Length: 21613
Accept-Ranges: bytes
Age: 787
X-Cache: HIT from i.cnn.net | http://ar.atwola.com/file/adsWrapper.js

| | |
|---|---|
| Size | 6039 |
| Binary | false |
| Blocking | true |
| Redirected to | |
| Modified | Tue Jul. 08 2003 13:08:57 GMT-0400 (Eastern Daylight Time) |
| Expires | Wed Jul. 09 2003 13:08:55 GMT-0400 (Eastern Daylight Time) |
| HTTP Header | HTTP/1.1 200 OK
Expires: Wed, 09 Jul. 2003 17:10:11 GMT
Date: Tue, 08 Jul. 2003 17:10:11 GMT
Content-Length: 6039
Content-Type: application/x-javascript | http://ar.atwola.com/file/adsPopup2.js

| | |
|---|---|
| Size | 5563 |
| Binary | false |
| Blocking | true |
| Redirected to | |
| Modified | Tue Jul. 08 2003 13:08:58 GMT-0400 (Eastern Daylight Time) |
| Expires | Wed Jul. 09 2003 13:08:57 GMT-0400 (Eastern Daylight Time) |
| HTTP Header | HTTP/1.1 200 OK
Expires: Wed, 09 Jul. 2003 17:10:14 GMT
Date: Tue, 08 Jul. 2003 17:10:14 GMT
Content-Length: 5563
Content-Type: application/x-javascript | http://i.cnn.net/cnn/images/1.gif

| | |
|---|---|
| Size | 43 |
| Binary | true |
| Blocking | false |
| Redirected to | |
| Modified | Tue Jul. 08 2003 13:08:58 GMT-0400 (Eastern Daylight Time) |
| Expires | Tue Jul. 08 2003 13:08:58 GMT-0400 (Eastern Daylight Time) |
| HTTP Header | HTTP/1.0 200 OK
Server: Netscape-Enterprise/6.1 AOL
Date: Fri, 20 Jun. 2003 15:36:44 GMT
Content-Type: image/gif
Last-Modified: Tue, 27 May 2003 19:00:10 GMT
Content-Length: 43
Accept-Ranges: bytes
Age: 2813
X-Cache: HIT from i.cnn.net | http://i.a.cnn.net/cnn/.element/img/1.0/logo/cnn.gif

| | |
|---|---|
| Size | 1910 |
| Binary | true |
| Blocking | false |
| Redirected to | |
| Modified | Tue Jul. 08 2003 13:08:59 GMT-0400 (Eastern Daylight Time) |
| Expires | Tue Jul. 08 2003 14:02:08 GMT-0400 (Eastern Daylight Time) |
| HTTP Header | HTTP/1.0 200 OK
Server: Netscape-Enterprise/6.1 AOL
Content-Type: image/gif
Last-Modified: Mon, 09 Jun. 2003 19:48:24 GMT
Content-Length: 1910
Accept-Ranges: bytes
Cache-Control: max-age = 3190
Date: Tue, 08 Jul. 2003 17:10:17 GMT
Surrogate-Server: AkamaiGHost | http://ar.atwola.com/html/93103287/48441749/
aol?SNM=HIDBFV&width=468&height=60&target=_
top&TZ=240&TVAR=class%3Dus.low&CT=I

| | |
|---|---|
| Size | 402 |
| Binary | false |
| Blocking | false |
| Redirected to | |
| Modified | Tue Jul. 08 2003 13:08:59 GMT-0400 (Eastern Daylight Time) |
| Expires | Wed Dec. 31 1969 19:00:00 GMT-0500 (Eastern Standard Time) |
| HTTP Header | HTTP/1.1 200 OK
Content-Type: text/html
Pragma: no-cache
Cache-Control: no-cache
Expires: Tue, 08 Jul. 2003 17:10:15 GMT
Date: Tue, 08 Jul. 2003 17:10:15 GMT
Content-Length: 402 | http://i.a.cnn.net/cnn/.element/img/1.0/searchbar/
bar.search.gif

| | |
|---|---|
| Size | 1107 |
| Binary | true |
| Blocking | false |
| Redirected to | |
| Modified | Tue Jul. 08 2003 13:08:59 GMT-0400 (Eastern Daylight Time) |
| Expires | Tue Jul. 08 2003 13:20:05 GMT-0400 (Eastern Daylight Time) |
| HTTP Header | HTTP/1.0 200 OK<br>Server: Netscape-Enterprise/6.1 AOL<br>Content-Type: image/gif<br>Last-Modified: Mon, 09 Jun. 2003 19:49:26 GMT<br>Content-Length: 1107<br>Accept-Ranges: bytes<br>Surrogate-Server: AkamaiGHost, AkamaiGHost<br>Cache-Control: max-age = 667<br>Date: Tue, 08 Jul. 2003 17:10:17 GMT | http://i.a.cnn.net/cnn/.element/img/1.0/searchbar/
bar.google.gif

| | |
|---|---|
| Size | 1273 |
| Binary | true |
| Blocking | false |
| Redirected to | |
| Modified | Tue Jul. 08 2003 13:09:01 GMT-0400 (Eastern Daylight Time) |
| Expires | Tue Jul. 08 2003 13:32:54 GMT-0400 (Eastern Daylight Time) |
| HTTP Header | HTTP/1.0 200 OK<br>Server: Netscape-Enterprise/6.1 AOL<br>Content-Type: image/gif<br>Last-Modified: Mon, 09 Jun. 2003 19:49:26 GMT<br>Content-Length: 1273<br>Accept-Ranges: bytes<br>Cache-Control: max-age = 1436<br>Date: Tue, 08 Jul. 2003 17:10:18 GMT<br>Surrogate-Server: AkamaiGHost | http://i.a.cnn.net/cnn/.element/img/1.0/searchbar/
bar.top.bevel.gif

| | |
|---|---|
| Size | 181 |
| Binary | true |
| Blocking | false |
| Redirected to | |
| Modified | Tue Jul. 08 2003 13:09:00 GMT-0400 (Eastern Daylight Time) |
| Expires | Tue Jul. 08 2003 13:34:50 GMT-0400 (Eastern Daylight Time) |
| HTTP Header | HTTP/1.0 200 OK<br>Server: Netscape-Enterprise/6.1 AOL<br>Content-Type: image/gif<br>Last-Modified: Mon, 09 Jun. 2003 19:49:26 GMT<br>Content-Length: 181<br>Accept-Ranges: bytes<br>Cache-Control: max-age = 1552<br>Date: Tue, 08 Jul. 2003 17:10:18 GMT<br>Surrogate-Server: AkamaiGHost | http://i.a.cnn.net/cnn/.element/img/1.0/searchbar/
bar.bottom.bevel.gif

| | |
|---|---|
| Size | 211 |
| Binary | true |
| Blocking | false |
| Redirected to | |
| Modified | Tue Jul. 08 2003 13:09:01 GMT-0400 (Eastern Daylight Time) |
| Expires | Tue Jul. 08 2003 13:15:13 GMT-0400 (Eastern Daylight Time) |
| HTTP Header | HTTP/1.0 200 OK<br>Server: Netscape-Enterprise/6.1 AOL<br>Content-Type: image/gif<br>Last-Modified: Mon, 09 Jun. 2003 19:49:26 GMT<br>Content-Length: 211<br>Accept-Ranges: bytes<br>Cache-Control: max-age = 375<br>Date: Tue, 08 Jul. 2003 17:10:19 GMT<br>Surrogate-Server: AkamaiGHost | http://i.a.cnn.net/cnn/.element/img/1.0/searchbar/
bar.right.bevel.gif

| | |
|---|---|
| Size | 299 |
| Binary | true |
| Blocking | false |
| Redirected to | |
| Modified | Tue Jul. 08 2003 13:09:00 GMT-0400 (Eastern Daylight Time) |
| Expires | Tue Jul. 08 2003 13:33:30 GMT-0400 (Eastern Daylight Time) |
| HTTP Header | HTTP/1.0 200 OK<br>Server: Netscape-Enterprise/6.1 AOL<br>Content-Type: image/gif<br>Last-Modified: Mon, 09 Jun. 2003 19:49:26 GMT<br>Content-Length: 299<br>Accept-Ranges: bytes<br>Cache-Control: max-age = 1472<br>Date: Tue, 08 Jul. 2003 17:10:18 GMT<br>Surrogate-Server: AkamaiGHost | http://i.a.cnn.net/cnn/.element/img/1.0/main/nav_at_
money.gif

| | |
|---|---|
| Size | 90 |
| Binary | true |
| Blocking | false |
| Redirected to | |
| Modified | Tue Jul. 08 2003 13:09:03 GMT-0400 (Eastern Daylight Time) |
| Expires | Tue Jul. 08 2003 13:31:57 GMT-0400 (Eastern Daylight Time) |
| HTTP Header | HTTP/1.0 200 OK<br>Server: Netscape-Enterprise/6.1 AOL<br>Content-Type: image/gif<br>Last-Modified: Mon, 09 Jun. 2003 19:48:24 GMT<br>Content-Length: 90<br>Accept-Ranges: bytes<br>Cache-Control: max-age = 1379<br>Date: Tue, 08 Jul. 2003 17:10:20 GMT<br>Surrogate-Server: AkamaiGHost | http://i.a.cnn.net/cnn/.element/img/1.0/main/nav_at_si.gif

| | |
|---|---|
| Size | 82 |
| Binary | true |
| Blocking | false |
| Redirected to | |
| Modified | Tue Jul. 08 2003 13:09:05 GMT-0400 (Eastern Daylight Time) |
| Expires | Tue Jul. 08 2003 13:49:07 GMT-0400 (Eastern Daylight Time) |
| HTTP Header | HTTP/1.0 200 OK<br>Server: Netscape-Enterprise/6.1 AOL<br>Content-Type: image/gif<br>Last-Modified: Mon, 09 Jun. 2003 19:48:24 GMT<br>Content-Length: 82<br>Accept-Ranges: bytes<br>Cache-Control: max-age = 2409<br>Date: Tue, 08 Jul. 2003 17:10:20 GMT<br>Surrogate-Server: AkamaiGHost | http://ar.atwola.com/html/93166917/48441749/aol?SNM=HIDBFV&width=120&height=90&target=top&TZ=240&TVAR=class%3Dus.low&CT=I

| | |
|---|---|
| Size | 410 |
| Binary | false |
| Blocking | false |
| Redirected to | |
| Modified | Tue Jul. 08 2003 13:09:00 GMT-0400 (Eastern Daylight Time) |
| Expires | Wed Dec. 31 1969 19:00:00 GMT-0500 (Eastern Standard Time) |
| HTTP Header | HTTP/1.1 200 OK<br>Content-Type: text/html<br>Pragma: no-cache<br>Cache-Control: no-cache<br>Expires: Tue, 08 Jul. 2003 17:10:18 GMT<br>Date: Tue, 08 Jul. 2003 17:10:18 GMT<br>Content-Length: 410 | http://i.a.cnn.net/cnn/.element/img/1.0/sect/SEARCH/nav.search.gif

| | |
|---|---|
| Size | 1105 |
| Binary | true |
| Blocking | false |
| Redirected to | |
| Modified | Tue Jul. 08 2003 13:09:06 GMT-0400 (Eastern Daylight Time) |
| Expires | Tue Jul. 08 2003 13:15:27 GMT-0400 (Eastern Daylight Time) |
| HTTP Header | HTTP/1.0 200 OK<br>Server: Netscape-Enterprise/6.1 AOL<br>Content-Type: image/gif<br>Last-Modified: Mon, 09 Jun. 2003 19:48:28 GMT<br>Content-Length: 1105<br>Accept-Ranges: bytes<br>Cache-Control: max-age = 389<br>Date: Tue, 08 Jul. 2003 17:10:22 GMT<br>Surrogate-Server: AkamaiGHost | http://i.cnn.net/cnn/2003/images/07/08/top.miss.meridian.gif

| | |
|---|---|
| Size | 9497 |
| Binary | true |
| Blocking | false |
| Redirected to | |
| Modified | Tue Jul. 08 2003 13:09:06 GMT-0400 (Eastern Daylight Time) |
| Expires | Tue Jul. 08 2003 13:09:00 GMT-0400 (Eastern Daylight Time) |
| HTTP Header | HTTP/1.0 200 OK<br>Server: Netscape-Enterprise/6.1 AOL<br>Date: Tue, 08 Jul. 2003 16:12:13 GMT<br>Content-Type: image/gif<br>Last-Modified: Tue, 08 Jul. 2003 16:09:13 GMT<br>Content-Length: 9497<br>Accept-Ranges: bytes<br>Age: 2162<br>X-Cache: HIT from i.cnn.net | http://i.a.cnn.net/cnn/.element/img/1.0/main/px_c00.gif

| | |
|---|---|
| Size | 43 |
| Binary | true |
| Blocking | false |
| Redirected to | |
| Modified | Tue Jul. 08 2003 13:09:08 GMT-0400 (Eastern Daylight Time) |
| Expires | Tue Jul. 08 2003 13:39:02 GMT-0400 (Eastern Daylight Time) |
| HTTP Header | HTTP/1.0 200 OK<br>Server: Netscape-Enterprise/6.1 AOL<br>Content-Type: image/gif<br>Last-Modified: Mon, 09 Jun. 2003 19:48:25 GMT<br>Content-Length: 43<br>Accept-Ranges: bytes<br>Cache-Control: max-age = 1804<br>Date: Tue, 08 Jul. 2003 17:10:24 GMT<br>Surrogate-Server: AkamaiGHost | http://i.a.cnn.net/cnn/.element/img/1.0/main/user-picks.gif

| | |
|---|---|
| Size | 151 |
| Binary | true |
| Blocking | false |
| Redirected to | |
| Modified | Tue Jul. 08 2003 13:09:10 GMT-0400 (Eastern Daylight Time) |
| Expires | Tue Jul. 08 2003 13:24:45 GMT-0400 (Eastern Daylight Time) |
| HTTP Header | HTTP/1.0 200 OK<br>Server: Netscape-Enterprise/6.1 AOL<br>Content-Type: image/gif<br>Last-Modified: Mon, 09 Jun. 2003 19:48:25 GMT<br>Content-Length: 151<br>Accept-Ranges: bytes<br>Cache-Control: max-age = 947<br>Date: Tue, 08 Jul. 2003 17:10:25 GMT<br>Surrogate-Server: AkamaiGHost | http://i.cnn.net/cnn/.element/img/1.0/misc/premium.gif

| | |
|---|---|
| Size | 74 |
| Binary | true |
| Blocking | false |
| Redirected to | |
| Modified | Tue Jul. 08 2003 13:08:59 GMT-0400 (Eastern Daylight Time) |
| Expires | Tue Jul. 08 2003 13:08:59 GMT-0400 (Eastern Daylight Time) |
| HTTP Header | HTTP/1.0 200 OK<br>Server: Netscape-Enterprise/6.1 AOL<br>Date: Thu, 26 Jun. 2003 03:06:00 GMT<br>Content-Type: image/gif<br>Last-Modified: Mon, 09 Jun. 2003 19:48:26 GMT<br>Content-Length: 74<br>Accept-Ranges: bytes<br>Age: 12938<br>X-Cache: HIT from i.cnn.net | http://i.a.cnn.net/cnn/.element/img/1.0/main/px_ccc.gif

| | |
|---|---|
| Size | 43 |
| Binary | true |
| Blocking | false |
| Redirected to | |
| Modified | Tue Jul. 08 2003 13:09:10 GMT-0400 (Eastern Daylight Time) |
| Expires | Tue Jul. 08 2003 13:28:53 GMT-0400 (Eastern Daylight Time) |
| HTTP Header | HTTP/1.0 200 OK<br>Server: Netscape-Enterprise/6.1 AOL<br>Content-Type: image/gif<br>Last-Modified: Mon, 09 Jun. 2003 19:48:25 GMT<br>Content-Length: 43<br>Accept-Ranges: bytes<br>Cache-Control: max-age = 1195<br>Date: Tue, 08 Jul. 2003 17:10:26 GMT<br>Surrogate-Server: AkamaiGhost | http://i.a.cnn.net/cnn/.element/img/1.0/misc/audio.gif

| | |
|---|---|
| Size | 61 |
| Binary | true |
| Blocking | false |
| Redirected to | |
| Modified | Tue Jul. 08 2003 13:09:11 GMT-0400 (Eastern Daylight Time) |
| Expires | Tue Jul. 08 2003 13:23:38 GMT-0400 (Eastern Daylight Time) |
| HTTP Header | HTTP/1.0 200 OK<br>Server: Netscape-Enterprise/6.1 AOL<br>Content-Type: image/gif<br>Last-Modified: Mon, 09 Jun. 2003 19:43:27 GMT<br>Content-Length: 61<br>Accept-Ranges: bytes<br>Cache-Control: max-age = 880<br>Date: Tue, 08 Jul. 2003 17:10:28 GMT<br>Surrogate-Server: AkamaiGHost | http://i.a.cnn.net/cnn/images/1.gif

| | |
|---|---|
| Size | 43 |
| Binary | true |
| Blocking | false |
| Redirected to | |
| Modified | Tue Jul. 08 2003 13:09:11 GMT-0400 (Eastern Daylight Time) |
| Expires | Tue Jul. 08 2003 13:39:49 GMT-0400 (Eastern Daylight Time) |
| HTTP Header | HTTP/1.0 200 OK<br>Server: Netscape-Enterprise/6.1 AOL<br>Content-Type: image/gif<br>Last-Modified: Tue, 27 May 2003 19:00:10 GMT<br>Content-Length: 43<br>Accept-Ranges: bytes<br>Cache-Control: max-age = 1851<br>Date: Tue, 08 Jul. 2003 17:10:29 GMT<br>Surrogate-Server: AkamaiGHost | http://i.a.cnn.net/cnn/.element/img/1.0/main/more.video.blue.gif

| | |
|---|---|
| Size | 153 |
| Binary | true |
| Blocking | false |
| Redirected to | |
| Modified | Tue Jul. 08 2003 13:09:11 GMT-0400 (Eastern Daylight Time) |
| Expires | Tue Jul. 08 2003 13:25:02 GMT-0400 (Eastern Daylight Time) |
| HTTP Header | HTTP/1.0 200 OK<br>Server: Netscape-Enterprise/6.1 AOL<br>Content-Type: image/gif<br>Last-Modified: Mon, 09 Jun. 2003 19:48:26 GMT<br>Content-Length: 153<br>Accept-Ranges: bytes<br>Cache-Control: max-age = 964<br>Date: Tue, 08 Jul. 2003 17:10:30 GMT<br>Surrogate-Server: AkamaiGHost | http://i.a.cnn.net/cnn/images/icons/premium.gif

| | |
|---|---|
| Size | 74 |
| Binary | true |
| Blocking | false |
| Redirected to | |
| Modified | Tue Jul. 08 2003 13:09:12 GMT-0400 (Eastern Daylight Time) |
| Expires | Tue Jul. 08 2003 13:34:35 GMT-0400 (Eastern Daylight Time) |
| HTTP Header | HTTP/1.0 200 OK<br>Last-Modified: Wed, 13 Mar 2002 21:19:25 GMT<br>Accept-Ranges: bytes<br>Server: Netscape-Enterprise/6.1 AOL<br>Content-Type: image/gif<br>Content-Length: 74<br>Surrogate-Server: AkamaiGHost, AkamaiGHost, AkamaiGHost<br>Cache-Control: max-age = 1537<br>Expires: Tue, 08 Jul. 2003 17:36:07 GMT<br>Date: Tue, 08 Jul. 2003 17:10:30 GMT | http://i.a.cnn.net/cnn/video/iraq/2003/07/08/ja.
baghd.at.night.vs.cnn.jpg

| | |
|---|---|
| Size | 5388 |
| Binary | true |
| Blocking | false |
| Redirected to | |
| Modified | Tue Jul. 08 2003 13:09:13 GMT-0400 (Eastern Daylight Time) |
| Expires | Tue Jul. 08 2003 13:24:19 GMT-0400 (Eastern Daylight Time) |
| HTTP Header | HTTP/1.0 200 OK<br>Server: Netscape-Enterprise/6.1 AOL<br>Content-Type: image/jpeg<br>Last-Modified: Tue, 08 Jul. 2003 05:48:35 GMT<br>Content-Length: 5388<br>Accept-Ranges: bytes<br>Cache-Control: max-age = 921<br>Date: Tue, 08 Jul. 2003 17:10:30 GMT<br>Surrogate-Server: AkamaiGHost | http://i.a.cnn.net/cnn/.element/img/1.0/main/super-
links/health.gif

| | |
|---|---|
| Size | 161 |
| Binary | true |
| Blocking | false |
| Redirected to | |
| Modified | Tue Jul. 08 2003 13:09:13 GMT-0400 (Eastern Daylight Time) |
| Expires | Tue Jul. 08 2003 13:32:16 GMT-0400 (Eastern Daylight Time) |
| HTTP Header | HTTP/1.0 200 OK<br>Server: Netscape-Enterprise/6.1 AOL<br>Content-Type: image/gif<br>Last-Modified: Mon, 09 Jun. 2003 19:48:25 GMT<br>Content-Length: 161<br>Accept-Ranges: bytes<br>Surrogate-Server: AkamaiGHost, AkamaiGHost<br>Cache-Control: max-age = 1398<br>Date: Tue, 08 Jul. 2003 17:10:30 GMT | http://i.a.cnn.net/cnn/2003/HEALTH/07/08/
otsc.gupta/tz.gupta.jpg

| | |
|---|---|
| Size | 3702 |
| Binary | true |
| Blocking | false |
| Redirected to | |
| Modified | Tue Jul. 08 2003 13:09:14 GMT-0400 (Eastern Daylight Time) |
| Expires | Tue Jul. 08 2003 13:34:28 GMT-0400 (Eastern Daylight Time) |
| HTTP Header | HTTP/1.0 200 OK<br>Server: Netscape-Enterprise/6.1 AOL<br>Content-Type: image/jpeg<br>Last-Modified: Tue, 08 Jul. 2003 13:26:21 GMT<br>Content-Length: 3702<br>Accept-Ranges: bytes<br>Surrogate-Server: AkamaiGHost, AkamaiGHost<br>Cache-Control: max-age = 1530<br>Date: Tue, 08 Jul. 2003 17:10:32 GMT | http://i.a.cnn.net/cnn/.element/img/1.0/main/at_
cnnmoney.gif

| | |
|---|---|
| Size | 559 |
| Binary | true |
| Blocking | false |
| Redirected to | |
| Modified | Tue Jul. 08 2003 13:09:14 GMT-0400 (Eastern Daylight Time) |
| Expires | Tue Jul. 08 2003 13:23:25 GMT-0400 (Eastern Daylight Time) |
| HTTP Header | HTTP/1.0 200 OK<br>Server: Netscape-Enterprise/6.1 AOL<br>Content-Type: image/gif<br>Last-Modified: Mon, 09 Jun. 2003 19:48:24 GMT<br>Content-Length: 559<br>Accept-Ranges: bytes<br>Cache-Control: max-age = 867<br>Date: Tue, 08 Jul. 2003 17:10:32 GMT<br>Surrogate-Server: AkamaiGHost | http://i.a.cnn.net/cnn/.element/img/1.0/main/busi-
ness.news.blue.gif

| | |
|---|---|
| Size | 169 |
| Binary | true |
| Blocking | false |
| Redirected to | |
| Modified | Tue Jul. 08 2003 13:09:15 GMT-0400 (Eastern Daylight Time) |
| Expires | Tue Jul. 08 2003 14:00:21 GMT-0400 (Eastern Daylight Time) |
| HTTP Header | HTTP/1.0 200 OK<br>Server: Netscape-Enterprise/6.1 AOL<br>Content-Type: image/gif<br>Last-Modified: Mon, 09 Jun. 2003 19:48:25 GMT<br>Content-Length: 169<br>Accept-Ranges: bytes<br>Cache-Control: max-age = 3083<br>Date: Tue, 08 Jul. 2003 17:10:33 GMT<br>Surrogate-Server: AkamaiGHost | http://ar.atwola.com/image/93103306/aol

| | |
|---|---|
| Size | 0 |
| Binary | true |
| Blocking | false |
| Redirected to | http://ar.atwola.com/content/B0/0/H7pTL2Luf0_kw3xmlj8W1sns8a9RRNke8_SAqLzKBa609jmULHVa8jgFKtiL69KXTPCmjMkYOvM5C_xF3lKNjRbUvMSjKyxE7A6B3LIHANk$/aol |
| Modified | Tue Jul. 08 2003 13:09:00 GMT-0400 (Eastern Daylight Time) |
| Expires | Wed Dec. 31 1969 19:00:00 GMT-0500 (Eastern Standard Time) |
| HTTP Header | HTTP/1.1 302 Found<br>Pragma: no-cache<br>Cache-Control: no-cache<br>Expires: Tue, 08 Jul. 2003 17:10:16 GMT<br>Location: http://ar.atwola.com/content/B0/0/H7pTL2Luf0_kw3xmlj8W1sns8a9RRNke8_SAqLzKBa609jmULHVa8jgFKtiL69KXTPCmjMkYOvM5C_xF31KNjRbUvMSjKyxE7A6B3LIHANk$/aol<br>P3P: CP = "CUR TAI PSA UNI COM NAV STA NOI OUR"<br>Date: Tue, 08 Jul. 2003 17:10:16 GMT<br>Content-Length: 0 | http://ar.atwola.com/content/B0/0/
H7pTL2Luf0_kw3xmlj8W1sns8a9RRNke8_SAqLz
KBa609jmULHVa8jgFKtiL69KXTPCmjMkYOvM5C_
xF31KNjRbUvMSjKyxE7A6B3LIHAN k$/aol

| | |
|---|---|
| Size | 696 |
| Binary | false |
| Blocking | false |
| Redirected to | |
| Modified | Tue Jul. 08 2003 13:09:05 GMT-0400 (Eastern Daylight Time) |
| Expires | Fri Jul. 11 2003 13:09:00 GMT-0400 (Eastern Daylight Time) |
| HTTP Header | HTTP/1.1 200 OK<br>Last-Modified: Sat, 05 Jul. 2003 17:10:20 GMT<br>Expires: Fri, 11 Jul. 2003 17:10:20 GMT<br>Date: Tue, 08 Jul. 2003 17:10:20 GMT<br>Content-Length: 696<br>Content-Type: image/gif | http://i.cnn.net/cnn/.element/img/1.0/main/arrow_down.gif

| | |
|---|---|
| Size | 70 |
| Binary | true |
| Blocking | false |
| Redirected to | |
| Modified | Tue Jul. 08 2003 13:09:02 GMT-0400 (Eastern Daylight Time) |
| Expires | Tue Jul. 08 2003 13:09:02 GMT-0400 (Eastern Daylight Time) |
| HTTP Header | HTTP/1.0 200 OK<br>Server: Netscape-Enterprise/6.1 AOL<br>Date: Thu, 26 Jun. 2003 03:01:27 GMT<br>Content-Type: image/gif<br>Last-Modified: Mon, 09 Jun. 2003 19:48:24 GMT<br>Content-Length: 70<br>Accept-Ranges: bytes<br>Age: 1724<br>X-Cache: HIT from i.cnn.net | http://i.cnn.net/cnn/.element/img/1.0/main/arrow_up.gif

| | |
|---|---|
| Size | 70 |
| Binary | true |
| Blocking | false |
| Redirected to | |
| Modified | Tue Jul. 08 2003 13:09:06 GMT-0400 (Eastern Daylight Time) |
| Expires | Tue Jul. 08 2003 13:09:06 GMT-0400 (Eastern Daylight Time) |
| HTTP Header | HTTP/1.0 200 OK<br>Server: Netscape-Enterprise/6.1 AOL<br>Date: Sat, 21 Jun. 2003 05:12:01 GMT<br>Content-Type: image/gif<br>Last-Modified: Mon, 09 Jun. 2003 19:48:24 GMT<br>Content-Length: 70<br>Accept-Ranges: bytes<br>Age: 8558<br>X-Cache: HIT from i.cnn.net | http://i.a.cnn.net/cnn/.element/img/1.0/main/ftn.breaking.alerts.gif

| | |
|---|---|
| Size | 1919 |
| Binary | true |
| Blocking | false |
| Redirected to | |
| Modified | Tue Jul. 08 2003 13:09:15 GMT-0400 (Eastern Daylight Time) |
| Expires | Tue Jul. 08 2003 13:36:45 GMT-0400 (Eastern Daylight Time) |
| HTTP Header | HTTP/1.0 200 OK<br>Server: Netscape-Enterprise/6.1 AOL<br>Content-Type: image/gif<br>Last-Modified: Mon, 09 Jun. 2003 19:48:26 GMT<br>Content-Length: 1919<br>Accept-Ranges: bytes<br>Cache-Control: max-age = 1667<br>Date: Tue, 08 Jul. 2003 17:10:33 GMT<br>Surrogate-Server: AkamaiGHost | http://i.a.cnn.net/cnn/.element/img/1.0/main/ftn.345×32.try.timeMay03.gif

| | |
|---|---|
| Size | 2035 |
| Binary | true |
| Blocking | false |
| Redirected to | |
| Modified | Tue Jul. 08 2003 13:09:16 GMT-0400 (Eastern Daylight Time) |
| Expires | Tue Jul. 08 2003 13:18:33 GMT-0400 (Eastern Daylight Time) |
| HTTP Header | HTTP/1.0 200 OK<br>Server: Netscape-Enterprise/6.1 AOL<br>Content-Type: image/gif<br>Last-Modified: Mon, 07 Jul. 2003 20:55:34 GMT<br>Content-Length: 2035<br>Accept-Ranges: bytes<br>Cache-Control: max-age = 575<br>Date: Tue, 08 Jul. 2003 17:10:33 GMT<br>Surrogate-Server: AkamaiGHost | http://i.a.cnn.net/cnn/.element/img/1.0/main/super-links/reports.gif

| | |
|---|---|
| Size | 170 |
| Binary | true |
| Blocking | false |
| Redirected to | |
| Modified | Tue Jul. 08 2003 13:09:16 GMT-0400 (Eastern Daylight Time) |
| Expires | Tue Jul. 08 2003 13:57:16 GMT-0400 (Eastern Daylight Time) |
| HTTP Header | HTTP/1.0 200 OK<br>Server: Netscape-Enterprise/6.1 AOL<br>Content-Type: image/gif<br>Last-Modified: Mon, 09 Jun. 2003 19:48:25 GMT<br>Content-Length: 170<br>Accept-Ranges: bytes<br>Surrogate-Server: AkamaiGHost, AkamaiGHost<br>Cache-Control: max-age = 2898<br>Date: Tue, 08 Jul. 2003 17:10:34 GMT | http://i.a.cnn.net/cnn/images/programming.boxes/tz.machu.picchu.jpg

| | |
|---|---|
| Size | 1050 |
| Binary | true |
| Blocking | false |
| Redirected to | |
| Modified | Tue Jul. 08 2003 13:09:16 GMT-0400 (Eastern Daylight Time) |
| Expires | Tue Jul. 08 2003 13:19:50 GMT-0400 (Eastern Daylight Time) |
| HTTP Header | HTTP/1.0 200 OK<br>Server: Netscape-Enterprise/6.1 AOL<br>Content-Type: image/jpeg<br>Last-Modified: Mon, 07 Jul. 2003 20:35:45 GMT<br>Content-Length: 1050<br>Accept-Ranges: bytes<br>Cache-Control: max-age = 652<br>Date: Tue, 08 Jul. 2003 17:10:35 GMT<br>Surrogate-Server: AkamaiGHost | http://i.a.cnn.net/cnn/.element/img/1.0/main/us.gif

| | |
|---|---|
| Size | 352 |
| Binary | true |
| Blocking | false |
| Redirected to | |
| Modified | Tue Jul. 08 2003 13:09:17 GMT-0400 (Eastern Daylight Time) |
| Expires | Tue Jul. 08 2003 13:25:22 GMT-0400 (Eastern Daylight Time) |
| HTTP Header | HTTP/1.0 200 OK<br>Server: Netscape-Enterprise/6.1 AOL<br>Content-Type: image/gif<br>Last-Modified: Mon, 09 Jun. 2003 19:48:25 GMT<br>Content-Length: 352<br>Accept-Ranges: bytes<br>Cache-Control: max-age = 984<br>Date: Tue, 08 Jul. 2003 17:10:35 GMT<br>Surrogate-Server: AkamaiGHost | http://i.a.cnn.net/cnn/.element/img/1.0/main/super-links/technology.gif

| | |
|---|---|
| Size | 186 |
| Binary | true |
| Blocking | false |
| Redirected to | |
| Modified | Tue Jul. 08 2003 13:09:17 GMT-0400 (Eastern Daylight Time) |
| Expires | Tue Jul. 08 2003 13:22:12 GMT-0400 (Eastern Daylight Time) |
| HTTP Header | HTTP/1.0 200 OK<br>Server: Netscape-Enterprise/6.1 AOL<br>Content-Type: image/gif<br>Last-Modified: Mon, 09 Jun. 2003 19:48:26 GMT<br>Content-Length: 186<br>Accept-Ranges: bytes<br>Cache-Control: max-age = 794<br>Date: Tue, 08 Jul. 2003 17:10:35 GMT<br>Surrogate-Server: AkamaiGHost | http://i.a.cnn.net/cnn/.element/img/1.0/main/world.gif

| | |
|---|---|
| Size | 456 |
| Binary | true |
| Blocking | false |
| Redirected to | |
| Modified | Tue Jul. 08 2003 13:09:18 GMT-0400 (Eastern Daylight Time) |
| Expires | Tue Jul. 08 2003 13:57:41 GMT-0400 (Eastern Daylight Time) |
| HTTP Header | HTTP/1.0 200 OK<br>Server: Netscape-Enterprise/6.1 AOL<br>Content-Type: image/gif<br>Last-Modified: Mon, 09 Jun. 2003 19:48:25 GMT<br>Content-Length: 456<br>Accept-Ranges: bytes<br>Cache-Control: max-age = 2923<br>Date: Tue, 08 Jul. 2003 17:10:36 GMT<br>Surrogate-Server: AkamaiGHost | http://i.a.cnn.net/cnn/2003/TECH/ptech/07/08/pop-sci.ul.labs/tz.ul.lab.cnn.jpg

| | |
|---|---|
| Size | 1258 |
| Binary | true |
| Blocking | false |
| Redirected to | |
| Modified | Tue Jul. 08 2003 13:09:17 GMT-0400 (Eastern Daylight Time) |
| Expires | Tue Jul. 08 2003 13:25:42 GMT-0400 (Eastern Daylight Time) |
| HTTP Header | HTTP/1.0 200 OK<br>Server: Netscape-Enterprise/6.1 AOL<br>Content-Type: image/jpeg<br>Last-Modified: Tue, 08 Jul. 2003 13:47:23 GMT<br>Content-Length: 1258<br>Accept-Ranges: bytes<br>Cache-Control: max-age = 1004<br>Date: Tue, 08 Jul. 2003 17:10:35 GMT<br>Surrogate-Server: AkamaiGHost | http://i.cnn.net/cnn/.element/img/1.0/misc/icon.external.links.gif

| | |
|---|---|
| Size | 104 |
| Binary | true |
| Blocking | false |
| Redirected to | |
| Modified | Tue Jul. 08 2003 13:09:09 GMT-0400 (Eastern Daylight Time) |
| Expires | Tue Jul. 08 2003 13:09:09 GMT-0400 (Eastern Daylight Time) |
| HTTP Header | HTTP/1.0 200 OK<br>Server: Netscape-Enterprise/6.1 AOL<br>Date: Fri, 20 Jun. 2003 15:39:46 GMT<br>Content-Type: image/gif<br>Last-Modified: Mon, 09 Jun. 2003 19:48:26 GMT<br>Content-Length: 104<br>Accept-Ranges: bytes<br>Age: 11403<br>X-Cache: HIT from i.cnn.net | http://i.a.cnn.net/cnn/.element/img/1.0/main/technology.gif

| | |
|---|---|
| Size | 731 |
| Binary | true |
| Blocking | false |
| Redirected to | |
| Modified | Tue Jul. 08 2003 13:09:18 GMT-0400 (Eastern Daylight Time) |
| Expires | Tue Jul. 08 2003 13:32:38 GMT-0400 (Eastern Daylight Time) |
| HTTP Header | HTTP/1.0 200 OK<br>Server: Netscape-Enterprise/6.1 AOL<br>Content-Type: image/gif<br>Last-Modified: Mon, 09 Jun. 2003 19:48:25 GMT<br>Content-Length: 731<br>Accept-Ranges: bytes<br>Cache-Control: max-age = 1420<br>Date: Tue, 08 Jul. 2003 17:10:36 GMT<br>Surrogate-Server: AkamaiGHost | http://i.a.cnn.net/cnn/.element/img/1.0/main/entertainment.gif

| | |
|---|---|
| Size | 661 |
| Binary | true |
| Blocking | false |
| Redirected to | |
| Modified | Tue Jul. 08 2003 13:09:18 GMT-0400 (Eastern Daylight Time) |
| Expires | Tue Jul. 08 2003 13:42:43 GMT-0400 (Eastern Daylight Time) |
| HTTP Header | HTTP/1.0 200 OK<br>Server: Netscape-Enterprise/6.1 AOL<br>Content-Type: image/gif<br>Last-Modified: Mon, 09 Jun. 2003 19:48:24 GMT<br>Content-Length: 661<br>Accept-Ranges: bytes<br>Cache-Control: max-age = 2025<br>Date: Tue, 08 Jul. 2003 17:10:36 GMT<br>Surrogate-Server: AkamaiGHost | http://i.a.cnn.net/cnn/.element/img/1.0/main/politics.gif

| | |
|---|---|
| Size | 484 |
| Binary | true |
| Blocking | false |
| Redirected to | |
| Modified | Tue Jul. 08 2003 13:09:18 GMT-0400 (Eastern Daylight Time) |
| Expires | Tue Jul. 08 2003 13:47:26 GMT-0400 (Eastern Daylight Time) |
| HTTP Header | HTTP/1.0 200 OK<br>Server: Netscape-Enterprise/6.1 AOL<br>Content-Type: image/gif<br>Last-Modified: Mon, 09 Jun. 2003 19:48:24 GMT<br>Content-Length: 484<br>Accept-Ranges: bytes<br>Cache-Control: max-age = 2308<br>Date: Tue, 08 Jul. 2003 17:10:36 GMT<br>Surrogate-Server: AkamaiGHost | http://i.a.cnn.net/cnn/.element/img/1.0/main/law.gif

| | |
|---|---|
| Size | 394 |
| Binary | true |
| Blocking | false |
| Redirected to | |
| Modified | Tue Jul. 08 2003 13:09:18 GMT-0400 (Eastern Daylight Time) |
| Expires | Tue Jul. 08 2003 13:59:39 GMT-0400 (Eastern Daylight Time) |
| HTTP Header | HTTP/1.0 200 OK<br>Server: Netscape-Enterprise/6.1 AOL<br>Content-Type: image/gif<br>Last-Modified: Mon, 09 Jun. 2003 19:48:24 GMT<br>Content-Length: 394<br>Accept-Ranges: bytes<br>Cache-Control: max-age = 3041<br>Date: Tue, 08 Jul. 2003 17:10:37 GMT<br>Surrogate-Server: AkamaiGHost | http://i.a.cnn.net/cnn/.element/img/1.0/main/health.gif

| | |
|---|---|
| Size | 448 |
| Binary | true |
| Blocking | false |
| Redirected to | |
| Modified | Tue Jul. 08 2003 13:09:19 GMT-0400 (Eastern Daylight Time) |
| Expires | Tue Jul. 08 2003 13:40:46 GMT-0400 (Eastern Daylight Time) |
| HTTP Header | HTTP/1.0 200 OK<br>Server: Netscape-Enterprise/6.1 AOL<br>Content-Type: image/gif<br>Last-Modified: Mon, 09 Jun. 2003 19:48:24 GMT<br>Content-Length: 448<br>Accept-Ranges: bytes<br>Cache-Control: max-age = 1908<br>Date: Tue, 08 Jul. 2003 17:10:37 GMT<br>Surrogate-Server: AkamaiGHost | http://i.a.cnn.net/cnn/.element/img/1.0/main/space.gif

| | |
|---|---|
| Size | 914 |
| Binary | true |
| Blocking | false |
| Redirected to | |
| Modified | Tue Jul. 08 2003 13:09:19 GMT-0400 (Eastern Daylight Time) |
| Expires | Tue Jul. 08 2003 13:28:53 GMT-0400 (Eastern Daylight Time) |
| HTTP Header | HTTP/1.0 200 OK<br>Server: Netscape-Enterprise/6.1 AOL<br>Content-Type: image/gif<br>Last-Modified: Mon, 09 Jun. 2003 19:48:24 GMT<br>Content-Length: 914<br>Accept-Ranges: bytes<br>Surrogate-Server: AkamaiGHost, AkamaiGHost<br>Cache-Control: max-age = 1195<br>Date: Tue, 08 Jul. 2003 17:10:37 GMT | http://i.a.cnn.net/cnn/.element/img/1.0/main/travel.gif

| | |
|---|---|
| Size | 442 |
| Binary | true |
| Blocking | false |
| Redirected to | |
| Modified | Tue Jul. 08 2003 13:09:19 GMT-0400 (Eastern Daylight Time) |
| Expires | Tue Jul. 08 2003 13:37:01 GMT-0400 (Eastern Daylight Time) |
| HTTP Header | HTTP/1.0 200 OK<br>Server: Netscape-Enterprise/6.1 AOL<br>Content-Type: image/gif<br>Last-Modified: Mon, 09 Jun. 2003 19:48:25 GMT<br>Content-Length: 442<br>Accept-Ranges: bytes<br>Surrogate-Server: AkamaiGHost, AkamaiGHost<br>Cache-Control: max-age = 1683<br>Date: Tue, 08 Jul. 2003 17:10:37 GMT | http://i.a.cnn.net/cnn/.element/img/1.0/main/business.gif

| | |
|---|---|
| Size | 515 |
| Binary | true |
| Blocking | false |
| Redirected to | |
| Modified | Tue Jul. 08 2003 13:09:20 GMT-0400 (Eastern Daylight Time) |
| Expires | Tue Jul. 08 2003 13:19:24 GMT-0400 (Eastern Daylight Time) |
| HTTP Header | HTTP/1.0 200 OK<br>Server: Netscape-Enterprise/6.1 AOL<br>Content-Type: image/gif<br>Last-Modified: Mon, 09 Jun. 2003 19:48:24 GMT<br>Content-Length: 515<br>Accept-Ranges: bytes<br>Surrogate-Server: AkamaiGHost, AkamaiGHost<br>Cache-Control: max-age = 626<br>Date: Tue, 08 Jul. 2003 17:10:38 GMT | http://i.a.cnn.net/cnn/.element/img/1.0/main/education.gif

| | |
|---|---|
| Size | 536 |
| Binary | true |
| Blocking | false |
| Redirected to | |
| Modified | Tue Jul. 08 2003 13:09:19 GMT-0400 (Eastern Daylight Time) |
| Expires | Tue Jul. 08 2003 13:16:18 GMT-0400 (Eastern Daylight Time) |
| HTTP Header | HTTP/1.0 200 OK<br>Server: Netscape-Enterprise/6.1 AOL<br>Content-Type: image/gif<br>Last-Modified: Mon, 09 Jun. 2003 19:48:24 GMT<br>Content-Length: 536<br>Accept-Ranges: bytes<br>Cache-Control: max-age = 440<br>Date: Tue, 08 Jul. 2003 17:10:38 GMT<br>Surrogate-Server: AkamaiGHost | http://i.a.cnn.net/cnn/.element/img/1.0/misc/diagonal.gif

| | |
|---|---|
| Size | 86 |
| Binary | true |
| Blocking | false |
| Redirected to | |
| Modified | Tue Jul. 08 2003 13:09:20 GMT-0400 (Eastern Daylight Time) |
| Expires | Tue Jul. 08 2003 13:43:03 GMT-0400 (Eastern Daylight Time) |
| HTTP Header | HTTP/1.0 200 OK<br>Server: Netscape-Enterprise/6.1 AOL<br>Content-Type: image/gif<br>Last-Modified: Mon, 09 Jun. 2003 19:48:27 GMT<br>Content-Length: 86<br>Accept-Ranges: bytes<br>Cache-Control: max-age = 2045<br>Date: Tue, 08 Jul. 2003 17:10:38 GMT<br>Surrogate-Server: AkamaiGHost | http://i.a.cnn.net/cnn/.element/img/1.0/main/sports.gif

| | |
|---|---|
| Size | 452 |
| Binary | true |
| Blocking | false |
| Redirected to | |
| Modified | Tue Jul. 08 2003 13:09:20 GMT-0400 (Eastern Daylight Time) |
| Expires | Tue Jul. 08 2003 14:02:04 GMT-0400 (Eastern Daylight Time) |
| HTTP Header | HTTP/1.0 200 OK<br>Server: Netscape-Enterprise/6.1 AOL<br>Content-Type: image/gif<br>Last-Modified: Mon, 09 Jun. 2003 19:48:24 GMT<br>Content-Length: 452<br>Accept-Ranges: bytes<br>Cache-Control: max-age = 3186<br>Date: Tue, 08 Jul. 2003 17:10:38 GMT<br>Surrogate-Server: AkamaiGHost | http://i.a.cnn.net/cnn/.element/img/1.0/main/tv.schedule.gif

| | |
|---|---|
| Size | 161 |
| Binary | true |
| Blocking | false |
| Redirected to | |
| Modified | Tue Jul. 08 2003 13:09:20 GMT-0400 (Eastern Daylight Time) |
| Expires | Tue Jul. 08 2003 13:19:12 GMT-0400 (Eastern Daylight Time) |
| HTTP Header | HTTP/1.0 200 OK<br>Server: Netscape-Enterprise/6.1 AOL<br>Content-Type: image/gif<br>Last-Modified: Mon, 09 Jun. 2003 19:48:25 GMT<br>Content-Length: 161<br>Accept-Ranges: bytes<br>Cache-Control: max-age = 614<br>Date: Tue, 08 Jul. 2003 17:10:39 GMT<br>Surrogate-Server: AkamaiGHost | http://i.cnn.net/cnn/CNN/Programs/includes/show-box/images/paula.zahn.gif

| | |
|---|---|
| Size | 3762 |
| Binary | true |
| Blocking | false |
| Redirected to | |
| Modified | Tue Jul. 08 2003 13:09:11 GMT-0400 (Eastern Daylight Time) |
| Expires | Tue Jul. 08 2003 13:09:09 GMT-0400 (Eastern Daylight Time) |
| HTTP Header | HTTP/1.0 200 OK<br>Server: Netscape-Enterprise/6.1 AOL<br>Date: Thu, 22 May 2003 22:29:24 GMT<br>Content-Type: image/gif<br>Last-Modified: Sun, 18 Aug. 2002 18:22:27 GMT<br>Content-Length: 3762<br>Accept-Ranges: bytes<br>Age: 67768<br>X-Cache: HIT from i.cnn.net | http://i.a.cnn.net/cnn/.element/img/1.0/main/super-links/us.gif

| | |
|---|---|
| Size | 145 |
| Binary | true |
| Blocking | false |
| Redirected to | |
| Modified | Tue Jul. 08 2003 13:09:20 GMT-0400 (Eastern Daylight Time) |
| Expires | Tue Jul. 08 2003 13:23:54 GMT-0400 (Eastern Daylight Time) |
| HTTP Header | HTTP/1.0 200 OK<br>Server: Netscape-Enterprise/6.1 AOL<br>Content-Type: image/gif<br>Last-Modified: Mon, 09 Jun. 2003 19:48:26 GMT<br>Content-Length: 145<br>Accept-Ranges: bytes<br>Cache-Control: max-age = 896<br>Date: Tue, 08 Jul. 2003 17:10:39 GMT<br>Surrogate-Server: AkamaiGHost | http://i.a.cnn.net/cnn/2003/US/07/08/nyt.kristof/tz.blair.jpg

| | |
|---|---|
| Size | 4091 |
| Binary | true |
| Blocking | false |
| Redirected to | |
| Modified | Tue Jul. 08 2003 13:09:22 GMT-0400 (Eastern Daylight Time) |
| Expires | Tue Jul. 08 2003 13:56:56 GMT-0400 (Eastern Daylight Time) |
| HTTP Header | HTTP/1.0 200 OK<br>Server: Netscape-Enterprise/6.1 AOL<br>Content-Type: image/jpeg<br>Last-Modified: Tue, 08 Jul. 2003 15:48:13 GMT<br>Content-Length: 4091<br>Accept-Ranges: bytes<br>Cache-Control: max-age = 2878<br>Date: Tue, 08 Jul. 2003 17:10:39 GMT<br>Surrogate-Server: AkamaiGHost | http://i.a.cnn.net/cnn/.element/img/1.0/main/super-links/offbeat.gif

| | |
|---|---|
| Size | 171 |
| Binary | true |
| Blocking | false |
| Redirected to | |
| Modified | Tue Jul. 08 2003 13:09:22 GMT-0400 (Eastern Daylight Time) |
| Expires | Tue Jul. 08 2003 13:42:20 GMT-0400 (Eastern Daylight Time) |
| HTTP Header | HTTP/1.0 200 OK<br>Server: Netscape-Enterprise/6.1 AOL<br>Content-Type: image/gif<br>Last-Modified: Mon, 09 Jun. 2003 19:48:26 GMT<br>Content-Length: 171<br>Accept-Ranges: bytes<br>Cache-Control: max-age = 2002<br>Date: Tue, 08 Jul. 2003 17:10:39 GMT<br>Surrogate-Server: AkamaiGHost | http://i.a.cnn.net/cnn/2003/US/Southwest/07/08/offbeateditor.fired/tz.caddyshack.jpg

| | |
|---|---|
| Size | 2064 |
| Binary | true |
| Blocking | false |
| Redirected to | |
| Modified | Tue Jul. 08 2003 13:09:23 GMT-0400 (Eastern Daylight Time) |
| Expires | Tue Jul. 08 2003 13:53:26 GMT-0400 (Eastern Daylight Time) |
| HTTP Header | HTTP/1.0 200 OK<br>Server: Netscape-Enterprise/6.1 AOL<br>Content-Type: image/jpeg<br>Last-Modified: Tue, 08 Jul. 2003 16:37:42 GMT<br>Content-Length: 2064<br>Accept-Ranges: bytes<br>Surrogate-Server: AkamaiGHost, AkamaiGHost<br>Cache-Control: max-age = 2667<br>Date: Tue, 08 Jul. 2003 17:10:40 GMT | http://i.a.cnn.net/cnn/.element/img/1.0/main/quick-vote.no.sponsor.gif

| | |
|---|---|
| Size | 1437 |
| Binary | true |
| Blocking | false |
| Redirected to | |
| Modified | Tue Jul. 08 2003 13:09:23 GMT-0400 (Eastern Daylight Time) |
| Expires | Tue Jul. 08 2003 13:50:00 GMT-0400 (Eastern Daylight Time) |
| HTTP Header | HTTP/1.0 200 OK<br>Server: Netscape-Enterprise/6.1 AOL<br>Content-Type: image/gif<br>Last-Modified: Mon, 09 Jun. 2003 19:48:26 GMT<br>Content-Length: 1437<br>Accept-Ranges: bytes<br>Surrogate-Server: AkamaiGHost, AkamaiGHost<br>Cache-Control: max-age = 2461<br>Date: Tue, 08 Jul. 2003 17:10:41 GMT | http://i.a.cnn.net/cnn/.element/img/1.0/main/icon_
external.gif

| | |
|---|---|
| Size | 104 |
| Binary | true |
| Blocking | false |
| Redirected to | |
| Modified | Tue Jul. 08 2003 13:09:23 GMT-0400 (Eastern Daylight Time) |
| Expires | Tue Jul. 08 2003 13:32:52 GMT-0400 (Eastern Daylight Time) |
| HTTP Header | HTTP/1.0 200 OK<br>Server: Netscape-Enterprise/6.1 AOL<br>Content-Type: image/gif<br>Last-Modified: Mon, 09 Jun. 2003 19:48:24 GMT<br>Content-Length: 104<br>Accept-Ranges: bytes<br>Cache-Control: max-age = 1433<br>Date: Tue, 08 Jul. 2003 17:10:41 GMT<br>Surrogate-Server: AkamaiGHost | http://i.a.cnn.net/cnn/.element/img/1.0/main/partner_
fortune.gif

| | |
|---|---|
| Size | 938 |
| Binary | true |
| Blocking | false |
| Redirected to | |
| Modified | Tue Jul. 08 2003 13:09:24 GMT-0400 (Eastern Daylight Time) |
| Expires | Tue Jul. 08 2003 13:25:29 GMT-0400 (Eastern Daylight Time) |
| HTTP Header | HTTP/1.0 200 OK<br>Server: Netscape-Enterprise/6.1 AOL<br>Content-Type: image/gif<br>Last-Modified: Mon, 09 Jun. 2003 19:48:26 GMT<br>Content-Length: 938<br>Accept-Ranges: bytes<br>Surrogate-Server: AkamaiGHost, AkamaiGHost, AkamaiGHost<br>Cache-Control: max-age = 990<br>Date: Tue, 08 Jul. 2003 17:10:42 GMT | http://i.a.cnn.net/cnn/.element/img/1.0/main/partner_
time.gif

| | |
|---|---|
| Size | 439 |
| Binary | true |
| Blocking | false |
| Redirected to | |
| Modified | Tue Jul. 08 2003 13:09:23 GMT-0400 (Eastern Daylight Time) |
| Expires | Tue Jul. 08 2003 13:48:52 GMT-0400 (Eastern Daylight Time) |
| HTTP Header | HTTP/1.0 200 OK<br>Server: Netscape-Enterprise/6.1 AOL<br>Content-Type: image/gif<br>Last-Modified: Mon, 09 Jun. 2003 19:48:25 GMT<br>Content-Length: 439<br>Accept-Ranges: bytes<br>Cache-Control: max-age = 2393<br>Date: Tue, 08 Jul. 2003 17:10:42 GMT<br>Surrogate-Server: AkamaiGHost | http://i.a.cnn.net/cnn/.element/img/1.0/sect/
SEARCH/dotted.line.gif

| | |
|---|---|
| Size | 69 |
| Binary | true |
| Blocking | false |
| Redirected to | |
| Modified | Tue Jul. 08 2003 13:09:24 GMT-0400 (Eastern Daylight Time) |
| Expires | Tue Jul. 08 2003 13:23:14 GMT-0400 (Eastern Daylight Time) |
| HTTP Header | HTTP/1.0 200 OK<br>Server: Netscape-Enterprise/6.1 AOL<br>Content-Type: image/gif<br>Last-Modified: Mon, 09 Jun. 2003 19:48:28 GMT<br>Content-Length: 69<br>Accept-Ranges: bytes<br>Cache-Control: max-age = 855<br>Date: Tue, 08 Jul. 2003 17:10:42 GMT<br>Surrogate-Server: AkamaiGHost | http://i.a.cnn.net/cnn/.element/img/1.0/main/partner_
si.gif

| | |
|---|---|
| Size | 973 |
| Binary | true |
| Blocking | false |
| Redirected to | |
| Modified | Tue Jul. 08 2003 13:09:24 GMT-0400 (Eastern Daylight Time) |
| Expires | Tue Jul. 08 2003 13:25:00 GMT-0400 (Eastern Daylight Time) |
| HTTP Header | HTTP/1.0 200 OK<br>Server: Netscape-Enterprise/6.1 AOL<br>Content-Type: image/gif<br>Last-Modified: Mon, 09 Jun. 2003 19:48:25 GMT<br>Content-Length: 973<br>Accept-Ranges: bytes<br>Cache-Control: max-age = 961<br>Date: Tue, 08 Jul. 2003 17:10:42 GMT<br>Surrogate-Server: AkamaiGHost | http://i.a.cnn.net/cnn/.element/img/1.0/misc/icon.ex-
ternal.links.gif

| | |
|---|---|
| Size | 104 |
| Binary | true |
| Blocking | false |
| Redirected to | |
| Modified | Tue Jul. 08 2003 13:09:24 GMT-0400 (Eastern Daylight Time) |
| Expires | Tue Jul. 08 2003 13:50:35 GMT-0400 (Eastern Daylight Time) |
| HTTP Header | HTTP/1.0 200 OK<br>Server: Netscape-Enterprise/6.1 AOL<br>Content-Type: image/gif<br>Last-Modified: Mon, 09 Jun. 2003 19:48:26 GMT<br>Content-Length: 104<br>Accept-Ranges: bytes<br>Cache-Control: max-age = 2496<br>Date: Tue, 08 Jul. 2003 17:10:43 GMT<br>Surrogate-Server: AkamaiGHost | http://ar.atwola.com/html/93103308/48441749/
aol?SNM=HIDBFV&width=88&height=31&target=
top&TZ=240&TVAR=class%3Dus.low&CT=I

| | |
|---|---|
| Size | 377 |
| Binary | false |
| Blocking | false |
| Redirected to | |
| Modified | Tue Jul. 08 2003 13:09:01 GMT-0400 (Eastern Daylight Time) |
| Expires | Wed Dec. 31 1969 19:00:00 GMT-0500 (Eastern Standard Time) |
| HTTP Header | HTTP/1.1 200 OK<br>Content-Type: text/html<br>Pragma: no-cache<br>Cache-Control: no-cache<br>Expires: Tue, 08 Jul. 2003 17:10:16 GMT<br>Date: Tue, 08 Jul. 2003 17:10:16 GMT<br>Content-Length: 377 | http://i.a.cnn.net/cnn/.element/img/1.0/main/icon_premium.gif

| | |
|---|---|
| Size | 74 |
| Binary | true |
| Blocking | false |
| Redirected to | |
| Modified | Tue Jul. 08 2003 13:09:24 GMT-0400 (Eastern Daylight Time) |
| Expires | Tue Jul. 08 2003 13:37:32 GMT-0400 (Eastern Daylight Time) |
| HTTP Header | HTTP/1.0 200 OK<br>Server: Netscape-Enterprise/6.1 AOL<br>Content-Type: image/gif<br>Last-Modified: Mon, 09 Jun. 2003 19:48:24 GMT<br>Content-Length: 74<br>Accept-Ranges: bytes<br>Cache-Control: max-age = 1713<br>Date: Tue, 08 Jul. 2003 17:10:43 GMT<br>Surrogate-Server: AkamaiGHost | http://ar.atwola.com/html/93137910/48441749/
aol?SNM=HIDBFV&width=101&height=1&target=
top&TZ=240&TVAR=class%3Dus.low&CT=J&hw=
docw

| | |
|---|---|
| Size | 267 |
| Binary | false |
| Blocking | true |
| Redirected to | |
| Modified | Tue Jul. 08 2003 13:09:02 GMT-0400 (Eastern Daylight Time) |
| Expires | Wed Dec. 31 1969 19:00:00 GMT-0500 (Eastern Standard Time) |
| HTTP Header | HTTP/1.1 200 OK<br>Content-Type: application/x-javascript<br>Pragma: no-cache<br>Cache-Control: no-cache<br>Expires: Tue, 08 Jul. 2003 17:10:19 GMT<br>Date: Tue, 08 Jul. 2003 17:10:19 GMT<br>Content-Length: 267 | http://ar.atwola.com/file/adsEnd.js

| | |
|---|---|
| Size | 1551 |
| Binary | false |
| Blocking | true |
| Redirected to | |
| Modified | Tue Jul. 08 2003 13:09:11 GMT-0400 (Eastern Daylight Time) |
| Expires | Wed Jul. 09 2003 13:09:02 GMT-0400 (Eastern Daylight Time) |
| HTTP Header | HTTP/1.1 200 OK<br>Expires: Wed, 09 Jul. 2003 17:10:27 GMT<br>Date: Tue, 08 Jul. 2003 17:10:27 GMT<br>Content-Length: 1551<br>Content-Type: application/x-javascript | http://www.cnn.com/cookie.crumb

| | |
|---|---|
| Size | 43 |
| Binary | true |
| Blocking | false |
| Redirected to | |
| Modified | Tue Jul. 08 2003 13:09:14 GMT-0400 (Eastern Daylight Time) |
| Expires | Wed Dec. 31 1969 19:00:00 GMT-0500 (Eastern Standard Time) |
| HTTP Header | HTTP/1.1 200 OK<br>Server: Netscape-Enterprise/6.1 AOL<br>Date: Tue, 08 Jul. 2003 17:10:31 GMT<br>Content-Length: 43<br>Content-Type: image/gif |

Links

| URL | Total Score |
|---|---|
| | |

Satellite

Bandwidth 40960, Compression 1.0, DNS Lookup 1.5, Ping Latency 1.5

Web Page Scoring

Parameters

| | |
|---|---|
| Date Run | Tue Jul. 08 2003 13:12:24 GMT-0400 (Eastern Daylight Time) |
| Bandwidth | 40960 |
| Compression | 1 |
| DNS Lookup Time | 1.5 |
| Ping Latency | 1.5 |
| Revisit Time | 86400 |
| IntraPage Time | 60 |
| User Perception Time | 10 |

Page: http://cnn.com/ Score 13.18

Page Scores

|  | Blocking | Total |
|---|---|---|
| First Visit | 1.8 | 13.18 |
| Second Visit | 1.8 | 13.02 |

Notes
consider reducing redirections
consider reducing domain lookups
consider moving external scripts to inline or reducing domain lookups
consider moving external css to inline or reducing domain lookups
first visit: blocking latency dominates size
second visit: blocking latency dominates size

Summary Statistics

| | |
|---|---|
| Actual Load Time | 42.872 |
| Total Size | 173885 |
| Document Compressed | false |
| Redirects | 2 |
| Total Domains | 5 |
| Blocking Domains | 4 |
| Non Blocking Domains | 1 |
| Domains | cnn.com, www.cnn.com, i.cnn.net, ar.atwola.com, i.a.cnn.net |
| Extra Whitespace | 5149 |
| Inline Script Count | 6 |
| Inline Script Size | 1236 |
| External Script Count | 11 |
| External Script Size | 35033 |
| Inline Style Count | 1 |
| Inline Style Size | 110 |
| External Style Count | 3 |
| External Style Size | 25910 |
| DOM Depth | 26 |
| Table Depth | 5 | http://cnn.com/

| | |
|---|---|
| Size | 0 |
| Binary | false |
| Blocking | false |
| Redirected to | http://www.cnn.com/ |
| Modified | Tue Jul. 08 2003 13:08:42 GMT-0400 (Eastern Daylight Time) |
| Expires | Wed Dec. 31 1969 19:00:00 GMT-0500 (Eastern Standard Time) |
| HTTP Header | HTTP/1.1 302 Moved Temporarily<br>Server: Netscape-Enterprise/6.1 AOL<br>Date: Tue, 08 Jul. 2003 17:10:02 GMT<br>Location: http://www.cnn.com/<br>Content-Length: 0<br>Content-Type: text/html | http://www.cnn.com/

| | |
|---|---|
| Size | 56730 |
| Binary | false |
| Blocking | false |
| Redirected to | |
| Modified | Tue Jul. 08 2003 13:08:52 GMT-0400 (Eastern Daylight Time) |
| Expires | Tue Jul. 08 2003 13:09:42 GMT-0400 (Eastern Daylight Time) |
| HTTP Header | HTTP/1.1 200 OK<br>Server: Netscape-Enterprise/6.1 AOL<br>Date: Tue, 08 Jul. 2003 17:10:02 GMT<br>Last-Modified: Tue, 08 Jul. 2003 17:10:00 GMT<br>Expires: Tue, 08 Jul. 2003 17:11:00 GMT<br>Cache-Control: private, max-age = 60<br>Content-Type: text/html | http://i.cnn.net/cnn/.element/ssi/css/1.0/main.css

| | |
|---|---|
| Size | 25910 |
| Binary | false |
| Blocking | true |
| Redirected to | |
| Modified | Tue Jul. 08 2003 13:08:51 GMT-0400 (Eastern Daylight Time) |
| Expires | Tue Jul. 08 2003 13:08:45 GMT-0400 (Eastern Daylight Time) |
| HTTP Header | HTTP/1.0 200 OK<br>Server: Netscape-Enterprise/6.1 AOL<br>Date: Wed, 25 Jun. 2003 15:05:51 GMT<br>Content-Type: text/css<br>Last-Modified: Wed, 25 Jun. 2003 15:04:29 GMT<br>Content-Length: 25910<br>Accept-Ranges: bytes<br>Age: 8543<br>X-Cache: HIT from i.cnn.net | http://i.cnn.net/cnn/.element/ssi/js/1.0/main.js

| | |
|---|---|
| Size | 21613 |
| Binary | false |
| Blocking | true |
| Redirected to | |
| Modified | Tue Jul. 08 2003 13:08:54 GMT-0400 (Eastern Daylight Time) |
| Expires | Tue Jul. 08 2003 13:08:52 GMT-0400 (Eastern Daylight Time) |
| HTTP Header | HTTP/1.0 200 OK<br>Server: Netscape-Enterprise/6.1 AOL<br>Date: Thu, 26 Jun. 2003 03:34:13 GMT<br>Content-Type: application/x-javascript<br>Last-Modified: Mon, 17 Mar. 2003 20:13:07 GMT<br>Content-Length: 21613<br>Accept-Ranges: bytes<br>Age: 787<br>X-Cache: HIT from i.cnn.net | http://ar.atwola.com/file/adsWrapper.js

| | |
|---|---|
| Size | 6039 |
| Binary | false |
| Blocking | true |
| Redirected to | |
| Modified | Tue Jul. 08 2003 13:08:57 GMT-0400 (Eastern Daylight Time) |
| Expires | Wed Jul. 09 2003 13:08:55 GMT-0400 (Eastern Daylight Time) |
| HTTP Header | HTTP/1.1 200 OK<br>Expires: Wed, 09 Jul. 2003 17:10:11 GMT<br>Date: Tue, 08 Jul. 2003 17:10:11 GMT | http://ar.atwola.com/file/adsPopup2.js

| | |
|---|---|
| Size | 5563 |
| Binary | false |
| Blocking | true |
| Redirected to | |
| Modified | Tue Jul. 08 2003 13:08:58 GMT-0400 (Eastern Daylight Time) |
| Expires | Wed Jul. 09 2003 13:08:57 GMT-0400 (Eastern Daylight Time) |
| HTTP Header | HTTP/1.1 200 OK<br>Expires: Wed, 09 Jul. 2003 17:10:14 GMT<br>Date: Tue, 08 Jul. 2003 17:10:14 GMT<br>Content-Length: 5563<br>Content-Type: application/x-javascript |

Content-Length: 6039
Content-Type: application/x-javascript http://i.cnn.net/cnn/images/1.gif

| | |
|---|---|
| Size | 43 |
| Binary | true |
| Blocking | false |
| Redirected to | |
| Modified | Tue Jul. 08 2003 13:08:58 GMT-0400 (Eastern Daylight Time) |
| Expires | Tue Jul. 08 2003 13:08:58 GMT-0400 (Eastern Daylight Time) |
| HTTP Header | HTTP/1.0 200 OK<br>Server: Netscape-Enterprise/6.1 AOL<br>Date: Fri, 20 Jun. 2003 15:36:44 GMT<br>Content-Type: image/gif<br>Last-Modified: Tue, 27 May 2003 19:00:10 GMT<br>Content-Length: 43<br>Accept-Ranges: bytes<br>Age: 2813<br>X-Cache: HIT from i.cnn.net | http://i.a.cnn.net/cnn/.element/img/1.0/logo/cnn.gif

| | |
|---|---|
| Size | 1910 |
| Binary | true |
| Blocking | false |
| Redirected to | |
| Modified | Tue Jul. 08 2003 13:08:59 GMT-0400 (Eastern Daylight Time) |
| Expires | Tue Jul. 08 2003 14:02:08 GMT-0400 (Eastern Daylight Time) |
| HTTP Header | HTTP/1.0 200 OK<br>Server: Netscape-Enterprise/6.1 AOL<br>Content-Type: image/gif<br>Last-Modified: Mon, 09 Jun. 2003 19:48:24 GMT<br>Content-Length: 1910<br>Accept-Ranges: bytes<br>Cache-Control: max-age = 3190<br>Date: Tue, 08 Jul. 2003 17:10:17 GMT<br>Surrogate-Server: AkamaiGHost | http://ar.atwola.com/html/93103287/48441749/aol?SNM=HIDBFV&width=468&height=60&target=top&TZ=240&TVAR=class%3Dus.low&CT=I

| | |
|---|---|
| Size | 402 |
| Binary | false |
| Blocking | false |
| Redirected to | |
| Modified | Tue Jul. 08 2003 13:08:59 GMT-0400 (Eastern Daylight Time) |
| Expires | Wed Dec. 31 1969 19:00:00 GMT-0500 (Eastern Standard Time) |
| HTTP Header | HTTP/1.1 200 OK<br>Content-Type: text/html<br>Pragma: no-cache<br>Cache-Control: no-cache<br>Expires: Tue, 08 Jul. 2003 17:10:15 GMT<br>Date: Tue, 08 Jul. 2003 17:10:15 GMT<br>Content-Length: 402 | http://i.a.cnn.net/cnn/.element/img/1.0/searchbar/bar.search.gif

| | |
|---|---|
| Size | 1107 |
| Binary | true |
| Blocking | false |
| Redirected to | |
| Modified | Tue Jul. 08 2003 13:08:59 GMT-0400 (Eastern Daylight Time) |
| Expires | Tue Jul. 08 2003 13:20:05 GMT-0400 (Eastern Daylight Time) |
| HTTP Header | HTTP/1.0 200 OK<br>Server: Netscape-Enterprise/6.1 AOL<br>Content-Type: image/gif<br>Last-Modified: Mon, 09 Jun. 2003 19:49:26 GMT<br>Content-Length: 1107<br>Accept-Ranges: bytes<br>Surrogate-Server: AkamaiGHost, AkamaiGHost<br>Cache-Control: max-age = 667<br>Date: Tue, 08 Jul. 2003 17:10:17 GMT | http://i.a.cnn.net/cnn/.element/img/1.0/searchbar/bar.top.bevel.gif

| | |
|---|---|
| Size | 181 |
| Binary | true |
| Blocking | false |
| Redirected to | |
| Modified | Tue Jul. 08 2003 13:09:00 GMT-0400 (Eastern Daylight Time) |
| Expires | Tue Jul. 08 2003 13:34:50 GMT-0400 (Eastern Daylight Time) |
| HTTP Header | HTTP/1.0 200 OK<br>Server: Netscape-Enterprise/6.1 AOL<br>Content-Type: image/gif<br>Last-Modified: Mon, 09 Jun. 2003 19:49:26 GMT<br>Content-Length: 181<br>Accept-Ranges: bytes<br>Cache-Control: max-age = 1552<br>Date: Tue, 08 Jul. 2003 17:10:18 GMT<br>Surrogate-Server: AkamaiGHost |

61 http://i.a.cnn.net/cnn/.element/img/1.0/searchbar/bar.right.bevel.gif

| | |
|---|---|
| Size | 299 |
| Binary | true |
| Blocking | false |
| Redirected to | |
| Modified | Tue Jul. 08 2003 13:09:00 GMT-0400 (Eastern Daylight Time) |
| Expires | Tue Jul. 08 2003 13:33:30 GMT-0400 (Eastern Daylight Time) |
| HTTP Header | HTTP/1.0 200 OK<br>Server: Netscape-Enterprise/6.1 AOL<br>Content-Type: image/gif<br>Last-Modified: Mon, 09 Jun. 2003 19:49:26 GMT<br>Content-Length: 299<br>Accept-Ranges: bytes<br>Cache-Control: max-age = 1472<br>Date: Tue, 08 Jul. 2003 17:10:18 GMT<br>Surrogate-Server: AkamaiGHost | http://i.a.cnn.net/cnn/.element/img/1.0/searchbar/bar.google.gif

| | |
|---|---|
| Size | 1273 |
| Binary | true |
| Blocking | false |
| Redirected to | |
| Modified | Tue Jul. 08 2003 13:09:01 GMT-0400 (Eastern Daylight Time) |
| Expires | Tue Jul. 08 2003 13:32:54 GMT-0400 (Eastern Daylight Time) |
| HTTP Header | HTTP/1.0 200 OK<br>Server: Netscape-Enterprise/6.1 AOL<br>Content-Type: image/gif<br>Last-Modified: Mon, 09 Jun. 2003 19:49:26 GMT<br>Content-Length: 1273<br>Accept-Ranges: bytes<br>Cache-Control: max-age = 1436<br>Date: Tue, 08 Jul. 2003 17:10:18 GMT<br>Surrogate-Server: AkamaiGHost | http://i.a.cnn.net/cnn/.element/img/1.0/searchbar/bar.bottom.bevel.gif

| | |
|---|---|
| Size | 211 |
| Binary | true |
| Blocking | false |
| Redirected to | |
| Modified | Tue Jul. 08 2003 13:09:01 GMT-0400 (Eastern Daylight Time) |
| Expires | Tue Jul. 08 2003 13:15:13 GMT-0400 (Eastern Daylight Time) |
| HTTP Header | HTTP/1.0 200 OK<br>Server: Netscape-Enterprise/6.1 AOL<br>Content-Type: image/gif<br>Last-Modified: Mon, 09 Jun. 2003 19:49:26 GMT<br>Content-Length: 211<br>Accept-Ranges: bytes<br>Cache-Control: max-age = 375<br>Date: Tue, 08 Jul. 2003 17:10:19 GMT<br>Surrogate-Server: AkamaiGHost |

62 http://i.a.cnn.net/cnn/.element/img/1.0/main/nav_at_money.gif

| | |
|---|---|
| Size | 90 |
| Binary | true |
| Blocking | false |
| Redirected to | |
| Modified | Tue Jul. 08 2003 13:09:03 GMT-0400 (Eastern Daylight Time) |
| Expires | Tue Jul. 08 2003 13:31:57 GMT-0400 (Eastern Daylight Time) |
| HTTP Header | HTTP/1.0 200 OK<br>Server: Netscape-Enterprise/6.1 AOL<br>Content-Type: image/gif<br>Last-Modified: Mon, 09 Jun. 2003 19:48:24 GMT<br>Content-Length: 90<br>Accept-Ranges: bytes<br>Cache-Control: max-age = 1379<br>Date: Tue, 08 Jul. 2003 17:10:20 GMT<br>Surrogate-Server: AkamaiGHost | http://i.a.cnn.net/cnn/.element/img/1.0/main/nav_at_si.gif

| | |
|---|---|
| Size | 82 |
| Binary | true |
| Blocking | false |
| Redirected to | |
| Modified | Tue Jul. 08 2003 13:09:05 GMT-0400 (Eastern Daylight Time) |
| Expires | Tue Jul. 08 2003 13:49:07 GMT-0400 (Eastern Daylight Time) |
| HTTP Header | HTTP/1.0 200 OK<br>Server: Netscape-Enterprise/6.1 AOL<br>Content-Type: image/gif<br>Last-Modified: Mon, 09 Jun. 2003 19:48:24 GMT<br>Content-Length: 82<br>Accept-Ranges: bytes<br>Cache-Control: max-age = 2409<br>Date: Tue, 08 Jul. 2003 17:10:20 GMT<br>Surrogate-Server: AkamaiGHost | http://ar.atwola.com/html/93166917/48441749/aol?SNM=HIDBFV&width=120&height=90&target=top&TZ=240&TVAR=class%3Dus.low&CT=I

| | |
|---|---|
| Size | 410 |
| Binary | false |
| Blocking | false |
| Redirected to | |
| Modified | Tue Jul. 08 2003 13:09:00 GMT-0400 (Eastern Daylight Time) |
| Expires | Wed Dec. 31 1969 19:00:00 GMT-0500 (Eastern Standard Time) |
| HTTP Header | HTTP/1.1 200 OK<br>Content-Type: text/html<br>Pragma: no-cache<br>Cache-Control: no-cache<br>Expires: Tue, 08 Jul. 2003 17:10:18 GMT<br>Date: Tue, 08 Jul. 2003 17:10:18 GMT<br>Content-Length: 410 |

63 http://i.a.cnn.net/cnn/.element/img/1.0/sect/
SEARCH/nav.search.gif

| | |
|---|---|
| Size | 1105 |
| Binary | true |
| Blocking | false |
| Redirected to | |
| Modified | Tue Jul. 08 2003 13:09:06 GMT-0400 (Eastern Daylight Time) |
| Expires | Tue Jul. 08 2003 13:15:27 GMT-0400 (Eastern Daylight Time) |
| HTTP Header | HTTP/1.0 200 OK |
| | Server: Netscape-Enterprise/6.1 AOL |
| | Content-Type: image/gif |
| | Last-Modified: Mon, 09 Jun. 2003 19:48:28 GMT |
| | Content-Length: 1105 |
| | Accept-Ranges: bytes |
| | Cache-Control: max-age = 389 |
| | Date: Tue, 08 Jul. 2003 17:10:22 GMT |
| | Surrogate-Server: AkamaiGHost | http://i.cnn.net/cnn/2003/images/07/08/top.miss.me-
ridian.gif

| | |
|---|---|
| Size | 9497 |
| Binary | true |
| Blocking | false |
| Redirected to | |
| Modified | Tue Jul. 08 2003 13:09:06 GMT-0400 (Eastern Daylight Time) |
| Expires | Tue Jul. 08 2003 13:09:00 GMT-0400 (Eastern Daylight Time) |
| HTTP Header | HTTP/1.0 200 OK |
| | Server: Netscape-Enterprise/6.1 AOL |
| | Date: Tue, 08 Jul. 2003 16:12:13 GMT |
| | Content-Type: image/gif |
| | Last-Modified: Tue, 08 Jul. 2003 16:09:13 GMT |
| | Content-Length: 9497 |
| | Accept-Ranges: bytes |
| | Age: 2162 |
| | X-Cache: HIT from i.cnn.net | http://i.a.cnn.net/cnn/.element/img/1.0/main/
px_c00.gif

| | |
|---|---|
| Size | 43 |
| Binary | true |
| Blocking | false |
| Redirected to | |
| Modified | Tue Jul. 08 2003 13:09:08 GMT-0400 (Eastern Daylight Time) |
| Expires | Tue Jul. 08 2003 13:39:02 GMT-0400 (Eastern Daylight Time) |
| HTTP Header | HTTP/1.0 200 OK |
| | Server: Netscape-Enterprise/6.1 AOL |
| | Content-Type: image/gif |
| | Last-Modified: Mon, 09 Jun. 2003 19:48:25 GMT |
| | Content-Length: 43 |
| | Accept-Ranges: bytes |
| | Cache-Control: max-age = 1804 |
| | Date: Tue, 08 Jul. 2003 17:10:24 GMT |
| | Surrogate-Server: AkamaiGHost |

64 http://i.a.cnn.net/cnn/.element/img/1.0/main/user-
picks.gif

| | |
|---|---|
| Size | 151 |
| Binary | true |
| Blocking | false |
| Redirected to | |
| Modified | Tue Jul. 08 2003 13:09:10 GMT-0400 (Eastern Daylight Time) |
| Expires | Tue Jul. 08 2003 13:24:45 GMT-0400 (Eastern Daylight Time) |
| HTTP Header | HTTP/1.0 200 OK |
| | Server: Netscape-Enterprise/6.1 AOL |
| | Content-Type: image/gif |
| | Last-Modified: Mon, 09 Jun. 2003 19:48:25 GMT |
| | Content-Length: 151 |
| | Accept-Ranges: bytes |
| | Cache-Control: max-age = 947 |
| | Date: Tue, 08 Jul. 2003 17:10:25 GMT |
| | Surrogate-Server: AkamaiGHost | http://i.a.cnn.net/cnn/.element/img/1.0/misc/premi-
um.gif

| | |
|---|---|
| Size | 74 |
| Binary | true |
| Blocking | false |
| Redirected to | |
| Modified | Tue Jul. 08 2003 13:08:59 GMT-0400 (Eastern Daylight Time) |
| Expires | Tue Jul. 08 2003 13:08:59 GMT-0400 (Eastern Daylight Time) |
| HTTP Header | HTTP/1.0 200 OK |
| | Server: Netscape-Enterprise/6.1 AOL |
| | Date: Thu, 26 Jun. 2003 03:06:00 GMT |
| | Content-Type: image/gif |
| | Last-Modified: Mon, 09 Jun. 2003 19:48:26 GMT |
| | Content-Length: 74 |
| | Accept-Ranqes: bytes |
| | Age: 12938 |
| | X-Cache: HIT from i.cnn.net | http://i.a.cnn.net/cnn/.element/img/1.0/main/px_
ccc.gif

| | |
|---|---|
| Size | 43 |
| Binary | true |
| Blocking | false |
| Redirected to | |
| Modified | Tue Jul. 08 2003 13:09:10 GMT-0400 (Eastern Daylight Time) |
| Expires | Tue Jul. 08 2003 13:28:53 GMT-0400 (Eastern Daylight Time) |
| HTTP Header | HTTP/1.0 200 OK |
| | Server: Netscape-Enterprise/6.1 AOL |
| | Content-Type: image/gif |
| | Last-Modified: Mon, 09 Jun. 2003 19:48:25 GMT |
| | Content-Length: 43 |
| | Accept-Ranges: bytes |
| | Cache-Control : max-age = 1195 |
| | Date: Tue, 08 Jul. 2003 17:10:26 GMT |
| | Surrogate-Server: AkamaiGHost | http://i.a.cnn.net/cnn/.element/img/1.0/misc/audio.gif

| | |
|---|---|
| Size | 61 |
| Binary | true |
| Blocking | false |
| Redirected to | |
| Modified | Tue Jul. 08 2003 13:09:11 GMT-0400 (Eastern Daylight Time) |
| Expires | Tue Jul. 08 2003 13:23:38 GMT-0400 (Eastern Daylight Time) |
| HTTP Header | HTTP/1.0 200 OK<br>Server: Netscape-Enterprise/6.1 AOL<br>Content-Type: image/gif<br>Last-Modified: Mon, 09 Jun. 2003 19:48:27 GMT<br>Content-Length: 61<br>Accept-Ranges: bytes<br>Cache-Control: max-age = 880<br>Date: Tue, 08 Jul. 2003 17:10:28 GMT<br>Surrogate-Server: AkamaiGHost | http://i.a.cnn.net/cnn/images/1.gif

| | |
|---|---|
| Size | 43 |
| Binary | true |
| Blocking | false |
| Redirected to | |
| Modified | Tue Jul. 08 2003 13:09:11 GMT-0400 (Eastern Daylight Time) |
| Expires | Tue Jul. 08 2003 13:39:49 GMT-0400 (Eastern Daylight Time) |
| HTTP Header | HTTP/1.0 200 OK<br>Server: Netscape-Enterprise/6.1 AOL<br>Content-Type: image/gif<br>Last-Modified: Tue, 27 May 2003 19:00:10 GMT<br>Content-Length: 43<br>Accept-Ranges: bytes<br>Cache-Control: max-age = 1851<br>Date: Tue, 08 Jul. 2003 17:10:29 GMT<br>Surrogate-Server: AkamaiGHost | http://i.a.cnn.net/cnn/.element/img/1.0/main/more.video.blue.gif

| | |
|---|---|
| Size | 153 |
| Binary | true |
| Blocking | false |
| Redirected to | |
| Modified | Tue Jul. 08 2003 13:09:11 GMT-0400 (Eastern Daylight Time) |
| Expires | Tue Jul. 08 2003 13:25:02 GMT-0400 (Eastern Daylight Time) |
| HTTP Header | HTTP/1.0 200 OK<br>Server: Netscape-Enterprise/6.1 AOL<br>Content-Type: image/gif<br>Last-Modified: Mon, 09 Jun. 2003 19:48:26 GMT<br>Content-Length: 153<br>Accept-Ranges: bytes<br>Cache-Control: max-age = 964<br>Date: Tue, 08 Jul. 2003 17:10:30 GMT<br>Surrogate-Server: AkamaiGHost | http://i.a.cnn.net/cnn/images/icons/premium.gif

| | |
|---|---|
| Size | 74 |
| Binary | true |
| Blocking | false |
| Redirected to | |
| Modified | Tue Jul. 08 2003 13:09:12 GMT-0400 (Eastern Daylight Time) |
| Expires | Tue Jul. 08 2003 13:34:35 GMT-0400 (Eastern Daylight Time) |
| HTTP Header | HTTP/1.0 200 OK<br>Last-Modified: Wed, 13 Mar. 2002 21:19:25 GMT<br>Accept-Ranges: bytes<br>Server: Netscape-Enterprise/6.1 AOL<br>Content-Type: image/gif<br>Content-Length: 74<br>Surrogate-Server: AkamaiGHost, AkamaiGHost, AkamaiGHost<br>Cache-Control: max-age = 1537<br>Expires: Tue, 08 Jul. 2003 17:36:07 GMT<br>Date: Tue, 08 Jul. 2003 17:10:30 GMT | http://i.a.cnn.net/cnn/video/iraq/2003/07/08/ja.baghd.at.night.vs.cnn.jpg

| | |
|---|---|
| Size | 5388 |
| Binary | true |
| Blocking | false |
| Redirected to | |
| Modified | Tue Jul. 08 2003 13:09:13 GMT-0400 (Eastern Daylight Time) |
| Expires | Tue Jul. 08 2003 13:24:19 GMT-0400 (Eastern Daylight Time) |
| HTTP Header | HTTP/1.0 200 OK<br>Server: Netscape-Enterprise/6.1 AOL<br>Content-Type: image/jpeg<br>Last-Modified: Tue, 08 Jul. 2003 05:48:35 GMT<br>Content-Length: 5388<br>Accept-Ranges: bytes<br>Cache-Control: max-age = 921<br>Date: Tue, 08 Jul. 2003 17:10:30 GMT<br>Surrogate-Server: AkamaiGHost | http://i.a.cnn.net/cnn/.element/img/1.0/main/super-links/health.gif

| | |
|---|---|
| Size | 161 |
| Binary | true |
| Blocking | false |
| Redirected to | |
| Modified | Tue Jul. 08 2003 13:09:13 GMT-0400 (Eastern Daylight Time) |
| Expires | Tue Jul. 08 2003 13:32:16 GMT-0400 (Eastern Daylight Time) |
| HTTP Header | HTTP/1.0 200 OK<br>Server: Netscape-Enterprise/6.1 AOL<br>Content-Type: image/gif<br>Last-Modified: Mon, 09 Jun. 2003 19:48:25 GMT<br>Content-Length: 161<br>Accept-Ranges: bytes<br>Surrogate-Server: AkamaiGHost, AkamaiGHost<br>Cache-Control: max-age = 1398<br>Date: Tue, 08 Jul. 2003 17:10:30 GMT | http://i.a.cnn.net/cnn/2003/HEALTH/07/08/
otsc.gupta/tz.gupta.jpg

| | |
|---|---|
| Size | 3702 |
| Binary | true |
| Blocking | false |
| Redirected to | |
| Modified | Tue Jul. 08 2003 13:09:14 GMT-0400 (Eastern Daylight Time) |
| Expires | Tue Jul. 08 2003 13:34:28 GMT-0400 (Eastern Daylight Time) |
| HTTP Header | HTTP/1.0 200 OK<br>Server: Netscape-Enterprise/6.1 AOL<br>Content-Type: image/jpeg<br>Last-Modified: Tue, 08 Jul. 2003 13:26:21 GMT<br>Content-Length: 3702<br>Accept-Ranges: bytes<br>Surrogate-Server: AkamaiGHost, AkamaiGHost<br>Cache-Control: max-age = 1530<br>Date: Tue, 08 Jul. 2003 17:10:32 GMT | http://i.a.cnn.net/cnn/.element/img/1.0/main/at_
cnnmoney.gif

| | |
|---|---|
| Size | 559 |
| Binary | true |
| Blocking | false |
| Redirected to | |
| Modified | Tue Jul. 08 2003 13:09:14 GMT-0400 (Eastern Daylight Time) |
| Expires | Tue Jul. 08 2003 13:23:25 GMT-0400 (Eastern Daylight Time) |
| HTTP Header | HTTP/1.0 200 OK<br>Server: Netscape-Enterprise/6.1 AOL<br>Content-Type: image/gif<br>Last-Modified: Mon, 09 Jun. 2003 19:48:24 GMT<br>Content-Length: 559<br>Accept-Ranges: bytes<br>Cache-Control: max-age = 867<br>Date: Tue, 08 Jul. 2003 17:10:32 GMT<br>Surrogate-Server: AkamaiGHost | http://i.a.cnn.net/cnn/.element/img/1.0/main/busi-
ness.news.blue.gif

| | |
|---|---|
| Size | 169 |
| Binary | true |
| Blocking | false |
| Redirected to | |
| Modified | Tue Jul. 08 2003 13:09:15 GMT-0400 (Eastern Daylight Time) |
| Expires | Tue Jul. 08 2003 14:00:21 GMT-0400 (Eastern Daylight Time) |
| HTTP Header | HTTP/1.0 200 OK<br>Server: Netscape-Enterprise/6.1 AOL<br>Content-Type: image/gif<br>Last-Modified: Mon, 09 Jun. 2003 19:48:25 GMT<br>Content-Length: 169<br>Accept-Ranges: bytes<br>Cache-Control: max-age = 3083<br>Date: Tue, 08 Jul. 2003 17:10:33 GMT<br>Surrogate-Server: AkamaiGHost | http://ar.atwola.com/image/93103306/aol

| | |
|---|---|
| Size | 0 |
| Binary | true |
| Blocking | false |
| Redirected to | http://ar.atwola.com/content/B0/0/H7pTL2Lu f0_kw3xmlj8W1sns8a9RRNke8_SAqLzKBa 609jmULHVa8jgFKtiL69KXTPCmjMkYOv M5C_xF3lKNjRbUvMSjKyxE7A6B3LIHAN k$/aol |
| Modified | Tue Jul. 08 2003 13:09:00 GMT-0400 (Eastern Daylight Time) |
| Expires | Wed Dec. 31 1969 19:00:00 GMT-0500 (Eastern Standard Time) |
| HTTP Header | HTTP/1.1 302 Found<br>Pragma: no-cache<br>Cache-Control: no-cache<br>Expires: Tue, 08 Jul. 2003 17:10:16 GMT<br>Location: http://ar.atwola.com/content/B0/0/H7p TL2Luf0_kw3xmlj8W1sns8a9RRNke8_SAqLzK Ba609jmULHVa8jgFKtiL69KXTPCmjMkYOvM5C__ xF3lKNjRbUvMSjKyxE7A6B3LIHANk$/aol<br>P3P: CP = "CUR TAI PSA UNI COM NAV STA NOI OUR"<br>Date: Tue, 08 Jul. 2003 17:10:16 GMT<br>Content-Length: 0 | http://ar.atwola.com/content/B0/0/
H7pTL2Luf0_kw3xmlj8W1sns8a9RRNke8_SAq
LzKBa609jmULHVa8jgFKtiL69KXTPCmjMkYOv
M5C_xF31KNjRbUvMSjKyxE7A6B3LIHAN
k$/aol

| | |
|---|---|
| Size | 696 |
| Binary | false |
| Blocking | false |
| Redirected to | |
| Modified | Tue Jul. 08 2003 13:09:05 GMT-0400 (Eastern Daylight Time) |
| Expires | Fri Jul. 11 2003 13:09:00 GMT-0400 (Eastern Daylight Time) |
| HTTP Header | HTTP/1.1 200 OK<br>Last-Modified: Sat, 05 Jul. 2003 17:10:20 GMT<br>Expires: Fri, 11 Jul. 2003 17:10:20 GMT<br>Date: Tue, 08 Jul. 2003 17:10:20 GMT<br>Content-Length: 696<br>Content-Type: image/gif | http://i.cnn.net/cnn/.element/img/1.0/main/arrow_
down.gif

| | |
|---|---|
| Size | 70 |
| Binary | true |
| Blocking | false |
| Redirected to | |
| Modified | Tue Jul. 08 2003 13:09:02 GMT-0400 (Eastern Daylight Time) |
| Expires | Tue Jul. 08 2003 13:09:02 GMT-0400 (Eastern Daylight Time) |
| HTTP Header | HTTP/1.0 200 OK<br>Server: Netscape-Enterprise/6.1 AOL<br>Date: Thu, 26 Jun. 2003 03:01:27 GMT<br>Content-Type: image/gif<br>Last-Modified: Mon, 09 Jun. 2003 19:48:24 GMT<br>Content-Length: 70 |

-continued

| | |
|---|---|
| Accept-Ranges: | bytes |
| Age: | 1724 |
| X-Cache: | HIT from i.cnn.net | http://i.cnn.net/cnn/.element/img/1.0/main/arrow_up.gif

| | |
|---|---|
| Size | 70 |
| Binary | true |
| Blocking | false |
| Redirected to | |
| Modified | Tue Jul. 08 2003 13:09:06 GMT-0400 (Eastern Daylight Time) |
| Expires | Tue Jul. 08 2003 13:09:06 GMT-0400 (Eastern Daylight Time) |
| HTTP Header | HTTP/1.0 200 OK<br>Server: Netscape-Enterprise/6.1 AOL<br>Date: Sat, 21 Jun. 2003 05:12:01 GMT<br>Content-Type: image/gif<br>Last-Modified: Mon, 09 Jun. 2003 19:48:24 GMT<br>Content-Length: 70<br>Accept-Ranges: bytes<br>Age: 8558<br>X-Cache: HIT from i.cnn.net | http://i.a.cnn.net/cnn/.element/img/1.0/main/ftn.breaking.alerts.gif

| | |
|---|---|
| Size | 1919 |
| Binary | true |
| Blocking | false |
| Redirected to | |
| Modified | Tue Jul. 08 2003 13:09:15 GMT-0400 (Eastern Daylight Time) |
| Expires | Tue Jul. 08 2003 13:36:45 GMT-0400 (Eastern Daylight Time) |
| HTTP Header | HTTP/1.0 200 OK<br>Server: Netscape-Enterprise/6.1 AOL<br>Content-Type: image/gif<br>Last-Modified: Mon, 09 Jun. 2003 19:48:26 GMT<br>Content-Length: 1919<br>Accept-Ranges: bytes<br>Cache-Control: max-age = 1667<br>Date: Tue, 08 Jul. 2003 17:10:33 GMT<br>Surrogate-Server: AkamaiGHost | http://i.a.cnn.net/cnn/.element/img/1.0/main/ftn.345x32.try.timeMay03.gif

| | |
|---|---|
| Size | 2035 |
| Binary | true |
| Blocking | false |
| Redirected to | |
| Modified | Tue Jul. 08 2003 13:09:16 GMT-0400 (Eastern Daylight Time) |
| Expires | Tue Jul. 08 2003 13:18:33 GMT-0400 (Eastern Daylight Time) |
| HTTP Header | HTTP/1.0 200 OK<br>Server: Netscape-Enterprise/6.1 AOL<br>Content-Type: image/gif<br>Last-Modified: Mon, 07 Jul. 2003 20:55:34 GMT<br>Content-Length: 2035<br>Accept-Ranges: bytes<br>Cache-Control: max-age = 575<br>Date: Tue, 08 Jul. 2003 17:10:33 GMT<br>Surrogate-Server: AkamaiGHost | http://i.a.cnn.net/cnn/.element/img/1.0/main/super-links/reports.gif

| | |
|---|---|
| Size | 170 |
| Binary | true |
| Blocking | false |
| Redirected to | |
| Modified | Tue Jul. 08 2003 13:09:16 GMT-0400 (Eastern Daylight Time) |
| Expires | Tue Jul. 08 2003 13:57:16 GMT-0400 (Eastern Daylight Time) |
| HTTP Header | HTTP/1.0 200 OK<br>Server: Netscape-Enterprise/6.1 AOL<br>Content-Type: image/gif<br>Last-Modified: Mon, 09 Jun. 2003 19:48:25 GMT<br>Content-Length: 170<br>Accept-Ranges: bytes<br>Surrogate-Server: AkamaiGHost, AkamaiGHost<br>Cache-Control: max-age = 2898<br>Date: Tue, 08 Jul. 2003 17:10:34 GMT | http://i.a.cnn.net/cnn/images/programming.boxes/tz.machu.picchu.jpg

| | |
|---|---|
| Size | 1050 |
| Binary | true |
| Blocking | false |
| Redirected to | |
| Modified | Tue Jul. 08 2003 13:09:16 GMT-0400 (Eastern Daylight Time) |
| Expires | Tue Jul. 08 2003 13:19:50 GMT-0400 (Eastern Daylight Time) |
| HTTP Header | HTTP/1.0 200 OK<br>Server: Netscape-Enterprise/6.1 AOL<br>Content-Type: image/jpeg<br>Last-Modified: Mon, 07 Jul. 2003 20:35:45 GMT<br>Content-Length: 1050<br>Accept-Ranges: bytes<br>Cache-Control: max-age = 652<br>Date: Tue, 08 Jul. 2003 17:10:35 GMT<br>Surrogate-Server: AkamaiGHost | http://i.a.cnn.net/cnn/element/img/1.0/main/super-links/technology.gif

| | |
|---|---|
| Size | 186 |
| Binary | true |
| Blocking | false |
| Redirected to | |
| Modified | Tue Jul. 08 2003 13:09:17 GMT-0400 (Eastern Daylight Time) |
| Expires | Tue Jul. 08 2003 13:22:12 GMT-0400 (Eastern Daylight Time) |
| HTTP Header | HTTP/1.0 200 OK<br>Server: Netscape-Enterprise/6.1 AOL | http://i.a.cnn.net/cnn/2003/TECH/ptech/07/08/pop-sci.ul.lab.cnn.jpg

| | |
|---|---|
| Size | 1258 |
| Binary | true |
| Blocking | false |
| Redirected to | |
| Modified | Tue Jul. 08 2003 13:09:17 GMT-0400 (Eastern Daylight Time) |
| Expires | Tue Jul. 08 2003 13:25:42 GMT-0400 (Eastern Daylight Time) |
| HTTP Header | HTTP/1.0 200 OK<br>Server: Netscape-Enterprise/6.1 AOL<br>Content-Type: image/jpeg<br>Last-Modified: Tue, 08 Jul. 2003 13:47:23 GMT<br>Content-Length: 1258<br>Accept-Ranges: bytes<br>Cache-Control: max-age = 1004<br>Date: Tue, 08 Jul. 2003 17:10:35 GMT<br>Surrogate-Server: AkamaiGHost | http://i.a.cnn.net/cnn/.element/img/1.0/main/us.gif

| | |
|---|---|
| Size | 352 |
| Binary | true |
| Blocking | false |
| Redirected to | |
| Modified | Tue Jul. 08 2003 13:09:17 GMT-0400 (Eastern Daylight Time) |
| Expires | Tue Jul. 08 2003 13:25:22 GMT-0400 (Eastern Daylight Time) |
| HTTP Header | HTTP/1.0 200 OK<br>Server: Netscape-Enterprise/6.1 AOL<br>Content-Type: image/gif<br>Last-Modified: Mon, 09 Jun. 2003 19:48:25 GMT<br>Content-Length: 352<br>Accept-Ranges: bytes<br>Cache-Control: max-age = 984<br>Date: Tue, 08 Jul. 2003 17:10:35 GMT<br>Surrogate-Server: AkamaiGHost | http://i.a.cnn.net/cnn/.element/img/1.0/main/world.gif

| | |
|---|---|
| Size | 456 |
| Binary | true |
| Blocking | false |
| Redirected to | |
| Modified | Tue Jul. 08 2003 13:09:18 GMT-0400 (Eastern Daylight Time) |
| Expires | Tue Jul. 08 2003 13:57:41 GMT-0400 (Eastern Daylight Time) |
| HTTP Header | HTTP/1.0 200 OK<br>Server: Netscape-Enterprise/6.1 AOL<br>Content-Type: image/gif<br>Last-Modified: Mon, 09 Jun. 2003 19:48:26 GMT<br>Content-Length: 456<br>Accept-Ranges: bytes<br>Cache-Control: max-age = 2923<br>Date: Tue, 08 Jul. 2003 17:10:36 GMT<br>Surrogate-Server: AkamaiGHost | http://i.cnn.net/cnn/.element/img/1.0/misc/icon.external.links.gif

| | |
|---|---|
| Size | 104 |
| Binary | true |
| Blocking | false |
| Redirected to | |
| Modified | Tue Jul. 08, 2003 13:09:09 GMT-0400 (Eastern Daylight Time) |
| Expires | Tue Jul. 08, 2003 13:09:09 GMT-0400 (Eastern Daylight Time) |
| HTTP Header | HTTP/1.0 200 OK<br>Server: Netscape-Enterprise/6.1 AOL<br>Date: Fri, 20 Jun. 2003 15:39:46 GMT<br>Content-Type: image/gif<br>Last-Modified: Mon, 09 Jun. 2003 19:48:26 GMT<br>Content-Length: 104<br>Accept-Ranges: bytes<br>Age: 11403<br>X-Cache: HIT from i.cnn.net | http://i.a.cnn.net/cnn/.element/img/1.0/main/technology.gif

| | |
|---|---|
| Size | 731 |
| Binary | true |
| Blocking | false |
| Redirected to | |
| Modified | Tue Jul. 08, 2003 13:09:18 GMT-0400 (Eastern Daylight Time) |
| Expires | Tue Jul. 08, 2003 13:32:38 GMT-0400 (Eastern Daylight Time) |
| HTTP Header | HTTP/1.0 200 OK<br>Server: Netscape-Enterprise/6.1 AOL<br>Content-Type: image/gif<br>Last-Modified: Mon, 09 Jun. 2003 19:48:25 GMT<br>Content-Length: 731<br>Accept-Ranges: bytes<br>Cache-Control: max-age = 1420<br>Date: Tue, 08 Jul. 2003 17:10:36 GMT<br>Surrogate-Server: AkamaiGHost | http://i.a.cnn.net/cnn/.element/img/1.0/main/entertainment.gif

| | |
|---|---|
| Size | 661 |
| Binary | true |
| Blocking | false |
| Redirected to | |
| Modified | Tue Jul. 08, 2003 13:09:18 GMT-0400 (Eastern Daylight Time) |

| | |
|---|---|
| Expires | Tue Jul. 08, 2003 13:42:43 GMT-0400 (Eastern Daylight Time) |
| HTTP Header | HTTP/1.0 200 OK<br>Server: Netscape-Enterprise/6.1 AOL<br>Content-Type: image/gif<br>Last-Modified: Mon, 09 Jun. 2003 19:48:24 GMT<br>Content-Length: 661<br>Accept-Ranges: bytes<br>Cache-Control: max-age = 2025<br>Date: Tue, 08 Jul. 2003 17:10:36 GMT<br>Surrogate-Server: AkamaiGHost | http://i.a.cnn.net/cnn/.element/img/1.0/main/politics.gif

| | |
|---|---|
| Size | 484 |
| Binary | true |
| Blocking | false |
| Redirected to | |
| Modified | Tue Jul. 08, 2003 13:09:18 GMT-0400 (Eastern Daylight Time) |
| Expires | Tue Jul. 08, 2003 13:47:26 GMT-0400 (Eastern Daylight Time) |
| HTTP Header | HTTP/1.0 200 OK<br>Server: Netscape-Enterprise/6.1 AOL<br>Content-Type: image/gif<br>Last-Modified: Mon, 09 Jun. 2003 19:48:24 GMT<br>Content-Length: 484<br>Accept-Ranges: bytes<br>Cache-Control: max-age = 2308<br>Date: Tue, 08 Jul. 2003 17:10:36 GMT<br>Surrogate-Server: AkamaiGHost | http://i.a.cnn.net/cnn/.element/img/1.0/main/law.gif

| | |
|---|---|
| Size | 394 |
| Binary | true |
| Blocking | false |
| Redirected to | |
| Modified | Tue Jul. 08, 2003 13:09:18 GMT-0400 (Eastern Daylight Time) |
| Expires | Tue Jul. 08, 2003 13:59:39 GMT-0400 (Eastern Daylight Time) |
| HTTP Header | HTTP/1.0 200 OK<br>Server: Netscape-Enterprise/6.1 AOL<br>Content-Type: image/gif<br>Last-Modified: Mon, 09 Jun. 2003 19:48:24 GMT<br>Content-Length: 394<br>Accept-Ranges: bytes<br>Cache-Control: max-age = 3041<br>Date: Tue, 08 Jul. 2003 17:10:37 GMT<br>Surrogate-Server: AkamaiGHost | http://i.a.cnn.net/cnn/.element/img/1.0/main/health.gif

| | |
|---|---|
| Size | 448 |
| Binary | true |
| Blocking | false |
| Redirected to | |
| Modified | Tue Jul. 08, 2003 13:09:19 GMT-0400 (Eastern Daylight Time) |

| | |
|---|---|
| Expires | Tue Jul. 08, 2003 13:40:46 GMT-0400 (Eastern Daylight Time) |
| HTTP Header | HTTP/1.0 200 OK<br>Server: Netscape-Enterprise/6.1 AOL<br>Content-Type: image/gif<br>Last-Modified: Mon, 09 Jun. 2003 19:48:24 GMT<br>Content-Length: 448<br>Accept-Ranges: bytes<br>Cache-Control: max-age = 1908<br>Date: Tue, 08 Jul. 2003 17:10:37 GMT<br>Surrogate-Server: AkamaiGHost | http://i.a.cnn.net/cnn/.element/img/1.0/main/space.gif

| | |
|---|---|
| Size | 914 |
| Binary | true |
| Blocking | false |
| Redirected to | |
| Modified | Tue Jul. 08, 2003 13:09:19 GMT-0400 (Eastern Daylight Time) |
| Expires | Tue Jul. 08, 2003 13:28:53 GMT-0400 (Eastern Daylight Time) |
| HTTP Header | HTTP/1.0 200 OK<br>Server: Netscape-Enterprise/6.1 AOL<br>Content-Type: image/gif<br>Last-Modified: Mon, 09 Jun. 2003 19:48:24 GMT<br>Content-Length: 914<br>Accept-Ranges: bytes<br>Surrogate-Server: AkamaiGHost, AkamaiGHost<br>Cache-Control: max-age = 1195<br>Date: Tue, 08 Jul. 2003 17:10:37 GMT | http://i.a.cnn.net/cnn/.element/img/1.0/main/travel.gif

| | |
|---|---|
| Size | 442 |
| Binary | true |
| Blocking | false |
| Redirected to | |
| Modified | Tue Jul. 08, 2003 13:09:19 GMT-0400 (Eastern Daylight Time) |
| Expires | Tue Jul. 08, 2003 13:37:01 GMT-0400 (Eastern Daylight Time) |
| HTTP Header | HTTP/1.0 200 OK<br>Server: Netscape-Enterprise/6.1 AOL<br>Content-Type: image/gif<br>Last-Modified: Mon, 09 Jun. 2003 19:48:25 GMT<br>Content-Length: 442<br>Accept-Ranges: bytes<br>Surrogate-Server: AkamaiGHost, AkamaiGHost<br>Cache-Control: max-age = 1683<br>Date: Tue, 08 Jul. 2003 17:10:37 GMT | http://i.a.cnn.net/cnn/.element/img/1.0/main/education.gif

| | |
|---|---|
| Size | 536 |
| Binary | true |

-continued

| | |
|---|---|
| Blocking | false |
| Redirected to | |
| Modified | Tue Jul. 08, 2003 13:09:19 GMT-0400 (Eastern Daylight Time) |
| Expires | Tue Jul. 08, 2003 13:16:18 GMT-0400 (Eastern Daylight Time) |
| HTTP Header | HTTP/1.0 200 OK |
| | Server: Netscape-Enterprise/6.1 AOL |
| | Content-Type: image/gif |
| | Last-Modified: Mon, 09 Jun. 2003 19:48:24 GMT |
| | Content-Length: 536 |
| | Accept-Ranges: bytes |
| | Cache-Control: max-age = 440 |
| | Date: Tue, 08 Jul. 2003 17:10:38 GMT |
| | Surrogate-Server: AkamaiGHost | http://i.a.cnn.net/cnn/.element/img/1.0/main/sports.gif

| | |
|---|---|
| Size | 452 |
| Binary | true |
| Blocking | false |
| Redirected to | |
| Modified | Tue Jul. 08, 2003 13:09:20 GMT-0400 (Eastern Daylight Time) |
| Expires | Tue Jul. 08, 2003 14:02:04 GMT-0400 (Eastern Daylight Time) |
| HTTP Header | HTTP/1.0 200 OK |
| | Server: Netscape-Enterprise/6.1 AOL |
| | Content-Type: image/gif |
| | Last-Modified: Mon, 09 Jun. 2003 19:48:24 GMT |
| | Content-Length: 452 |
| | Accept-Ranges: bytes |
| | Cache-Control: max-age = 3186 |
| | Date: Tue, 08 Jul. 2003 17:10:38 GMT |
| | Surrogate-Server: AkamaiGHost | http://i.a.cnn.net/cnn/.element/img/1.0/main/business.gif

| | |
|---|---|
| Size | 515 |
| Binary | true |
| Blocking | false |
| Redirected to | |
| Modified | Tue Jul. 08, 2003 13:09:20 GMT-0400 (Eastern Daylight Time) |
| Expires | Tue Jul. 08, 2003 13:19:24 GMT-0400 (Eastern Daylight Time) |
| HTTP Header | HTTP/1.0 200 OK |
| | Server: Netscape-Enterprise/6.1 AOL |
| | Content-Type: image/gif |
| | Last-Modified: Mon, 09 Jun. 2003 19:48:24 GMT |
| | Content-Length: 515 |
| | Accept-Ranges: bytes |
| | Surrogate-Server: AkamaiGHost, AkamaiGHost |
| | Cache-Control: max-age = 626 |
| | Date: Tue, 08 Jul. 2003 17:10:38 GMT | http://i.a.cnn.net/cnn/.element/img/1.0/misc/diagonal.gif

| | |
|---|---|
| Size | 86 |
| Binary | true |
| Blocking | false |
| Redirected to | |
| Modified | Tue Jul. 08, 2003 13:09:20 GMT-0400 (Eastern Daylight Time) |
| Expires | Tue Jul. 08, 2003 13:43:03 GMT-0400 (Eastern Daylight Time) |
| HTTP Header | HTTP/1.0 200 OK |
| | Server: Netscape-Enterprise/6.1 AOL |
| | Content-Type: image/gif |
| | Last-Modified: Mon, 09 Jun. 2003 19:48:27 GMT |
| | Content-Length: 86 |
| | Accept-Ranges: bytes |
| | Cache-Control: max-age = 2045 |
| | Date: Tue, 08 Jul. 2003 17:10:38 GMT |
| | Surrogate-Server: AkamaiGHost | http://i.a.cnn.net/cnn/.element/img/1.0/main/tv.schedule.gif

| | |
|---|---|
| Size | 161 |
| Binary | true |
| Blocking | false |
| Redirected to | |
| Modified | Tue Jul. 08, 2003 13:09:20 GMT-0400 (Eastern Daylight Time) |
| Expires | Tue Jul. 08, 2003 13:19:12 GMT-0400 (Eastern Daylight Time) |
| HTTP Header | HTTP/1.0 200 OK |
| | Server: Netscape-Enterprise/6.1 AOL |
| | Content-Type: image/gif |
| | Last-Modified: Mon, 09 Jun. 2003 19:48:25 GMT |
| | Content-Length: 161 |
| | Accept-Ranges: bytes |
| | Cache-Control: max-age = 614 |
| | Date: Tue, 08 Jul. 2003 17:10:39 GMT |
| | Surrogate-Server: AkamaiGHost | http://i.cnn.net/cnn/CNN/Programs/includes/showbox/images/paula.zahn.gif

| | |
|---|---|
| Size | 3762 |
| Binary | true |
| Blocking | false |
| Redirected to | |
| Modified | Tue Jul. 08, 2003 13:09:11 GMT-0400 (Eastern Daylight Time) |
| Expires | Tue Jul. 08, 2003 13:09:09 GMT-0400 (Eastern Daylight Time) |
| HTTP Header | HTTP/1.0 200 OK |
| | Server: Netscape-Enterprise/6.1 AOL |
| | Date: Thu, 22 May 2003 22:29:24 GMT |
| | Content-Type: image/gif |
| | Last-Modified: Sun, 18 Aug. 2002 18:22:27 GMT |
| | Content-Length: 3762 |
| | Accept-Ranges: bytes |
| | Age: 67768 |
| | X-Cache: HIT from i.cnn.net | http://i.a.cnn.net/cnn/.element/img/1.0/main/super-links/us.gif

| | |
|---|---|
| Size | 145 |
| Binary | true |
| Blocking | false |
| Redirected to | |
| Modified | Tue Jul. 08, 2003 13:09:20 GMT-0400 (Eastern Daylight Time) |
| Expires | Tue Jul. 08, 2003 13:23:54 GMT-0400 (Eastern Daylight Time) |
| HTTP Header | HTTP/1.0 200 OK<br>Server: Netscape-Enterprise/6.1 AOL<br>Content-Type: image/gif<br>Last-Modified: Mon, 09 Jun. 2003 19:48:26 GMT<br>Content-Length: 145<br>Accept-Ranges: bytes<br>Cache-Control: max-age = 896.<br>Date: Tue, 08 Jul. 2003 17:10:39 GMT<br>Surrogate-Server: AkamaiGHost | http://i.a.cnn.net/cnn/2003/US/07/08/nyt.kristof/tz.blair.jpg

| | |
|---|---|
| Size | 4091 |
| Binary | true |
| Blocking | false |
| Redirected to | |
| Modified | Tue Jul. 08, 2003 13:09:22 GMT-0400 (Eastern Daylight Time) |
| Expires | Tue Jul. 08, 2003 13:56:56 GMT-0400 (Eastern Daylight Time) |
| HTTP Header | HTTP/1.0 200 OK<br>Server: Netscape-Enterprise/6.1 AOL<br>Content-Type: image/jpeg<br>Last-Modified: Tue, 08 Jul. 2003 15:48:13 GMT<br>Content-Length: 4091<br>Accept-Ranges: bytes<br>Cache-Control: max-age = 2878<br>Date: Tue, 08 Jul. 2003 17:10:39 GMT<br>Surrogate-Server: AkamaiGHost | http://i.a.cnn.net/cnn/.element/img/1.0/main/super-links/offbeat.gif

| | |
|---|---|
| Size | 171 |
| Binary | true |
| Blocking | false |
| Redirected to | |
| Modified | Tue Jul. 08, 2003 13:09:22 GMT-0400 (Eastern Daylight Time) |
| Expires | Tue Jul. 08, 2003 13:42:20 GMT-0400 (Eastern Daylight Time) |
| HTTP Header | HTTP/1.0 200 OK<br>Server: Netscape-Enterprise/6.1 AOL<br>Content-Type: image/gif<br>Last-Modified: Mon, 09 Jun. 2003 19:48:26 GMT<br>Content-Length: 171<br>Accept-Ranges: bytes<br>Cache-Control: max-age = 2002<br>Date: Tue, 08 Jul. 2003 17:10:39 GMT<br>Surrogate-Server: AkamaiGHost | http://i.a.cnn.net/cnn/2003/US/Southwest/07/08/offbeateditor.fired/tz.caddyshack.jpg

| | |
|---|---|
| Size | 2064 |
| Binary | true |
| Blocking | false |
| Redirected to | |
| Modified | Tue Jul. 08, 2003 13:09:23 GMT-0400 (Eastern Daylight Time) |
| Expires | Tue Jul. 08, 2003 13:53:26 GMT-0400 (Eastern Daylight Time) |
| HTTP Header | HTTP/1.0 200 OK<br>Server: Netscape-Enterprise/6.1 AOL<br>Content-Type: image/jpeg<br>Last-Modified: Tue, 08 Jul. 2003 16:37:42 GMT<br>Content-Length: 2064<br>Accept-Ranges: bytes<br>Surrogate-Server: AkamaiGHost, AkamaiGHost<br>Cache-Control: max-age = 2667<br>Date: Tue, 08 Jul. 2003 17:10:40 GMT | http://i.a.cnn.net/cnn/element/img/1.0/main/quickvote.no.sponsor.gif

| | |
|---|---|
| Size | 1437 |
| Binary | true |
| Blocking | false |
| Redirected to | |
| Modified | Tue Jul. 08, 2003 13:09:23 GMT-0400 (Eastern Daylight Time) |
| Expires | Tue Jul. 08, 2003 13:50:00 GMT-0400 (Eastern Daylight Time) |
| HTTP Header | HTTP/1.0 200 OK<br>Server: Netscape-Enterprise/6.1 AOL<br>Content-Type: image/gif<br>Last-Modified: Mon, 09 Jun. 2003 19:48:26 GMT<br>Content-Length: 1437<br>Accept-Ranges: bytes<br>Surrogate-Server: AkamaiGHost, AkamaiGHost<br>Cache-Control: max-age = 2461<br>Date: Tue, 08 Jul. 2003 17:10:41 GMT | http://i.a.cnn.net/cnn/.element/img/1.0/main/icon_external.gif

| | |
|---|---|
| Size | 104 |
| Binary | true |
| Blocking | false |
| Redirected to | |
| Modified | Tue Jul. 08, 2003 13:09:23 GMT-0400 (Eastern Daylight Time) |
| Expires | Tue Jul. 08, 2003 13:32:52 GMT-0400 (Eastern Daylight Time) |
| HTTP Header | HTTP/1.0 200 OK<br>Server: Netscape-Enterprise/6.1 AOL<br>Content-Type: image/gif<br>Last-Modified: Mon, 09 Jun. 2003 19:48:24 GMT<br>Content-Length: 104<br>Accept-Ranges: bytes<br>Cache-Control: max-age = 1433<br>Date: Tue, 08 Jul. 2003 17:10:41 GMT<br>Surrogate-Server: AkamaiGHost | http://i.a.cnn.net/cnn/.element/img/1.0/main/partner_time.gif

| | |
|---|---|
| Size | 439 |
| Binary | true |
| Blocking | false |
| Redirected to | |
| Modified | Tue Jul. 08, 2003 13:09:23 GMT-0400 (Eastern Daylight Time) |
| Expires | Tue Jul. 08, 2003 13:48:52 GMT-0400 (Eastern Daylight Time) |
| HTTP Header | HTTP/1.0 200 OK<br>Server: Netscape-Enterprise/6.1 AOL<br>Content-Type: image/gif<br>Last-Modified: Mon, 09 Jun. 2003 19:48:25 GMT<br>Content-Length: 439<br>Accept-Ranges: bytes<br>Cache-Control: max-age = 2393<br>Date: Tue, 08 Jul. 2003 17:10:42 GMT<br>Surrogate-Server: AkamaiGHost | http://i.a.cnn.net/cnn/.element/img/1.0/main/partner_si.gif

| | |
|---|---|
| Size | 973 |
| Binary | true |
| Blocking | false |
| Redirected to | |
| Modified | Tue Jul. 08, 2003 13:09:24 GMT-0400 (Eastern Daylight Time) |
| Expires | Tue Jul. 08, 2003 13:25:00 GMT-0400 (Eastern Daylight Time) |
| HTTP Header | HTTP/1.0 200 OK<br>Server: Netscape-Enterprise/6.1 AOL<br>Content-Type: image/gif<br>Last-Modified: Mon, 09 Jun. 2003 19:48:25 GMT<br>Content-Length: 973<br>Accept-Ranges: bytes<br>Cache-Control: max-age = 961<br>Date: Tue, 08 Jul. 2003 17:10:42 GMT<br>Surrogate-Server: AkamaiGHost | http://i.a.cnn.net/cnn/.element/img/1.0/main/partner_fortune.gif

| | |
|---|---|
| Size | 938 |
| Binary | true |
| Blocking | false |
| Redirected to | |
| Modified | Tue Jul. 08, 2003 13:09:24 GMT-0400 (Eastern Daylight Time) |
| Expires | Tue Jul. 08, 2003 13:25:29 GMT-0400 (Eastern Daylight Time) |
| HTTP Header | HTTP/1.0 200 OK<br>Server: Netscape-Enterprise/6.1 AOL<br>Content-Type: image/gif<br>Last-Modified: Mon, 09 Jun. 2003 19:48:26 GMT<br>Content-Length: 938<br>Accept-Ranges: bytes<br>Surrogate-Server: AkamaiGHost, AkamaiGHost, AkamaiGHost<br>Cache-Control: max-age = 990<br>Date: Tue, 08 Jul. 2003 17:10:42 GMT | http://i.a.cnn.net/cnn/.element/img/1.0/sect/SEARCH/dotted.line.gif

| | |
|---|---|
| Size | 69 |
| Binary | true |
| Blocking | false |
| Redirected to | |
| Modified | Tue Jul. 08, 2003 13:09:24 GMT-0400 (Eastern Daylight Time) |
| Expires | Tue Jul. 08, 2003 13:23:14 GMT-0400 (Eastern Daylight Time) |
| HTTP Header | HTTP/1.0 200 OK<br>Server: Netscape-Enterprise/6.1 AOL<br>Content-Type: image/gif<br>Last-Modified: Mon, 09 Jun. 2003 19:48:28 GMT<br>Content-Length: 69<br>Accept-Ranges: bytes<br>Cache-Control: max-age = 855<br>Date: Tue, 08 Jul. 2003 17:10:42 GMT<br>Surrogate-Server: AkamaiGHost | http://i.a.cnn.net/cnn/.element/img/1.0/misc/icon.external.links.gif

| | |
|---|---|
| Size | 104 |
| Binary | true |
| Blocking | false |
| Redirected to | |
| Modified | Tue Jul. 08, 2003 13:09:24 GMT-0400 (Eastern Daylight Time) |
| Expires | Tue Jul. 08, 2003 13:50:35 GMT-0400 (Eastern Daylight Time) |
| HTTP Header | HTTP/1.0 200 OK<br>Server: Netscape-Enterprise/6.1 AOL<br>Content-Type: image/gif<br>Last-Modified: Mon, 09 Jun. 2003 19:48:26 GMT<br>Content-Length: 104<br>Accept-Ranges: bytes<br>Cache-Control: max-age = 2496<br>Date: Tue, 08 Jul. 2003 17:10:43 GMT<br>Surrogate-Server: AkamaiGHost | http://ar.atwola.com/html/93103308/48441749/aol?SNM=HIDBFV&width=88&height=31&target=_top&TZ=240&TVAR=class%3Dus.low&CT=I

| | |
|---|---|
| Size | 377 |
| Binary | false |
| Blocking | false |
| Redirected to | |
| Modified | Tue Jul. 08, 2003 13:09:01 GMT-0400 (Eastern Daylight Time) |
| Expires | Wed Dec. 31, 1969 19:00:00 GMT-0500 (Eastern Standard Time) |
| HTTP Header | HTTP/1.1 200 OK<br>Content-Type: text/html<br>Pragma: no-cache<br>Cache-Control: no-cache<br>Expires: Tue, 08 Jul. 2003 17:10:16 GMT<br>Date: Tue, 08 Jul. 2003 17:10:16 GMT<br>Content-Length: 377 |

81 http://i.a.cnn.net/cnn/.element/img/1.0/main/icon_premium.gif

| | |
|---|---|
| Size | 74 |
| Binary | true |
| Blocking | false |
| Redirected to | |
| Modified | Tue Jul. 08, 2003 13:09:24 GMT-0400 (Eastern Daylight Time) |
| Expires | Tue Jul. 08, 2003 13:37:32GMT-0400(Eastern Daylight Time) |
| HTTP Header | HTTP/1.0 200 OK |
| | Server: Netscape-Enterprise/6.1 AOL |
| | Content-Type: image/gif |
| | Last-Modified: Mon, 09 Jun. 2003 19:48:24 GMT |
| | Content-Length: 74 |
| | Accept-Ranges: bytes |
| | Cache-Control: max-age = 1713 |
| | Date: Tue, 08 Jul. 2003 17:10:43 GMT |
| | Surrogate-Server: AkamaiGHost | http://ar.atwola.com/html/93137910/48441749/aol?SNM=HIDBFV&width=101&height=1&target=_top&TZ=240&TVAR=class%3Dus.low&CT=J&hw=docw

| | |
|---|---|
| Size | 267 |
| Binary | false |
| Blocking | true |
| Redirected to | |
| Modified | Tue Jul. 08, 2003 13:09:02 GMT-0400 (Eastern Daylight Time) |
| Expires | Wed Dec. 31, 1969 19:00:00 GMT-0500 (Eastern Standard Time) |
| HTTP Header | HTTP/1.1 200 OK |
| | Content-Type: application/x-javascript |
| | Pragma: no-cache |
| | Cache-Control: no-cache |
| | Expires: Tue, 08 Jul. 2003 17:10:19 GMT |
| | Date: Tue, 08 Jul. 2003 17:10:19 GMT |
| | Content-Length: 267 | http://ar.atwola.com/file/adsEnd.js

| | |
|---|---|
| Size | 1551 |
| Binary | false |
| Blocking | true |
| Redirected to | |
| Modified | Tue Jul. 08, 2003 13:09:11 GMT-0400 (Eastern Daylight Time) |
| Expires | Wed Jul. 09 2003 13:09:02 GMT-0400 (Eastern Daylight Time) |
| HTTP Header | HTTP/1.1 200 OK |
| | Expires: Wed, 09 Jul. 2003 17:10:27 GMT |
| | Date: Tue, 08 Jul. 2003 17:10:27 GMT |
| | Content-Length: 1551 |
| | Content-Type: application/x-javascript |

82 http://www.cnn.com/cookie.crumb

| | |
|---|---|
| Size | 43 |
| Binary | true |
| Blocking | false |
| Redirected to | |
| Modified | Tue Jul. 08, 2003 13:09:14 GMT-0400 (Eastern Daylight Time) |
| Expires | Wed Dec. 31, 1969 19:00:00 GMT-0500 (Eastern Standard Time) |
| HTTP Header | HTTP/1.1 200 OK |
| | Server: Netscape-Enterprise/6.1 AOL |
| | Date: Tue, 08 Jul. 2003 17:10:31 GMT |
| | Content-Length: 43 |
| | Content-Type: image/gif |

Links

| URL | Total Score |
|---|---|
| | |

Results

| Dialup Blocking Total | Cable Blocking Total | Satellite Blocking Total |
|---|---|---|
| First Visit | First Visit | First Visit |
| 1.32 | 0.76 | 1.8 |
| 5.17 | 2 | 13.18 |
| Second Visit | Second Visit | Second Visit |
| 1.32 | 0.76 | 1.8 |
| 5.13 | 1.98 | 13.02 |

Because each example report uses the same Perception Time value of ten seconds, these reports imply that that it takes a Dialup visitor approximately 50 seconds to load CNN the first time, a Cable visitor 20 seconds and a Satellite visitor over 130 seconds.

These reports also indicate that for visitors who only visit CNN once per day, caching provides no benefit for their first visit of the day.

Heuristics Description

The Web page scoring tool uses the time to perform DNS lookups, round trip time for requests, download size and bandwidth and the blocking nature of external CSS and JavaScript files to determine a calculated download time. This download time is scaled by the Visitor Perception Time parameter to determine a score.

FIGS. 2a-2l illustrate a Web page report according to the invention. The report shown in FIGS. 2a-2l was generated for the Web page http://slashdot.org/ and is readily contrasted by a report generated by a state of the art product, as shown in FIGS. 1a-c, for the same Web page. As shown on FIG. 2a, a total score 21 is provided for a Web page. The total score is followed a score details 22, which include an incremental layout score 23 and a latency score 24. The report provides download scores 25, documents statistics 26, 27, details of the document Head 28 and details of the body tag 29. As well, the invention also provides details of the child elements of the body tag 30, which are organized as a series of tables, one table for each child element, where each table contain information regards the child element key, dataSize, fetchCount, lastFetched date, lastModified date, expirationTime, and responseHead.

While the report shown in FIGS. 2a-2l includes the various factors identified above, those skilled in the art will appreciate that the invention may provide reports in any other format as desired, including such factors as may be of interest.

Figure 3A:
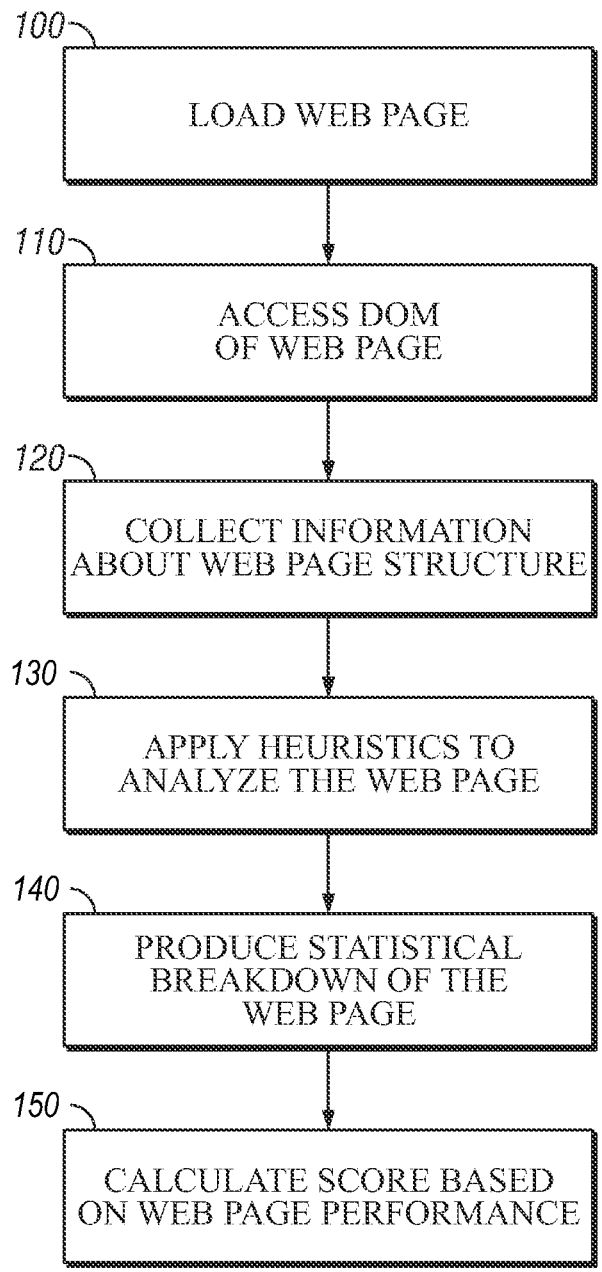
FIGS. 3a and 3b provide a flow diagram of a method for Web page performance scoring using a browser-based tool according to the invention.
Figure 3B:
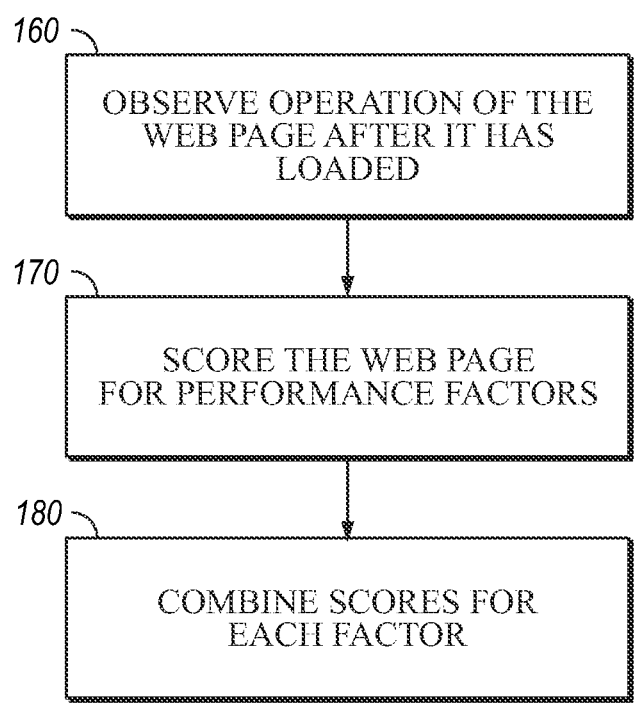

FIGS. 3a and 3b provide a flow diagram of a method for Web page performance scoring using a browser-based tool according to the invention. The presently preferred embodiment of the invention comprises a browser-based tool that loads a Web page (100), accesses the document object model (DOM) of the page (110), collects information about the page structure (120), and determines through the use of heuristics such factors as how much text is found on the page, download time, and the like (130), produces a statistical breakdown of the page (140), and calculates a score based on performance of the page relative to an ideal performance score (150).

Key to the operation of the invention is the ability to observe operation of the Web page in real time as it is loading, further determine performance after a second (cached) load (160), score the page for several of various performance factors (170), and produce a combined score for the various factors (180).

One presently preferred embodiment of the invention comprises a tool that has been implemented as a special Web page hosted in a Netscape 7.0x/Mozilla (see http://channels.netscape.com/ns/browsers/default.jsp) sidebar. The tool uses a JavaScript™, see http://devedge.netscape.com/central/javascript/ (ECMAScript—see http://www.ecma-international.org/publications/standards/ECMA-262.HTM: Standard Ecma-262 ECMAScript Language Specification 3rd edition (December 1999)), standards based mechanism for access to the Web page document structure by means of the W3C DOM (see http://www.w3.org/DOM/) application programming interface, as well as access to internal services exposed by the Netscape 7/Mozilla browser to access file cache and size information.

The tool is readily extended to operate using Netscape 7/Mozilla in batch mode for automated reporting. Implementations in Perl (see http://www.perl.com/) are also currently being considered.

Further, those skilled in the art will appreciate that any other browser, e.g. Microsoft's Internet Explorer, may be used in connection with the invention disclosed herein. Thus, the tool is readily implemented in different environments if the following components normally found in a Web browser are available:
  An HTML/XML Parser
  A JavaScript engine
  Representation of the input document as an object model such as the W3C Document Object Model
  Ability to determine HTTP headers returned by the Web server and effective file caching for the Web page and the Web page referenced files.

Although the invention is described herein with reference to the preferred embodiment, one skilled in the art will readily appreciate that other applications may be substituted for those set forth herein without departing from the spirit and scope of the present invention. For example, the invention allows the scoring of cached vs. uncached versions of a page. Additionally, the invention is readily implemented in a system the does not comprise a browser, e.g. in PERL, etc. It is also possible to operate the invention such that it runs without user interaction and observation, for example on a server.

Accordingly, the invention should only be limited by the Claims included below.

The invention claimed is:

1. A computer-implemented method for reporting a Web page performance score for said Web page, comprising computer-implemented operations of:
  heuristically calculating a performance sub-score for each of a plurality of Web page performance metrics;
  combining said performance sub-scores to produce at least one interpretable Web page performance score; and
  outputting a report related to said at least one interpretable Web page performance score.

2. The method of claim 1, wherein heuristically calculating a performance sub-score for each of a plurality of Web page performance metrics comprises computer-implemented operations of:
  monitoring operation of a Web page as it loads in real time;
  analyzing at least one Web page metric related to performance of said Web page as said Web page is active; and
  heuristically deriving a Web page performance score for said Web page based on at least one result of said analyzing.

3. The method of claim 1, further comprising computer-implemented operations of:
  receiving a URL (universal resource locator) of a Web page to be analyzed;
  receiving a specification of link depth to follow from said URL;
  responsive to user selection of a 'restrict URLs' setting, receiving a restrict URLs setting to restrict pages analyzed to links that begin with said URL; and
  receiving a page timeout value.

4. The method of claim 1, further comprising computer-implemented operations of:
  receiving entered network parameters; and
  receiving entered visitor parameters.

5. The method of claim 4, wherein receiving entered network parameters comprises computer-implemented operations of:
  receiving an entered bandwidth value for the visitor's connection;
  receiving an entered compression factor available to the visitor;
  receiving an entered time taken for the visitor's client to perform a DNS lookup; and
  receiving an entered ping latency value comprising the time required for a ping to travel from the visitor's machine to the web server and back.

6. The method of claim 4, wherein receiving entered visitor parameters comprises computer-implemented operations of:
  receiving an entered revisit time;
  receiving an entered intrapage time; and
  receiving an entered perception time.

7. The method of claim 1, wherein said plurality of performance metrics comprises:
  a 'first visit' score, wherein said first visit score assumes a visitor has not been to the site before or that the visitor's cache has been emptied;
  a 'second visit' score, wherein said second visit score assumes the visitor has previously visited a page and is revisiting after the time specified by a Revisit Time parameter;
  a 'total' score, wherein said total score is calculated from the time required to load all files required by the web page; and
  a 'blocking score', wherein said blocking score is calculated solely from files which may potentially block display of a page until said files are completely downloaded, said blocking score serving to give a measure of how quickly the user experiences some feedback that the page is loading.

8. The method of claim 7, wherein values for each of said first visit score and said second visit score are reported for each of said total score and said blocking score, wherein said scores are aggregated to result in said page score.

9. The method of claim 1, wherein said report includes sections for at least one of:
   page score;
   notes;
   summary statistics;
   file cache data; and
   links.

10. The method of claim 9, wherein said 'notes' section is configured to provide recommendations for improvements;
   wherein said 'summary statistics' section is configured to provide information regarding the web page;
   wherein the 'file cache' data section is configured to contain detail cache information for each file included in the web page; and
   wherein the 'links' section is configured to report each link found on the page, along with an effective score which measures the time required to load the linked page, once the original page's content has been loaded.

11. The method of claim 1, wherein outputting said report comprises at least one computer-implemented operation of:
   responsive to a user issuing a request for a report, receiving said issued request for a report;
   responsive to receiving said issued request for a report, generating said report;
   displaying said report;
   responsive to a user request, saving said generated report, wherein said saved, generated report is accessible by means of a URL.

12. The method of claim 1, said computer-implemented operations further comprising:
   calculating any of: how much text is found on a page, number of domains, and outside files;
   producing a statistical breakdown of said page; and
   calculating a score based on performance of said page.

13. The method of claim 1, said computer-implemented operations further comprising:
   measuring relative performance of Web pages interactively as they are being developed.

14. The method of claim 1, said computer-implemented operations comprising: visiting any of: a single page and all pages linked from a page up to a specified depth, while providing scores, overall statistics, and details for each included file.

15. The method of claim 1, wherein said computer-implemented operations are implemented without user interaction.

16. One or more computer-readable media having computer-executable instructions that, when executed by one or more processors, cause the one or more processors to perform operations comprising:
   heuristically calculating a performance sub-score for each of a plurality of Web page performance metrics;
   combining said performance sub-scores to produce at least one interpretable Web page performance score; and
   outputting a report related to said at least one interpretable Web page performance score.

17. The one or more computer-readable media of claim 16, wherein the at least one interpretable Web page performance score represent a potential page load performance.

18. The one or more computer-readable media of claim 16, wherein the Web page performance score is reported in real time.

19. An apparatus comprising:
   a heuristic module to calculate a performance sub-score for each of a plurality of Web page performance metrics;
   a performance module to combine said performance sub-scores to produce at least one interpretable Web page performance score; and
   a reporting module to output a report related to said at least one interpretable Web page performance score.

20. The apparatus of claim 19, wherein the report includes a Web page performance score for each of a plurality of network connection types.

* * * * *